(12) United States Patent
Kim et al.

(10) Patent No.: US 9,176,703 B2
(45) Date of Patent: Nov. 3, 2015

(54) MOBILE TERMINAL AND METHOD OF CONTROLLING THE SAME FOR SCREEN CAPTURE

(71) Applicant: LG ELECTRONICS INC., Seoul (KR)

(72) Inventors: Miyoung Kim, Seoul (KR); Keumsung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 163 days.

(21) Appl. No.: 13/867,440

(22) Filed: Apr. 22, 2013

(65) Prior Publication Data

US 2014/0002389 A1  Jan. 2, 2014

(30) Foreign Application Priority Data

Jun. 29, 2012 (KR) .......... 10-2012-0070773
Jul. 13, 2012 (KR) .......... 10-2012-0076796

(51) Int. Cl.
| | |
|---|---|
| G06F 3/14 | (2006.01) |
| G06Q 10/10 | (2012.01) |
| H04N 5/44 | (2011.01) |
| H04N 21/41 | (2011.01) |
| H04N 21/431 | (2011.01) |
| H04N 21/436 | (2011.01) |
| H04N 21/4363 | (2011.01) |
| H04N 21/443 | (2011.01) |
| G06F 3/0488 | (2013.01) |
| H04L 12/28 | (2006.01) |

(52) U.S. Cl.
CPC .......... *G06F 3/1446* (2013.01); *G06F 3/04886* (2013.01); *G06F 3/1454* (2013.01); *G06Q 10/10* (2013.01); *H04N 5/4403* (2013.01); *H04N 21/4126* (2013.01); *H04N 21/4312* (2013.01); *H04N 21/43615* (2013.01); *H04N 21/43637* (2013.01); *H04N 21/4438* (2013.01); *G06F 3/1423* (2013.01); *G09G 2340/04* (2013.01); *G09G 2340/14* (2013.01); *H04L 12/2838* (2013.01)

(58) Field of Classification Search
CPC .... G06F 3/1454; G06F 9/4445; H04N 5/4403
USPC .......................................... 709/205; 345/1.3
See application file for complete search history.

(56) References Cited

U.S. PATENT DOCUMENTS

| | | | |
|---|---|---|---|
| 2010/0328469 A1* | 12/2010 | Hashimoto et al. ........ | 348/207.1 |
| 2011/0165841 A1 | 7/2011 | Baek et al. | |
| 2011/0268218 A1 | 11/2011 | Kang et al. | |
| 2011/0276911 A1 | 11/2011 | Choi | |

(Continued)

FOREIGN PATENT DOCUMENTS

| | | |
|---|---|---|
| CN | 102123197 A | 7/2011 |
| CN | 102238280 A | 11/2011 |

(Continued)

OTHER PUBLICATIONS

Windows OS "My Network Places" feature as reviewed by mrdrozdaup, dated Feb. 13, 2011, at URL: https://www.youtube.com/watch?v=VdimeqRS-R8&index=3 &list=PLTyOvg0PZFFUdiHprzhplwDWa9mLj2aON.*

(Continued)

*Primary Examiner* — Charles Hicks
*Assistant Examiner* — Charles Zheng
(74) *Attorney, Agent, or Firm* — Birch, Stewart, Kolasch & Birch, LLP

(57) ABSTRACT

A mobile terminal and a method of controlling the same are provided. The mobile terminal shares screens with at least one external electronic device. A capture image of a screen of an electronic device is shared with an external electronic device.

12 Claims, 49 Drawing Sheets

(56) References Cited

U.S. PATENT DOCUMENTS

2011/0296339 A1   12/2011   Kang
2011/0302501 A1*  12/2011   Taguchi ..................... 715/740

FOREIGN PATENT DOCUMENTS

| | | |
|---|---|---|
| CN | 102238281 A | 11/2011 |
| CN | 102262503 A | 11/2011 |
| EP |   2464084 A1 | 6/2012 |

OTHER PUBLICATIONS

Windows OS "Remote Desktop" feature as reviewed by Nizam LZ, dated Sep. 14, 2011, at URL: https://www.youtube.com/watch?v=Tpbg-TOwXeM.*

"Remote Screenshot of Networked Computer", youtube video by Bostedor, URL: https://www.youtube.com/watch?v=QEG_DmPN7DI, dated on Oct. 3, 2006.*

* cited by examiner

Fig. 4A
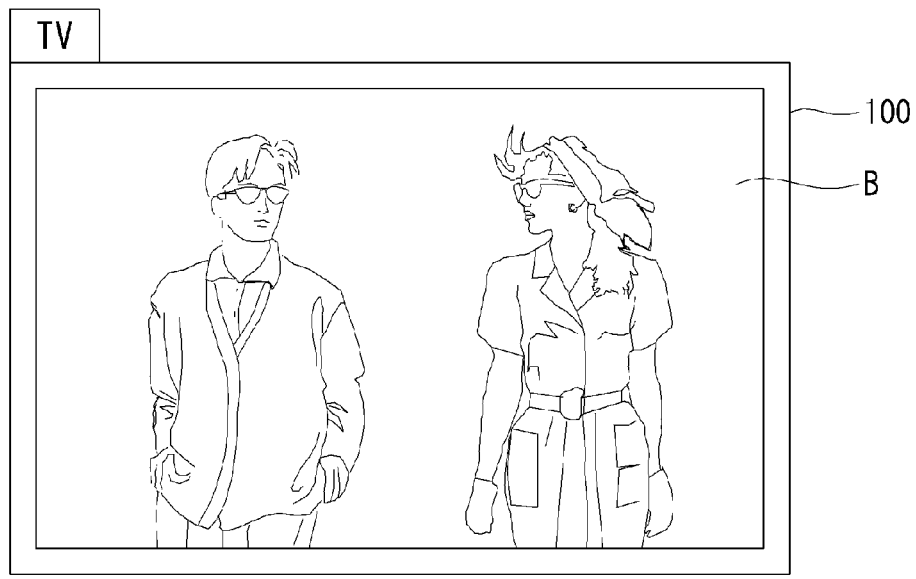
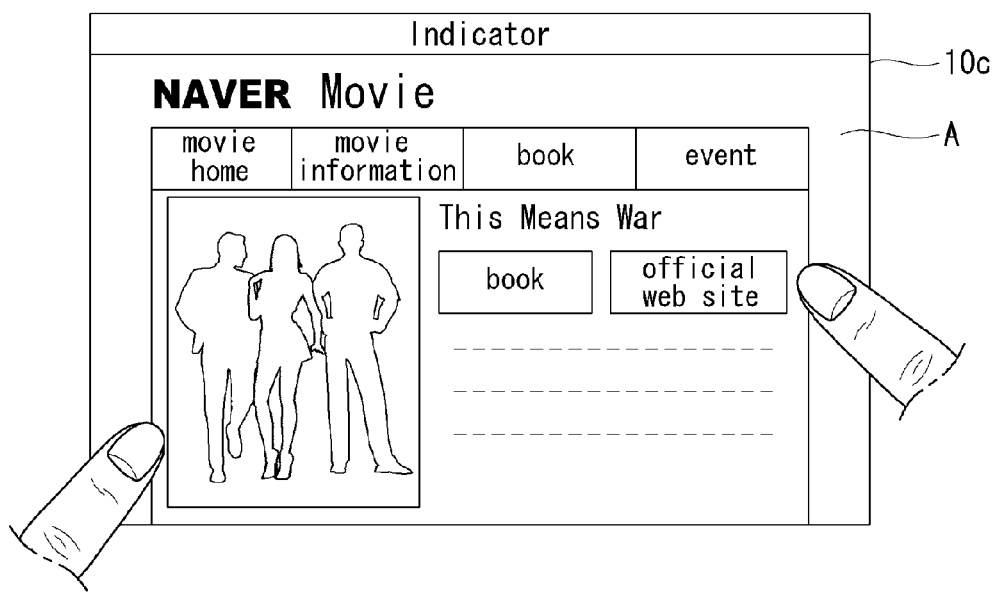

Fig. 4B
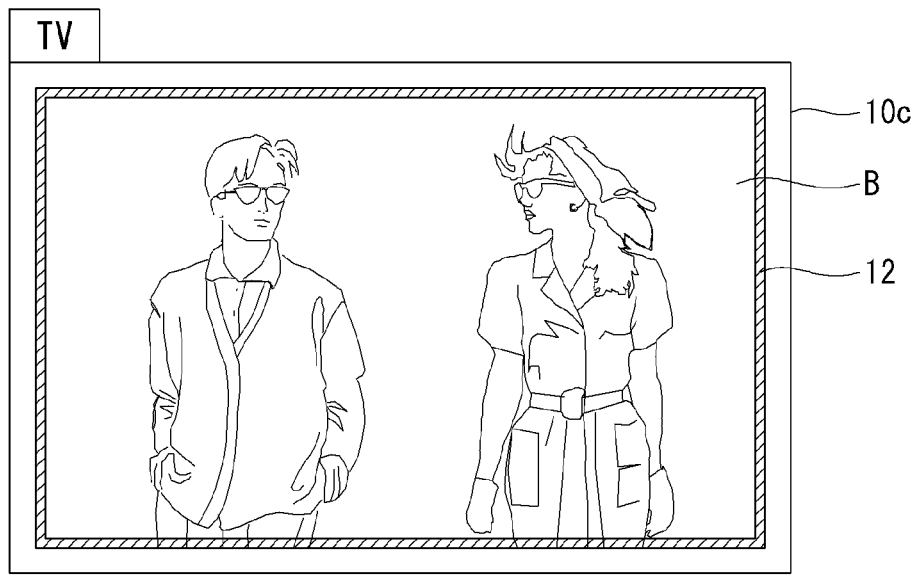
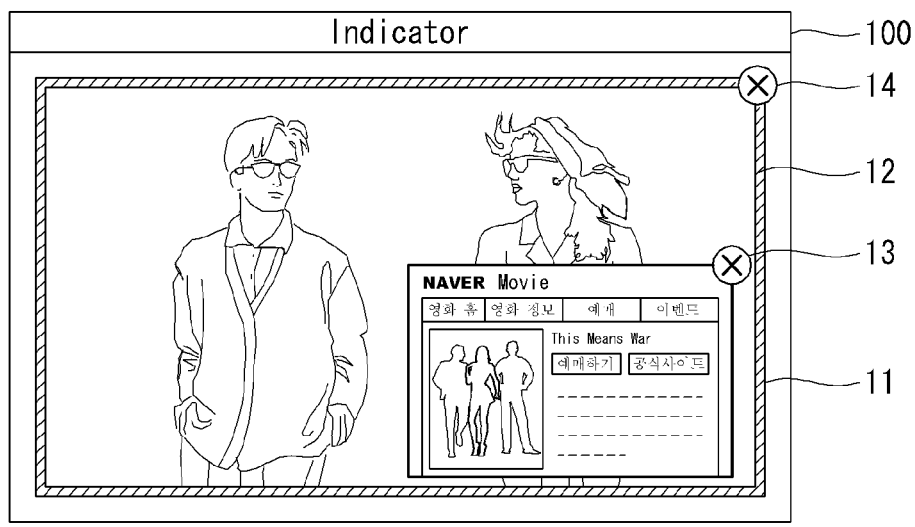

Fig. 8
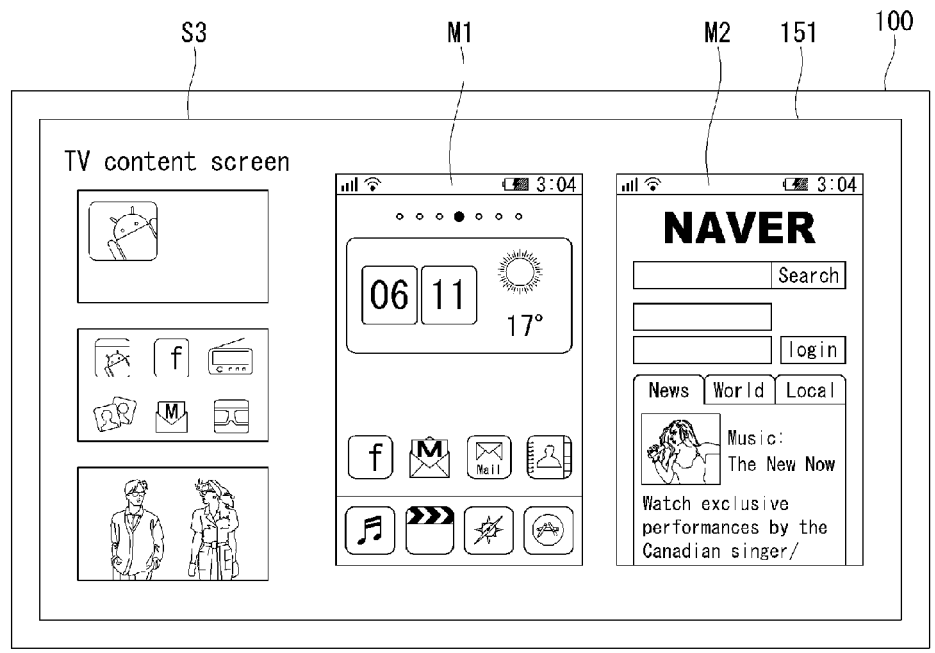
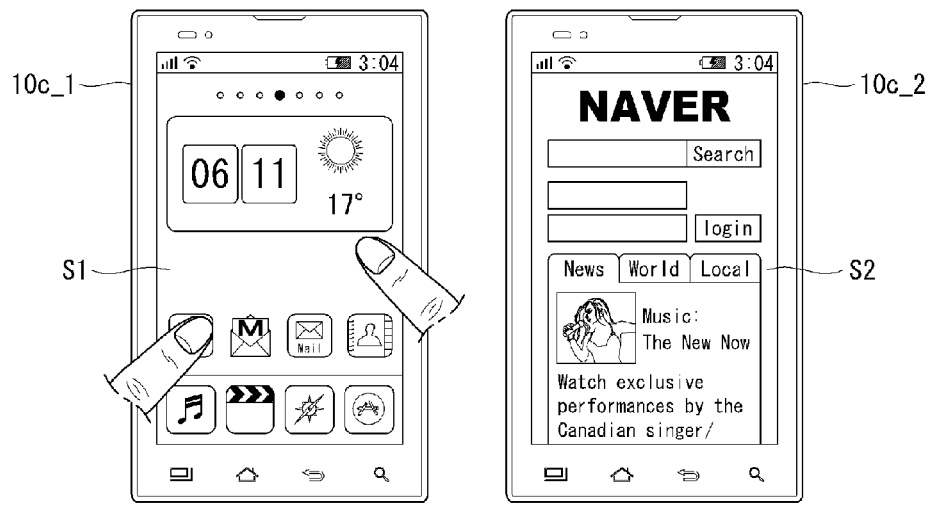

Fig. 10A
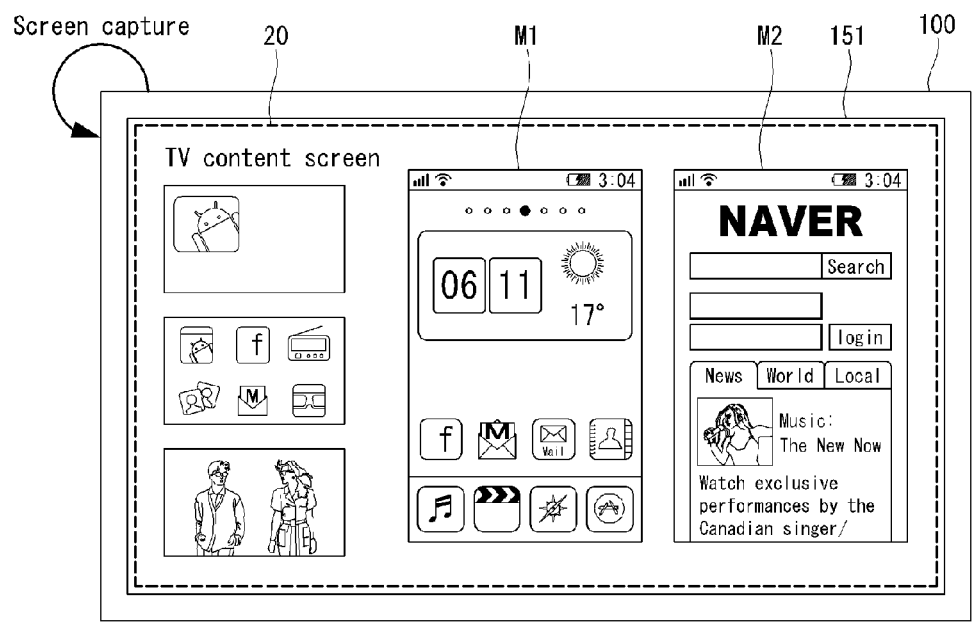
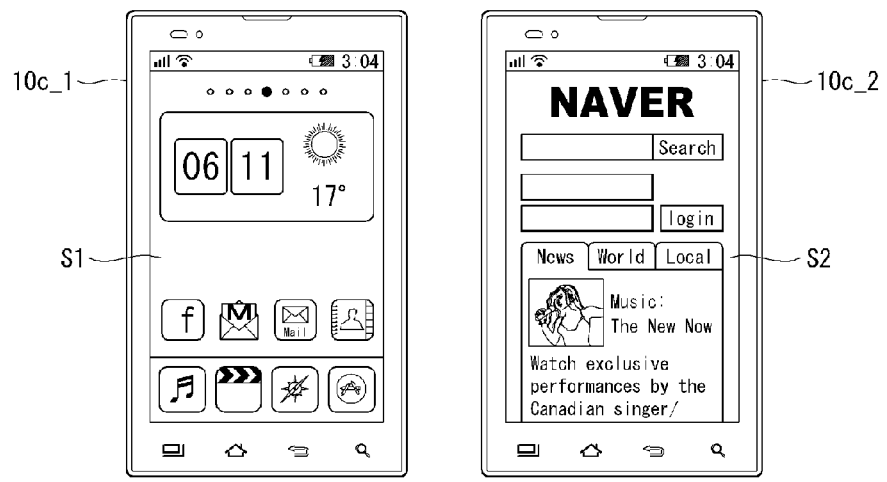

Fig. 11
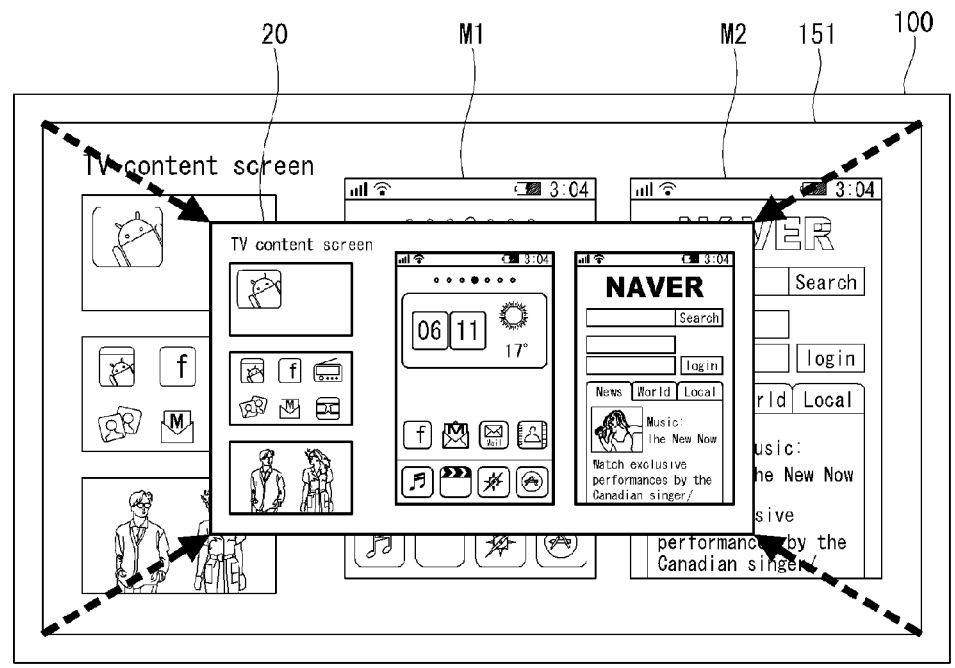
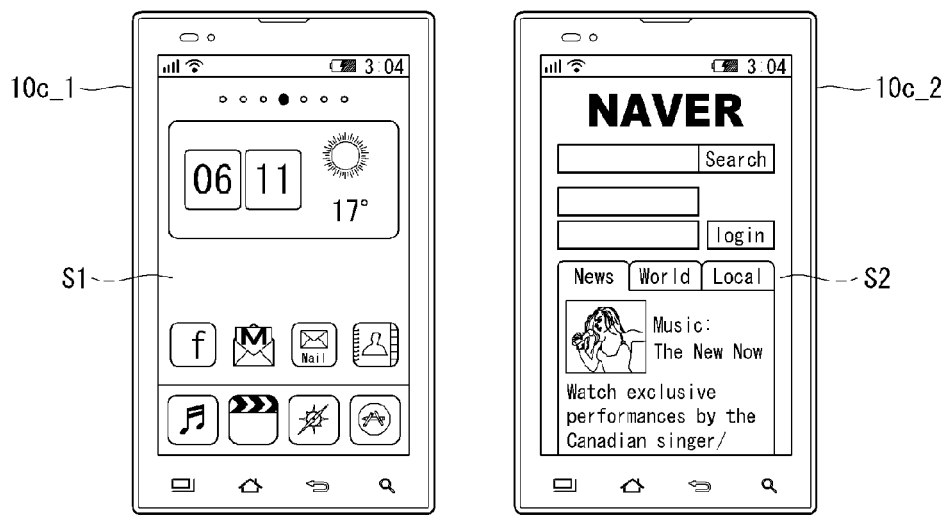

Fig. 12B
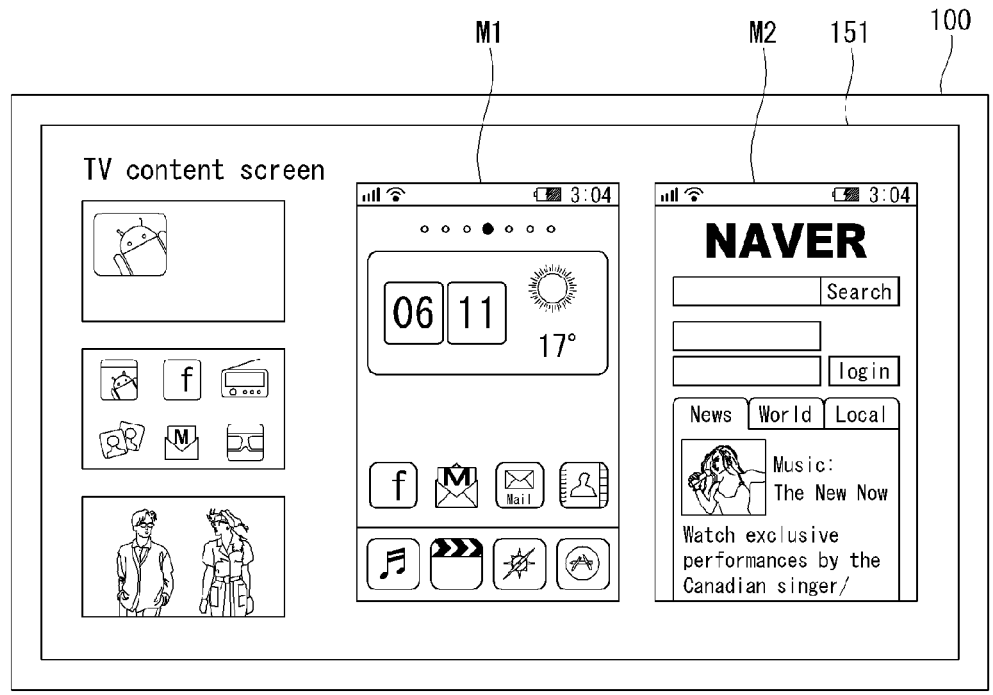
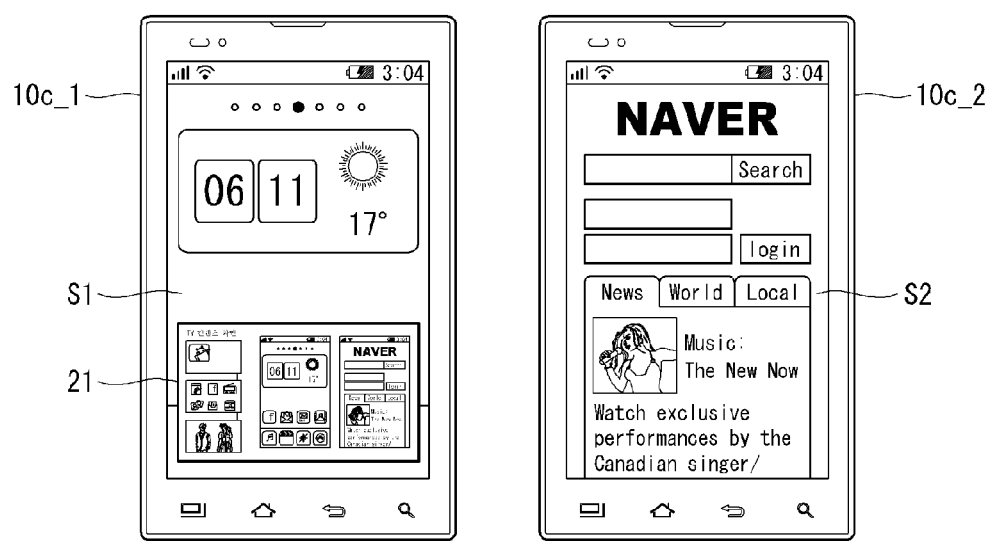

Fig. 12D
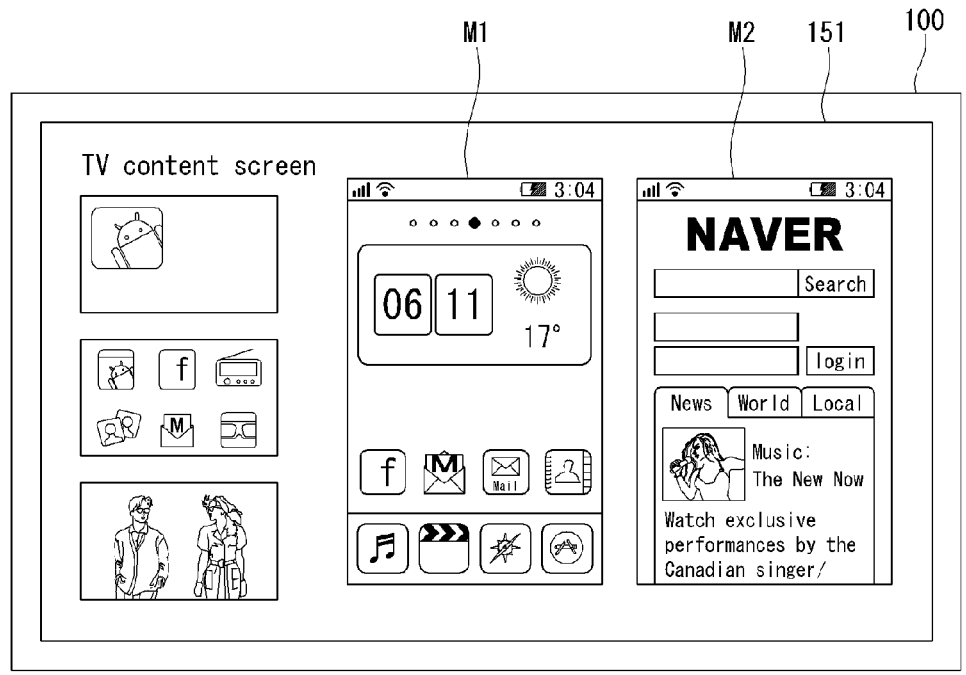
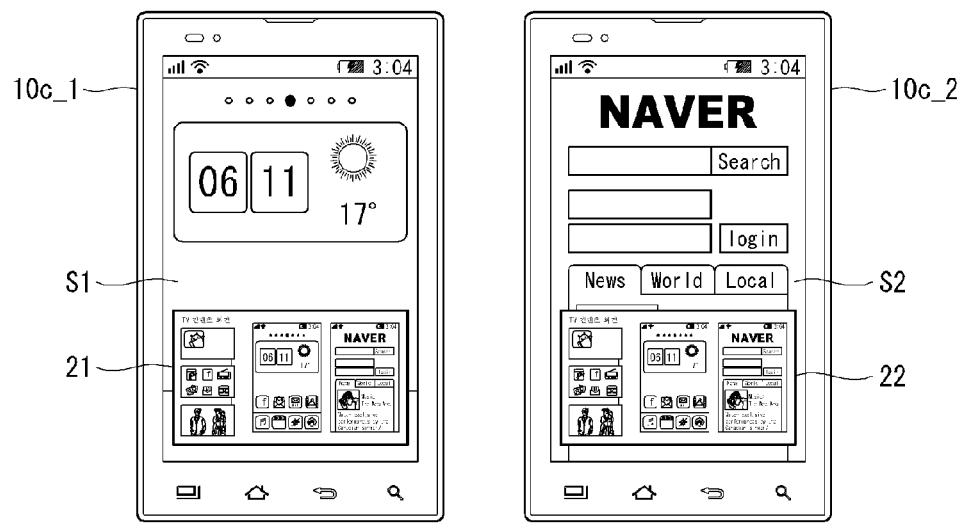

Fig. 13A
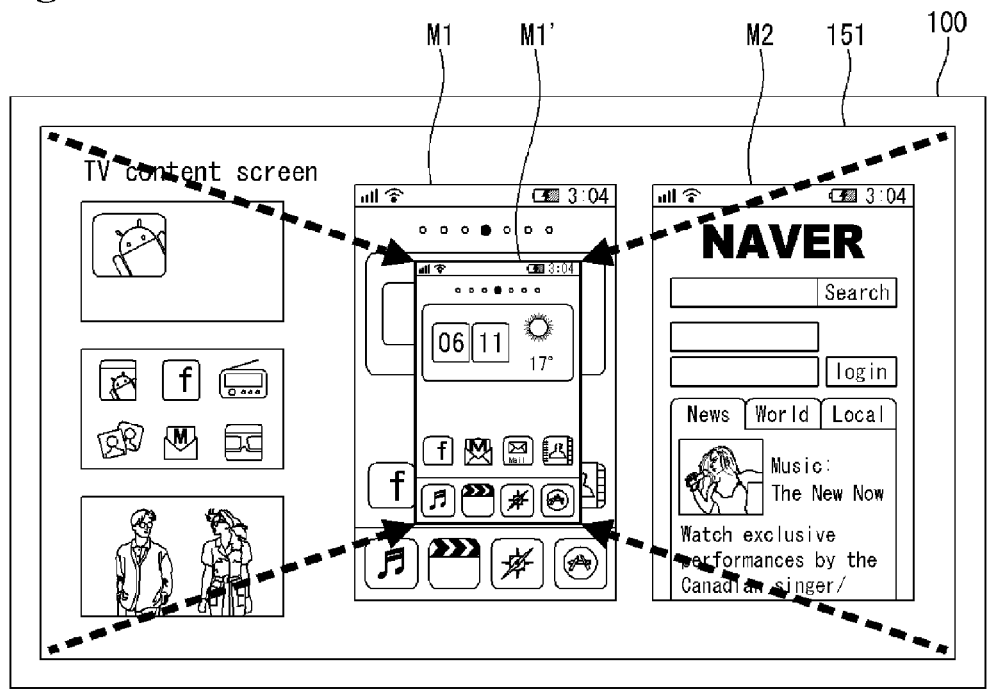
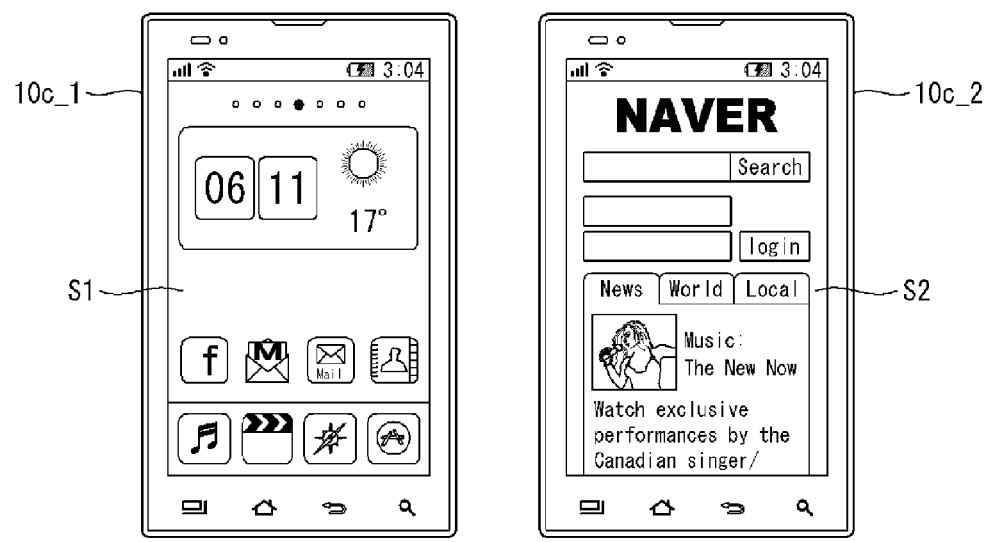

Fig.14A
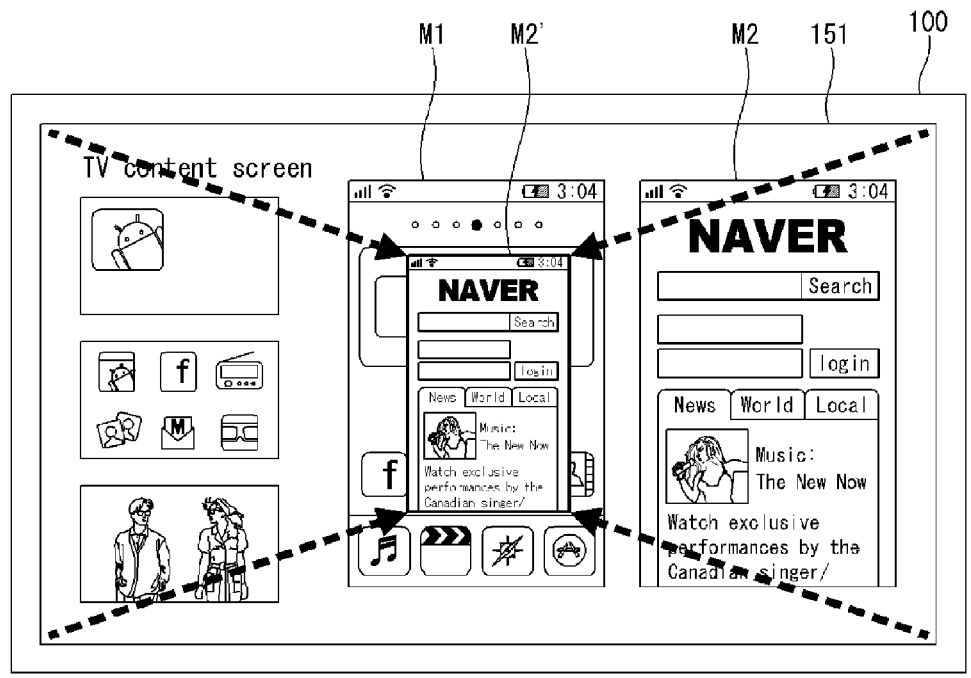
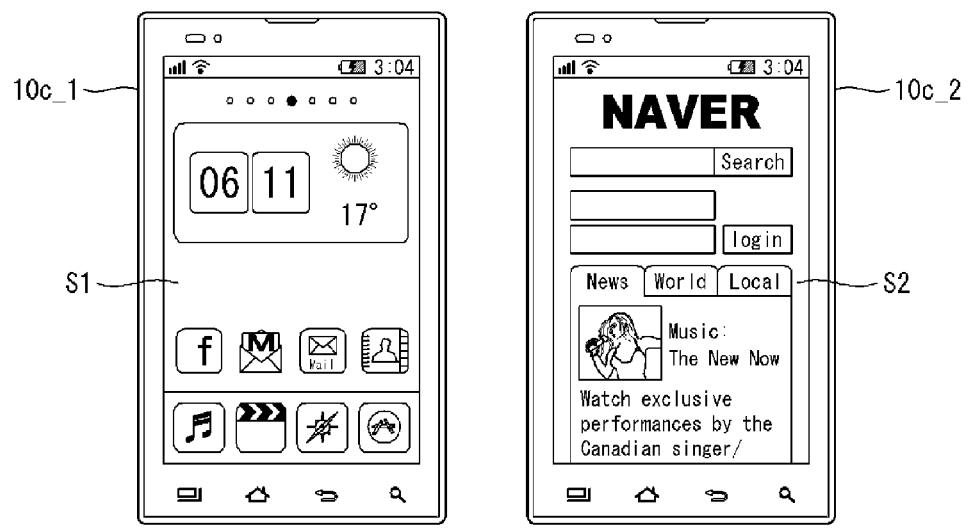

Fig. 15
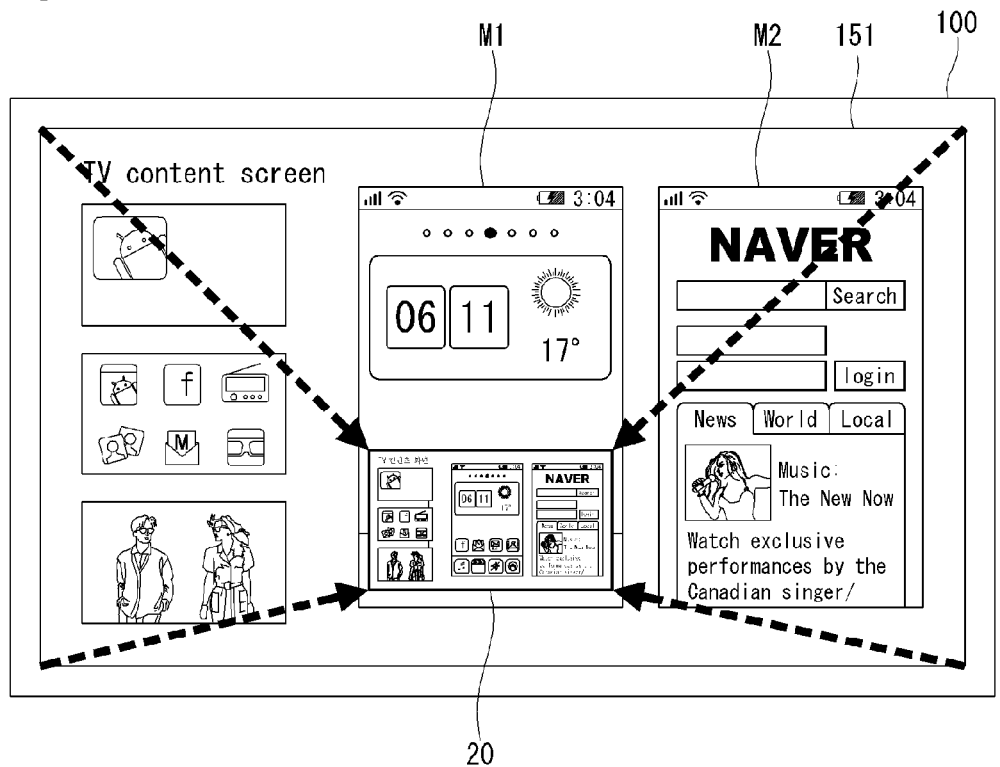
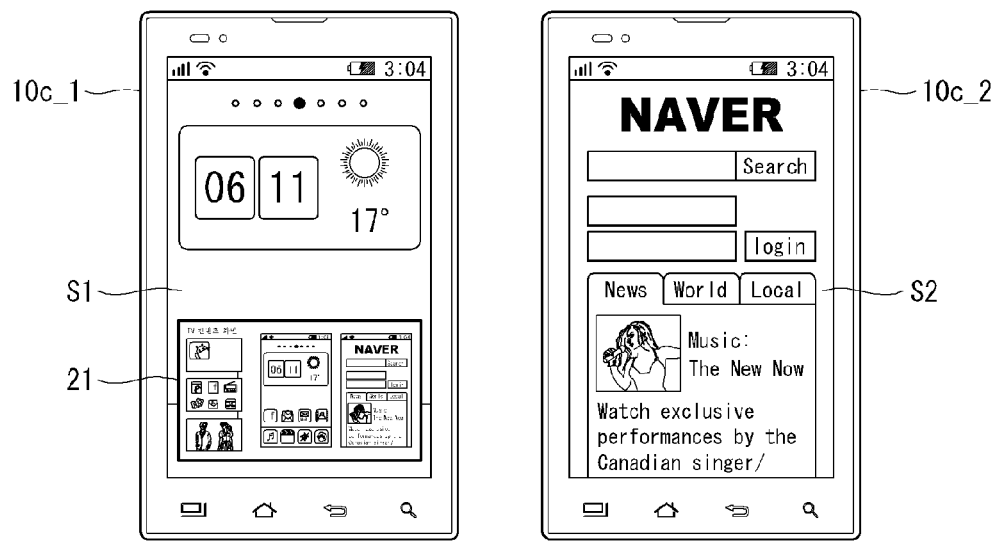

Fig. 16
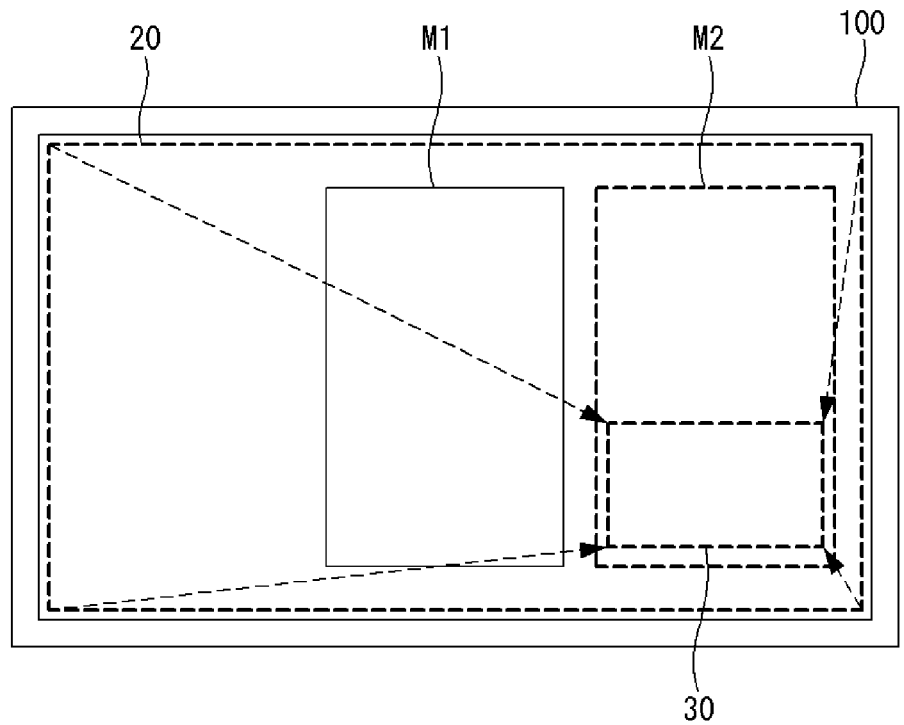
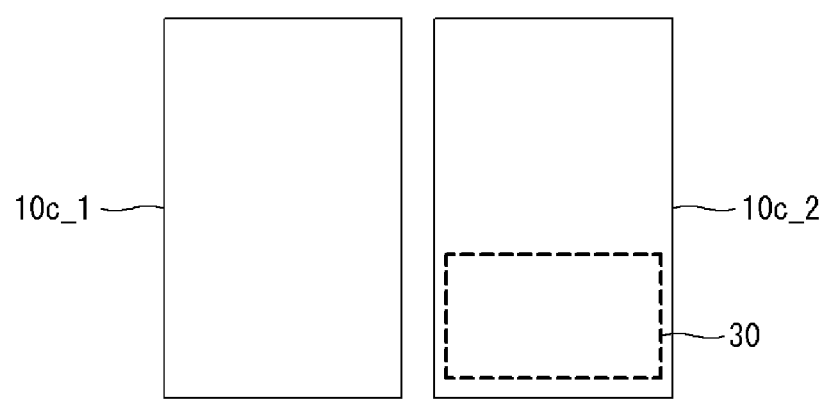

Fig. 17
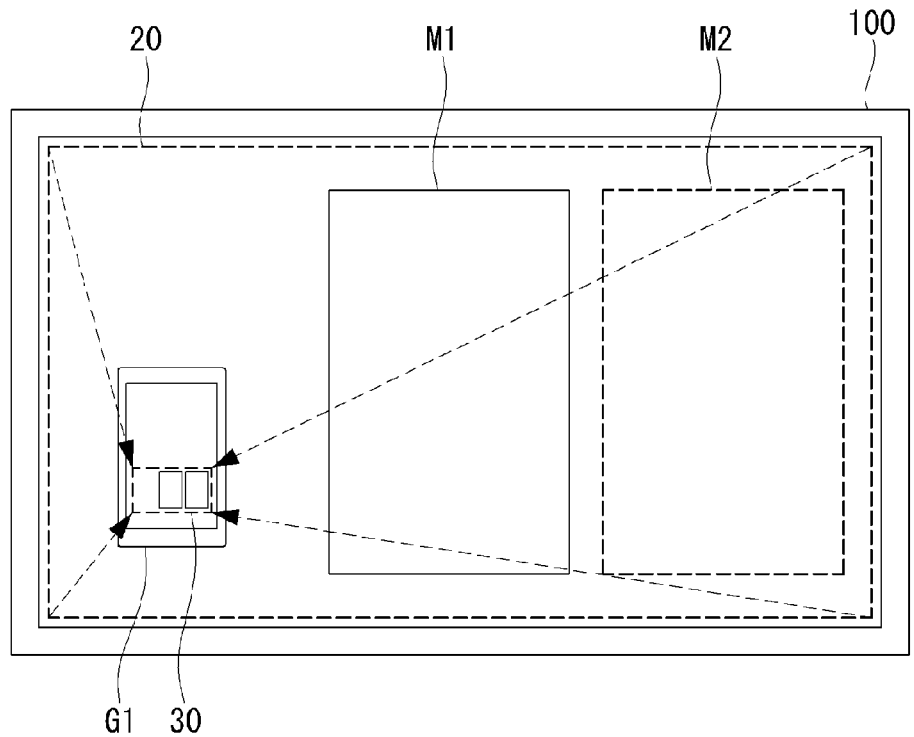
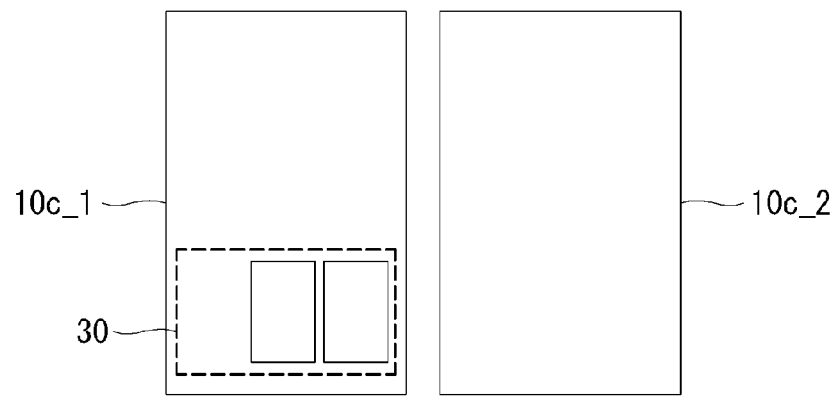

Fig. 18
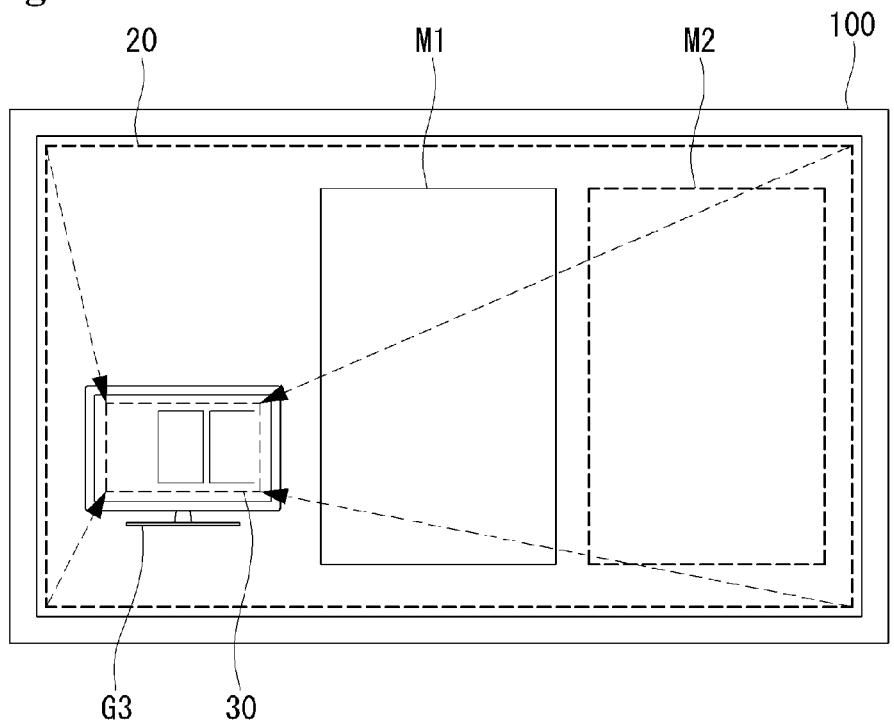
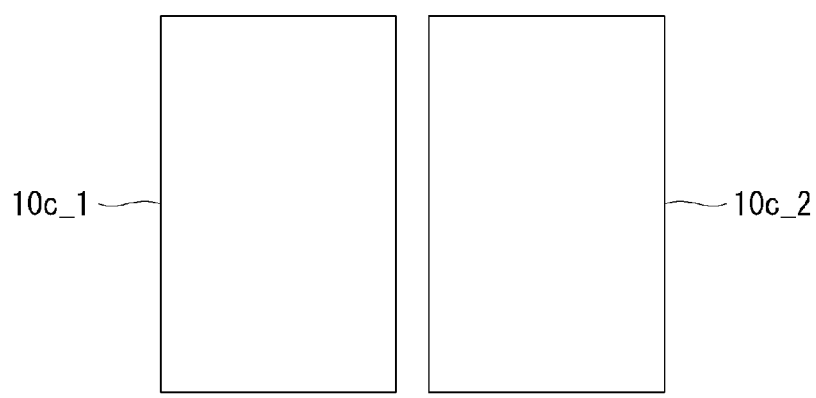

Fig. 23
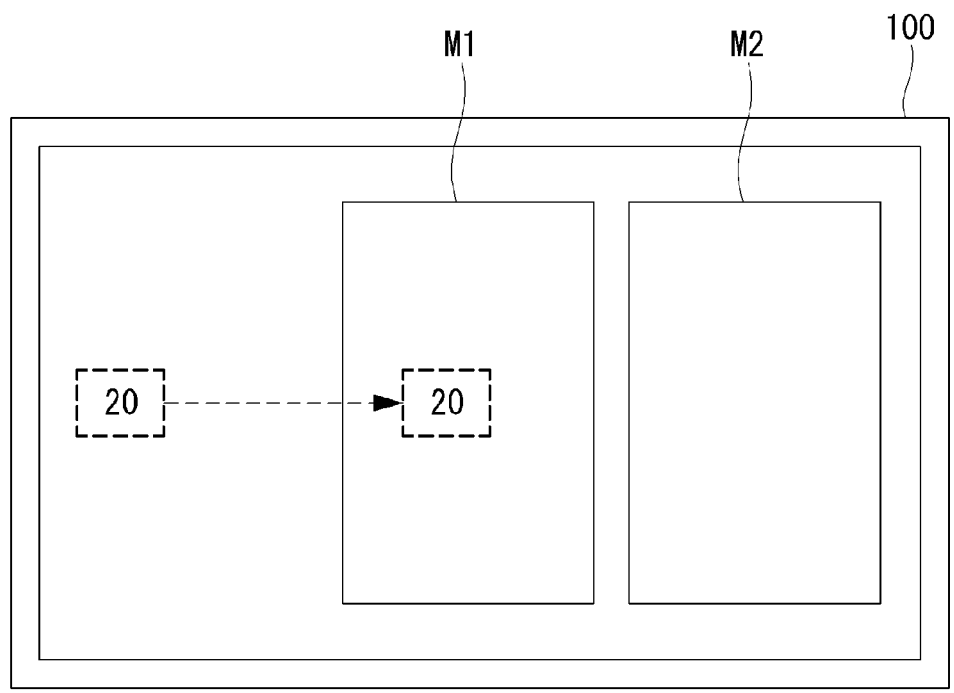
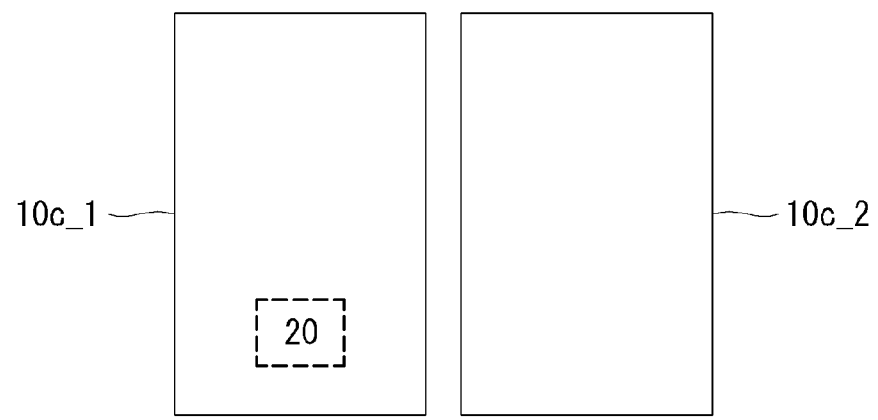

Fig. 24
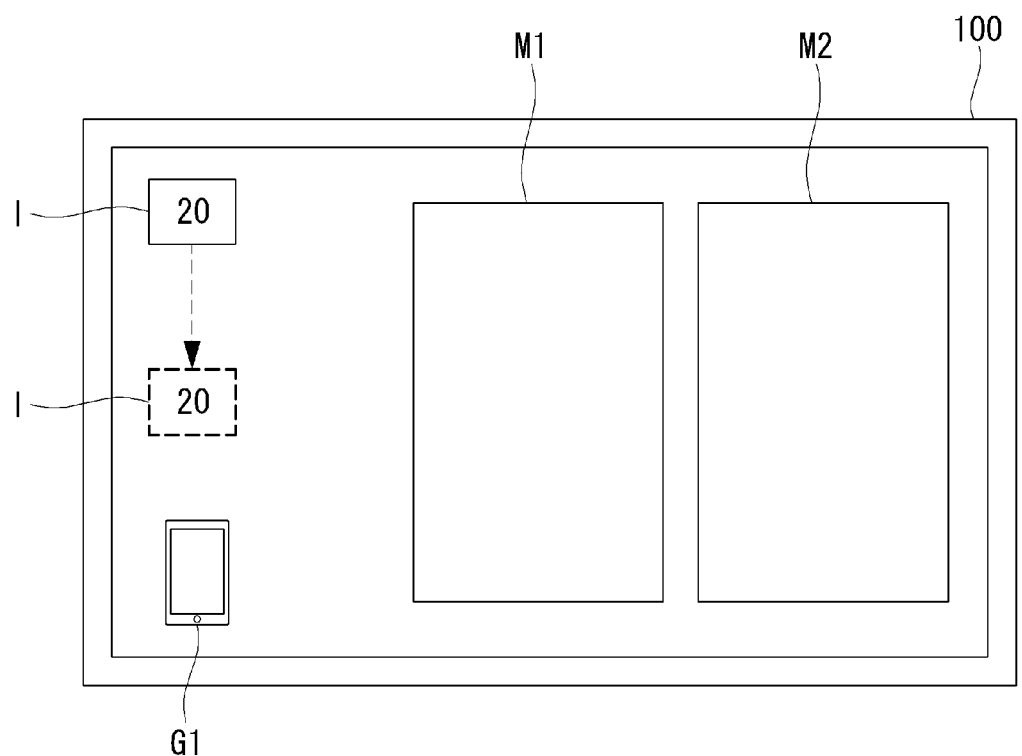
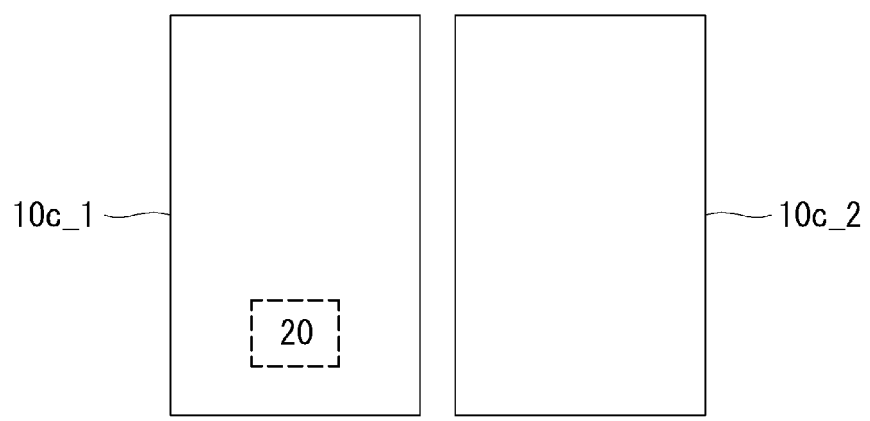

selected screen

Fig. 31
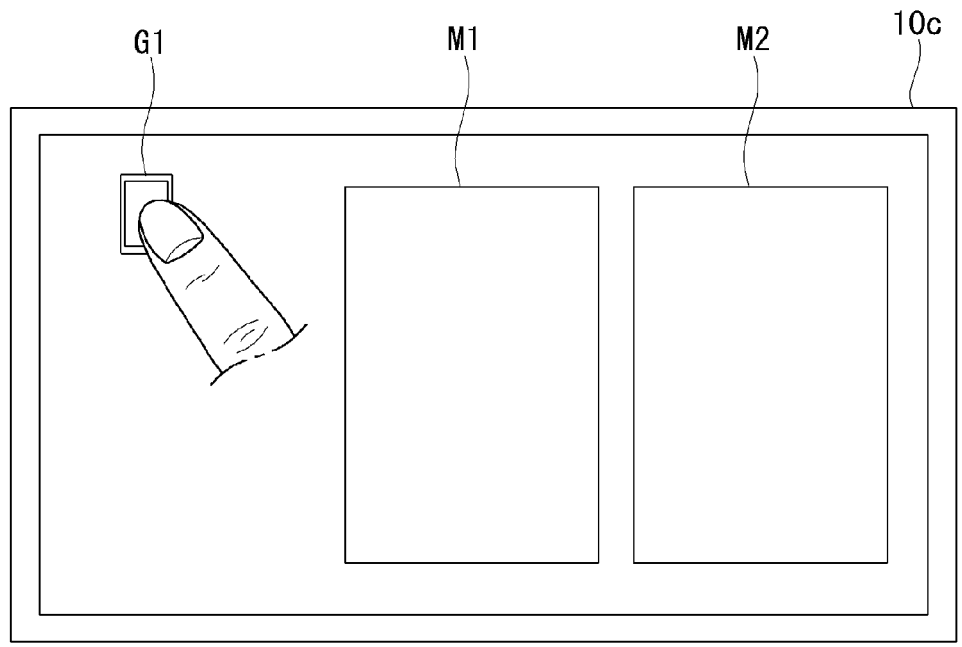
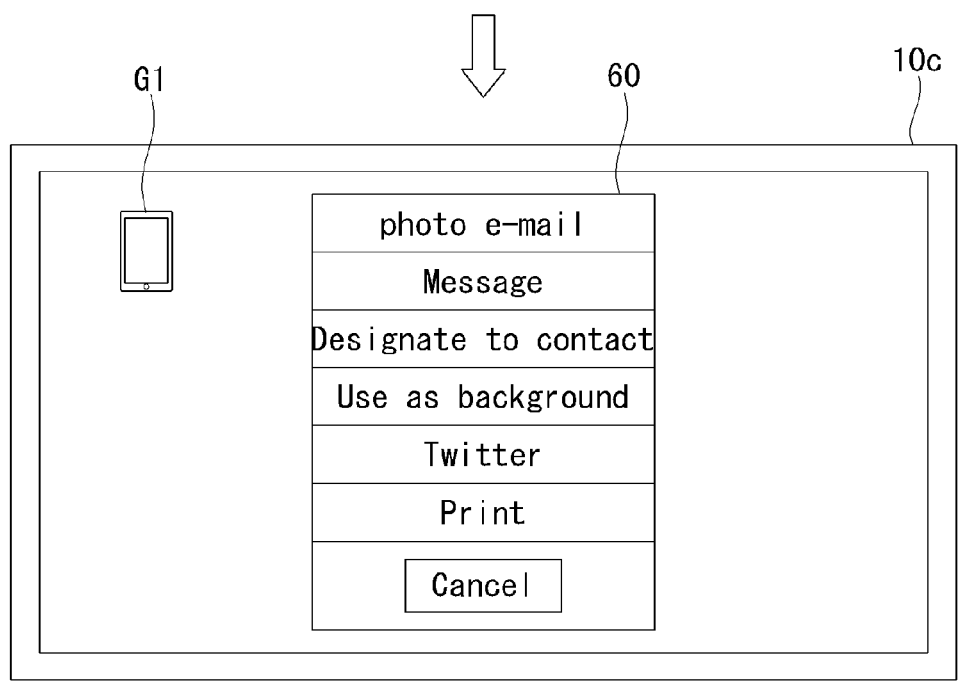

Fig. 35
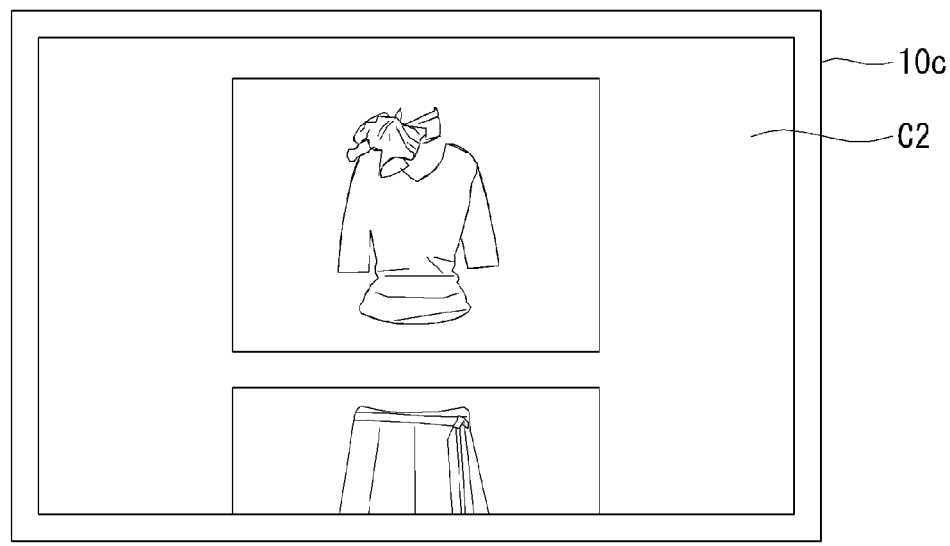
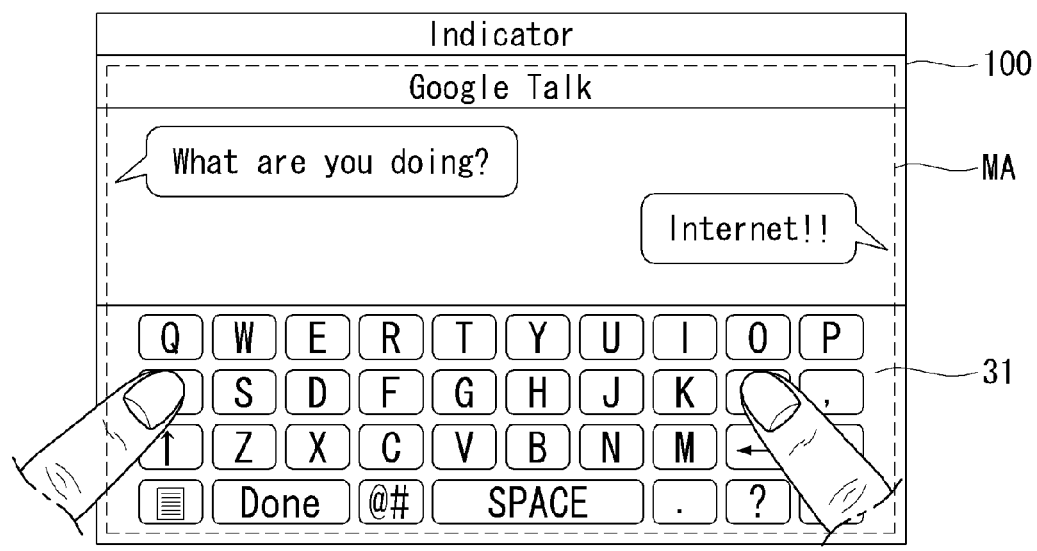

Fig. 36
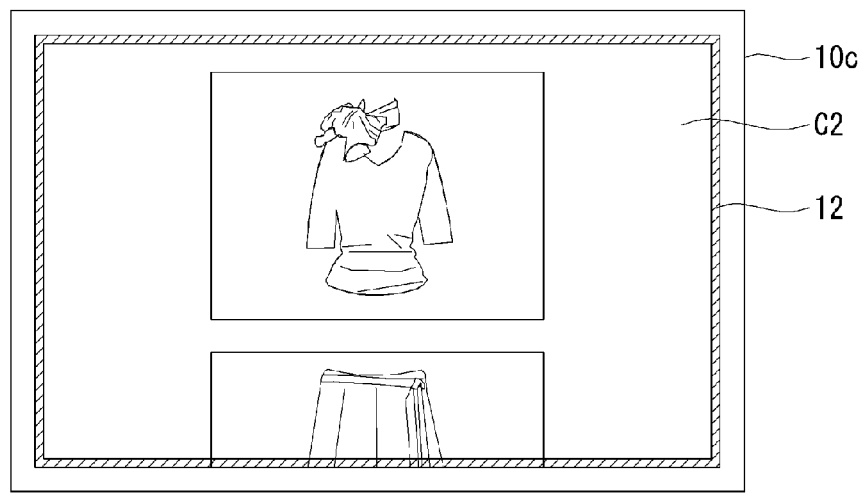
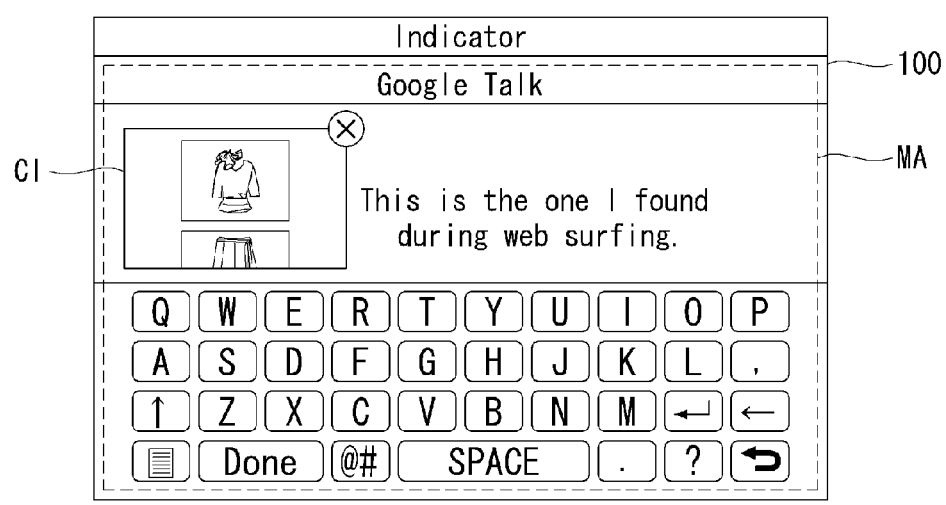

Fig. 37
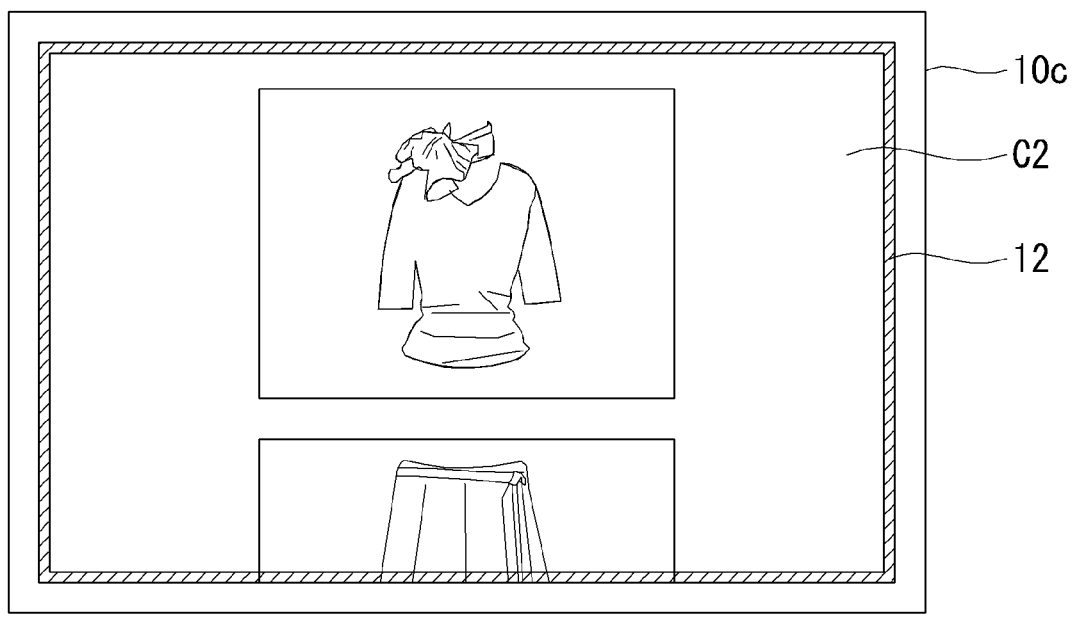
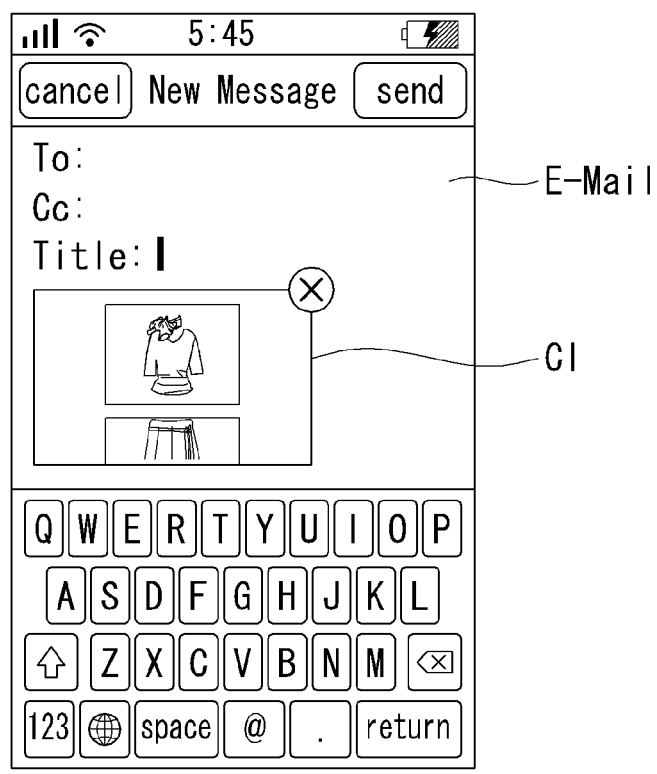

Fig. 38
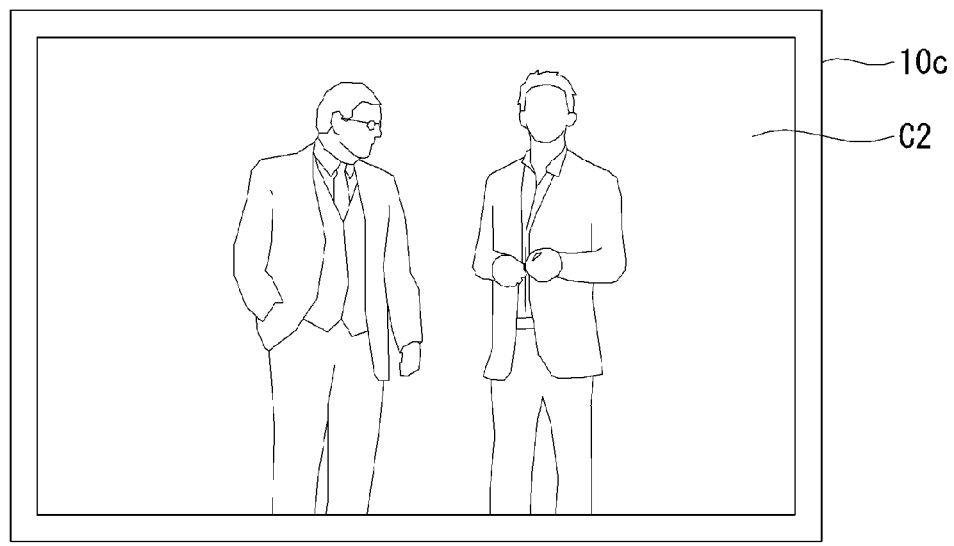
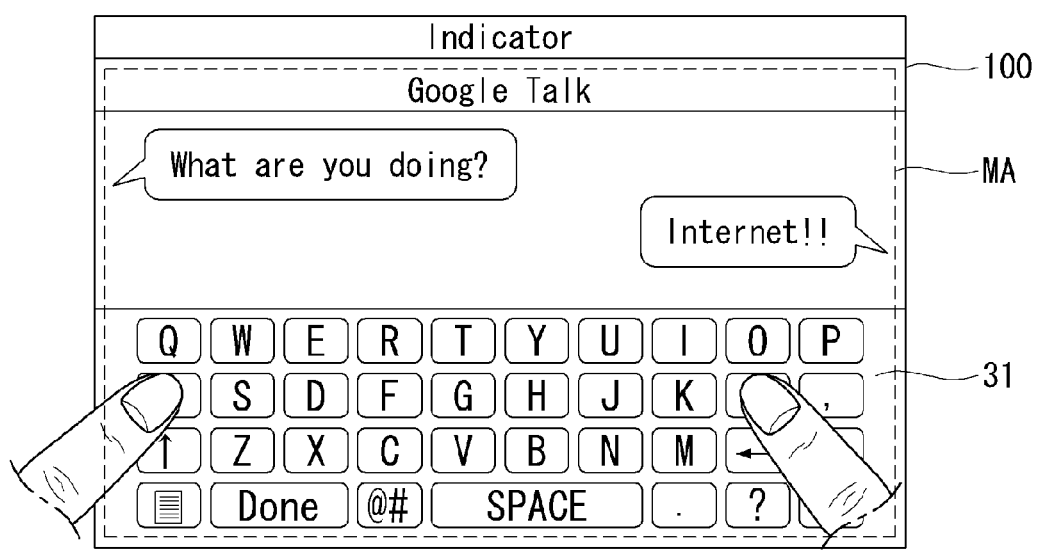

Fig. 39
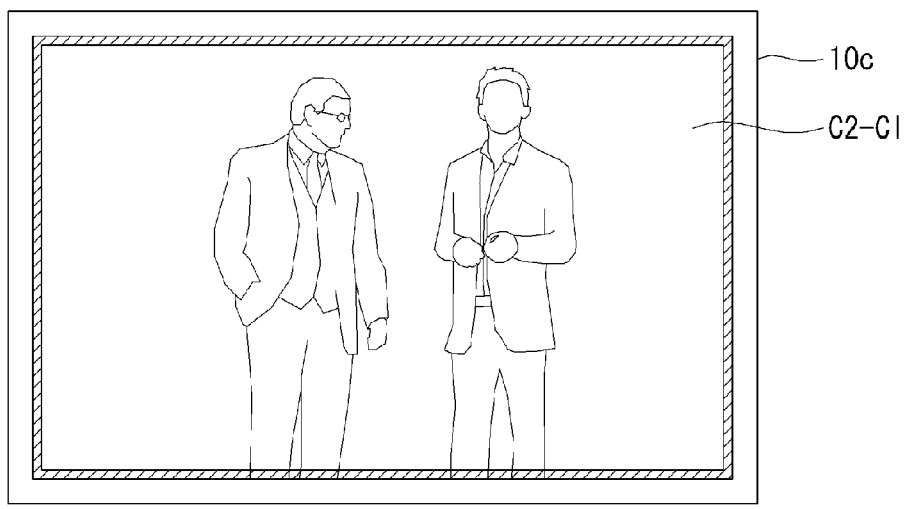
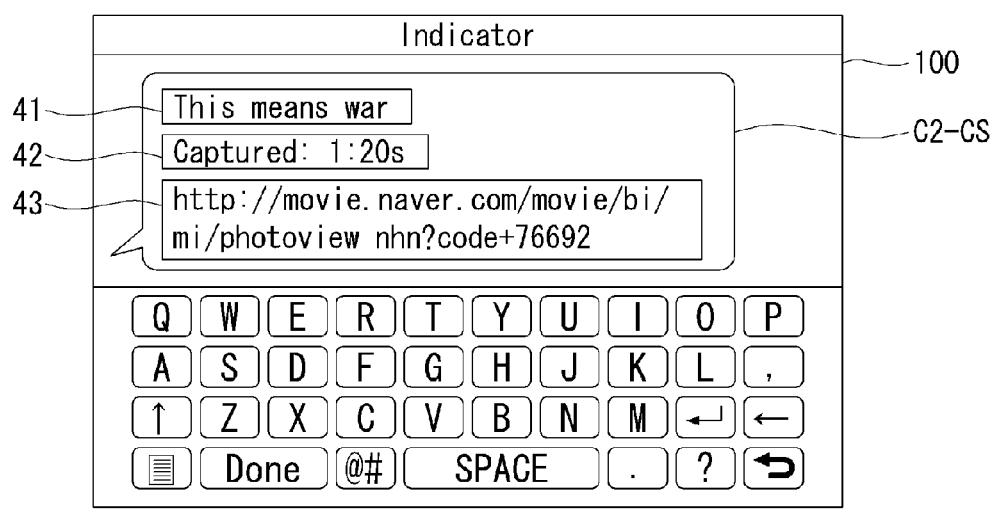

MOBILE TERMINAL AND METHOD OF CONTROLLING THE SAME FOR SCREEN CAPTURE

CROSS-REFERENCE TO RELATED APPLICATIONS

Pursuant to 35 U.S.C. §119(a), this application claims the benefit of earlier filing date and right of priority to Korean Patent Applications No. 10-2012-0070773, filed on 29 Jun. 2012, No. 10-2012-0076796, filed on 13 Jul. 2012, the contents of which are incorporated by reference herein in their entirety.

FIELD OF THE INVENTION

The present invention relates to an electronic device and a method of controlling the same.

RELATED ART

With remarkable development of hardware and software technologies related to various electronic devices including mobile terminals, the mobile terminals can provide or store a variety of functions and information. These various functions and information are provided in the form of an application in general.

As services provided by the mobile terminals are diversified, researches on convenient use of a user interface of a mobile terminal are carried out. Particularly, various services make a user interface structure complicated, and thus methods by which a desired item of a user can be directly selected are needed.

As mobile terminals evolve into smart devices, technical standards by which users easily share and execute a link service between devices are established.

DLNA is a standard by which a user can easily perform linkage between devices in a home network and is applied to a smart TV, a smart-phone, a tablet PC, a notebook PC, an audio system etc. as an essential element.

Accordingly, it is necessary to provide a seamless service capable of using user experience among various smart screens according to development of smart devices and content infrastructures.

SUMMARY OF THE INVENTION

An object of the present invention is to provide an electronic device and a method of controlling the same to easily identify a capture request device, a capture image and a device that stores the capture image when screens of an electronic device and an external electronic device are simultaneously captured in an environment in which the electronic device and the external electronic device share the screens.

An object of the present invention is to provided a mobile terminal and a method of controlling the same to easily link a capture image of a screen of an external device to an item executed in the mobile terminal according to a simple operation of the mobile terminal in an environment in which the mobile terminal and the external device share the screens thereof.

According to an aspect of the present invention, an electronic device includes: a memory; a display unit; a communication unit configured to communicate with one or more external electronic devices; and a controller configured to share screens with the external electronic devices through the communication unit, to capture a screen displayed on the display unit when a screen capture signal instructing the screen displayed on the display unit to be captured is received, and to store the capture image in the memory and at least one of the external electronic devices.

The controller may display related images respectively corresponding to the screens of the external electronic devices, and the capture image may include the related images.

The related images may respectively include images respectively mirroring the screens of the external electronic devices.

The controller may receive the screen capture signal from one of the external electronic devices through the communication unit.

When animation of moving the capture image to a predetermined area of the display unit is displayed, the controller may control the capture image to be stored in the electronic device or a device corresponding to the area to which the capture image is moved from among the external electronic devices.

The predetermined area may include at least one of a first area in which at least one of the mirror images is displayed, a second area in which at least one of a graphical object corresponding to the electronic device and graphical objects corresponding to the external electronic devices is displayed, and a third area other than the first and second areas on the screen.

The animation may include a motion of scaling down the capture image to an icon having a predetermined size and moving the icon to the predetermined area.

When the screen capture signal is received while a video is played on the display unit, the controller may scale down the capture image to an icon having a predetermined size and display the icon on a screen of an external device that transmits the screen capture signal.

The predetermined area may be a graphical object corresponding to the electronic device or at least one of the external electronic devices, and the controller may display a graphical object that animates the capture image for a predetermined time.

When an input predetermined for the graphical object is received, a preview image with respect to the capture image may be displayed on the display unit.

When a plurality of capture images is present, the capture images may be displayed on the display unit.

When an input predetermined for the graphical object is received, the controller may display a menu window for sharing the capture image on the display unit.

The display unit may include a touch screen and, when a drag input for moving the graphical object to one of the mirror images is applied to the touch screen, the controller may control the capture image to be shared with an external electronic device corresponding to the dragged mirror image.

According to another aspect of the present invention, an electronic device displaying a related image corresponding to a screen of an external electronic device on a display unit includes: a communication unit configured to communicate with the external electronic device; and a controller configured to capture a screen displayed on the display unit when a screen capture signal is received from the external electronic device while the electronic device and the external electronic device share screens thereof through the communication unit, and to transmit the capture image to the external electronic device corresponding to the related image when animation of moving the capture image to the related image is displayed.

According to an other aspect of the present invention, an electronic device displaying a related image corresponding to a screen of at least one external electronic device on a display unit includes: a communication unit configured to communicate with the at least one external electronic device; and a controller configured to capture a screen displayed on the display unit when a screen capture signal is received from the at least one external electronic device while the electronic device and the external electronic device share screens thereof through the communication unit, and to transmit the capture image to an external electronic device corresponding to a predetermined graphical object when animation of moving the capture image to the graphical object displayed, wherein the graphical object is a graphical object corresponding to the at least one external electronic device or a graphical object corresponding to the electronic device.

According to an other aspect of the present invention, a method of controlling an electronic device includes: sharing screens with one or more external electronic devices through a communication unit; receiving a screen capture signal instructing a screen displayed on a display unit to be captured; and capturing the screen and storing the capture image in a memory and at least one of the external electronic devices.

According to an other aspect of the present invention, a method of controlling an electronic device includes: sharing screens with one or more external electronic devices; displaying related images respectively corresponding to the screens of the external electronic devices on a display unit; receiving a screen capture signal from one of the external electronic devices, capturing a screen displayed on the display unit; and storing the capture image in the electronic device and at least one of the external electronic devices.

According to another aspect of the present invention, a mobile terminal includes: a display unit for displaying a first item execution screen; a communication unit for communicating with an external electronic device that displays a second item execution screen; and a controller configured to associate a capture image of the second item execution screen with execution of the first item when a predetermined input is received while the mobile terminal is connected to the external electronic device through the communication unit.

The first item may include a messenger application, and the predetermined input may include an input for capturing a screen during execution of the messenger application.

The controller may receive a message input according to execution of the messenger application and automatically attach the capture image to the message input.

If the second item is content to which DRM (Digital Rights Management) is applied, the capture image may be source information about the second item.

The source information about the second item may include the title of the second item and capture time information.

The mobile terminal may further include a memory, and the controller may store the capture image in the memory when the capture image is associated with execution of the first item.

The second item may include at least one of a web browser, application and multimedia content.

According to another aspect of the present invention, a mobile terminal includes: a communication unit for communicating with an external electronic device; a display unit for displaying a messenger application execution screen when a messenger application is executed; and a controller configured to capture a screen of the external electronic device and automatically attach the capture image to a message input when a predetermined input is received while the mobile terminal is connected to the external electronic device through the communication unit.

According to another aspect of the present invention, a method of controlling a mobile terminal includes: displaying a first item execution screen on a display unit; receiving a predetermined input while the mobile terminal is connected to an external electronic device that displays a second item execution screen through a communication unit; and associating capture data corresponding to the second item execution screen with execution of the first item.

According to another aspect of the present invention, a mobile terminal includes: a memory; a communication unit; a display unit; and a controller configured to receive a message including content execution information from an external device through the communication unit, to execute corresponding content base on the content execution information when the content is stored in the memory, and to display a web page for searching for the content on the display unit when the content is not stored in the memory.

According to another aspect of the present invention, a system includes: a first external device that executes content and captures a content execution screen; a second external device that shares screens with the first external device through a network and receives capture data corresponding to the content execution screen from the first external device; and a mobile terminal that receives a message including content execution information from the second external device, executes the content based on the content execution information when the content is stored in a memory and accesses a web page for searching for the content when the content is not stored in the memory.

Details of other embodiments are illustrated in the following detailed description and drawings.

BRIEF DESCRIPTION OF THE DRAWINGS

The accompanying drawings, which are included to provide a further understanding of described embodiments of the present invention and are incorporated in and constitute a part of this specification, illustrate embodiments of the present invention and together with the description serve to explain aspects and features of the present invention.

FIGS. 4A and 4B illustrates an operation of a multi-screen device to perform capture of the multi-screen device in a multi-screen environment.

FIG. 8 is a diagram for explaining the method of controlling an electronic device, shown in FIG. 7.

FIGS. 10A to 24 are diagrams for explaining the first embodiment of the present invention.

FIGS. 31 and 32 are diagrams for explaining the fourth embodiment of the present invention.

FIGS. 35 to 37 are diagrams for explaining the embodiment shown in FIG. 34.

FIGS. 38 and 39 are diagrams for explaining an operation of a mobile terminal according to an embodiment of the present invention when an external electronic device that shares screens with the mobile terminal executes content to which DRM is applied.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
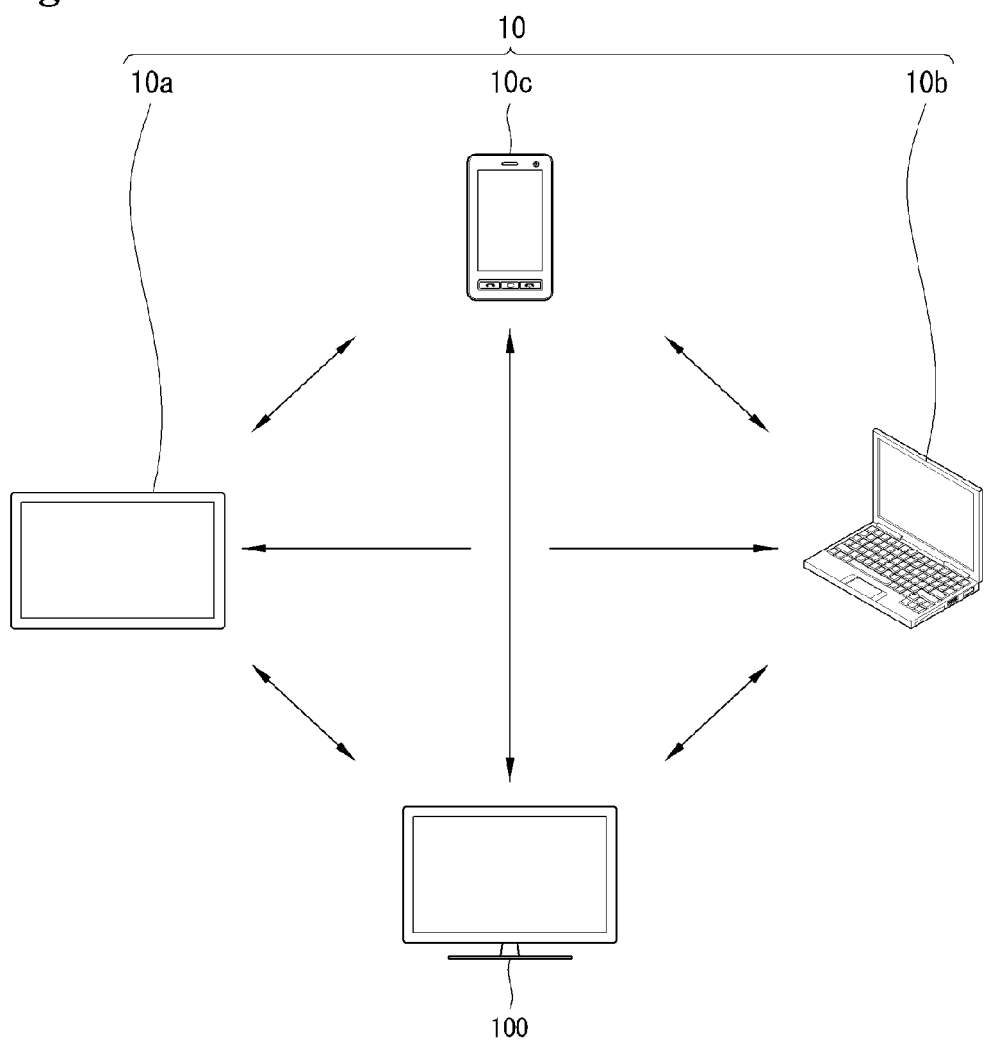
FIGS. 1 and 2 are schematic diagrams showing system environments to which the invention applies.
Figure 2:
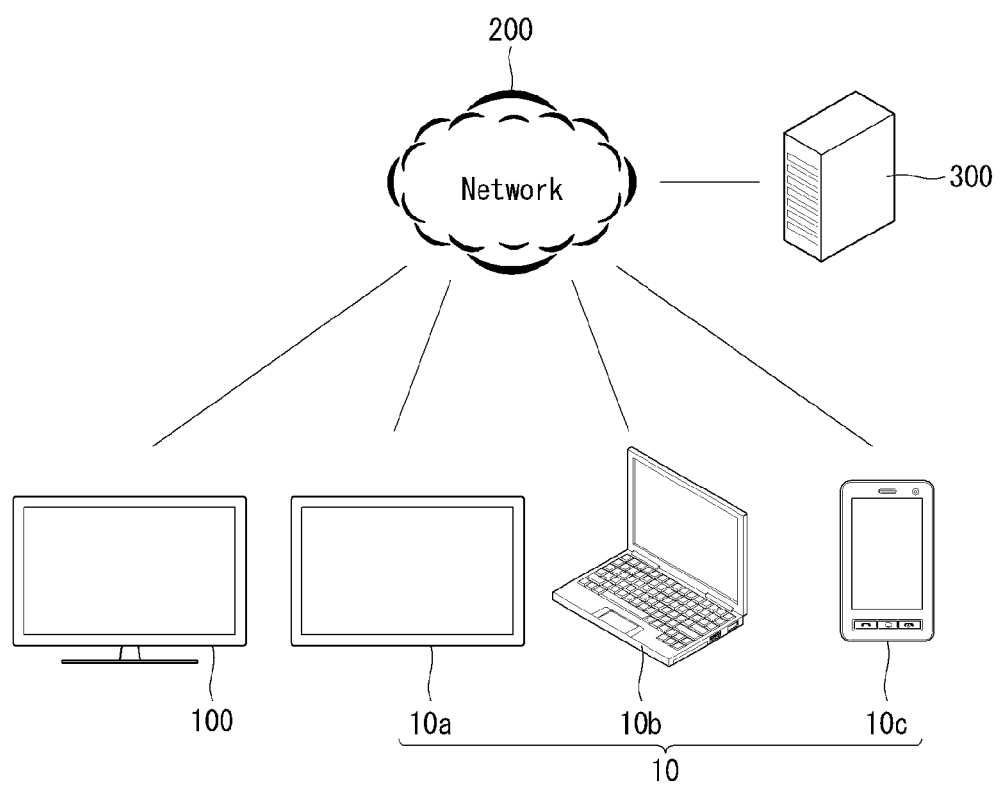

FIGS. 1 and 2 are schematic diagrams showing system environments to which the invention applies. Referring to FIGS. 1 and 2, the system environment to which the invention applies may include an electronic device 100 according to an embodiment of the invention, external electronic devices 10 separate from the electronic device 100, a network 200, and a server 300 existing on the network 200. The external electronic devices 10 may include a first external electronic device 10a, a second external electronic device 10b and a third external electronic device 10c. The electronic device 100 and the external electronic devices 10, as shown in FIG. 1, can communicate with each other through a wireless or wired communication method.

Communication between the electronic device 100 and the external electronic devices 10 is not limited to a specific method. This invention may be applied to all existing wireless communication methods between electronic devices and all future communication methods.

For example, the electronic device 100 and the external electronic devices 10 can communicate with each other according to known communication methods, such as UPnP®, DLNA® and WiFi®. Furthermore, for example, the electronic device 100 and the external electronic devices 10 can communicate with each other via a short-range communication method.

As shown in FIG. 2, each of the electronic device 100 and the external electronic devices 10 can communicate over a network 200. For example, the electronic device 100 and the external electronic devices 10 can receive multimedia content from a server 300 existing on the network 200. The network 200 includes, for example, a mobile communication network, wired Internet, wireless Internet or a broadcasting network.

The electronic device 100 and the external electronic devices 10 may be fixed terminals or mobile terminals. For example, any of the electronic device 100 and the external electronic devices 10 can comprise a portable phone, a smart phone, a personal computer, a laptop computer, a terminal for digital broadcasting, a Personal Digital Assistants (PDA), a Portable Multimedia Player (PMP), a navigator, or a Mobile Internet Device (MID).

Figure 3:
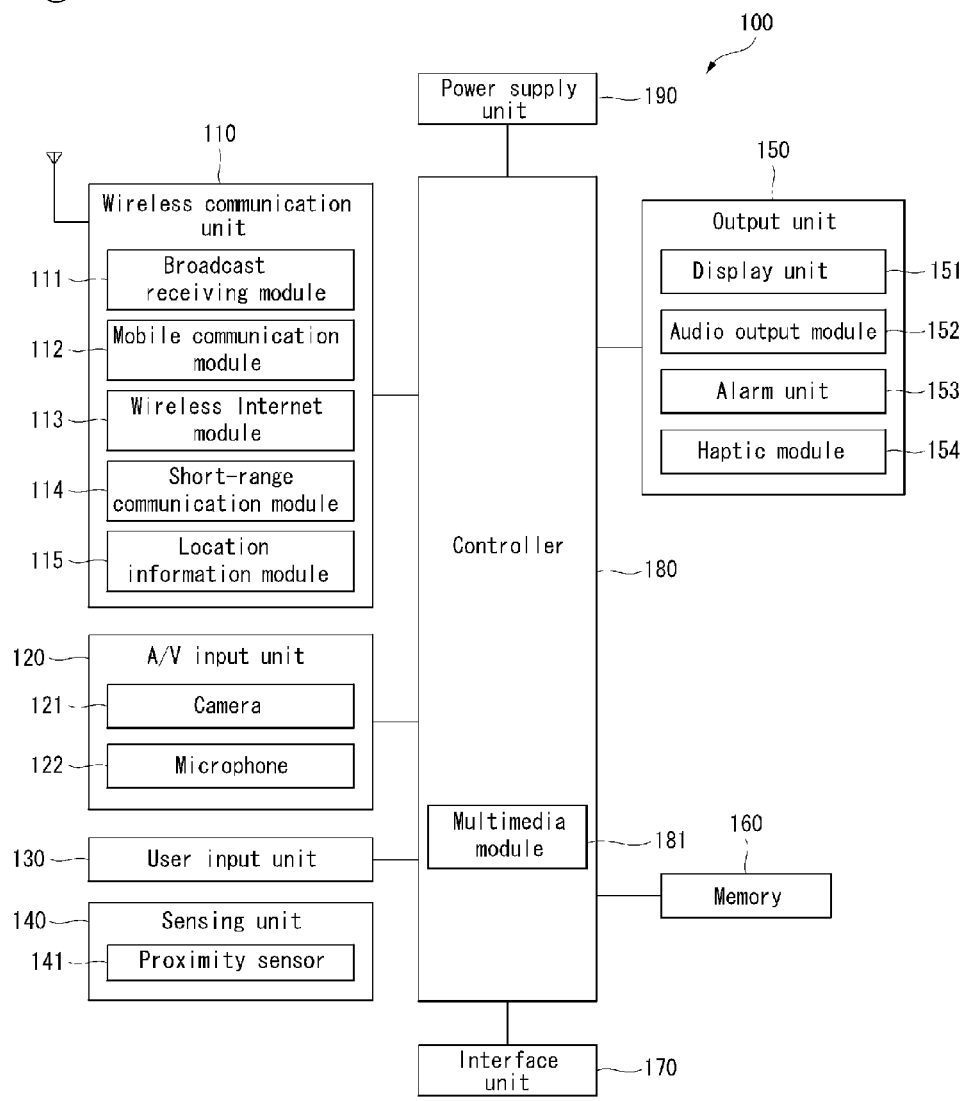
FIG. 3 is a block diagram of a mobile terminal according to an embodiment of the invention.

Referring to FIG. 3, a mobile terminal 100, as an example of the electronic device 100 related to this invention, is described in detail with reference to the accompanying drawings. FIG. 3 is a block diagram of the mobile terminal according to an embodiment of this invention. As used herein, the suffixes 'module' and 'unit' are used for elements in order to facilitate the disclosure only. Therefore, significant meanings or roles are not given to the suffixes themselves and it is understood that the 'module' and 'unit' can be used together or interchangeably.

Referring to FIG. 3, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. Although FIG. 1 shows the mobile terminal 100 having various components, it is understood that implementing all of the illustrated components is not a requirement. More or fewer components may alternatively be implemented.

The wireless communication unit 110 includes one or more components that permit wireless communication between the mobile terminal 100 and a wireless communication system or a network within which the mobile terminal 100 is located. For example, the wireless communication unit 110 includes a broadcast receiving module 111, a mobile communication module 112, a wireless Internet module 113, a short-range communication module 114 and a position-location module 115. For non-mobile terminals, the wireless communication unit 110 may be replaced with a wired communication unit. The wireless communication unit 110 and the wired communication unit may be commonly referred to as a communication unit.

The broadcast receiving module 111 receives a broadcast signal and/or broadcast associated information from an external broadcast managing entity via a broadcast channel. The broadcast channel may include a satellite channel and/or a terrestrial channel.

The broadcast managing entity may refer to a system that transmits a broadcast signal and/or broadcast associated information. The broadcast managing entity may be a server that generates and transmits broadcast signals and/or broadcast associated information or a server for receiving previously generated broadcast signals and/or broadcast-related information and transmitting the broadcast signals and/or the broadcast associated information to the mobile terminal 100. The broadcast signals may include not only TV broadcast signals, radio broadcast signals, and data broadcast signals, but also signals in the form of a TV broadcast signal combined with a radio broadcast signal.

The broadcast associated information may be information about a broadcast channel, a broadcast program, or a broadcast service provider. The broadcast associated information may even be provided over a mobile communication network. In the latter case, the broadcast associated information may be received via the mobile communication module 112. Examples of broadcast associated information include an electronic program guide (EPG) of digital multimedia broadcasting (DMB) and an electronic service guide (ESG) of digital video broadcast-handheld (DVB-H).

The broadcast receiving module 111 may receive broadcast signals transmitted from various types of broadcast systems. As a non-limiting example, the broadcast systems include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The broadcast receiving module 111 may also receive multicast signals. The broadcast signals and/or the broadcast associated information received by the broadcast receiving module 111 may be stored in a suitable storage device, such as in the memory 160.

The mobile communication module 112 transmits/receives wireless signals to/from at least one of a base station, an external terminal or a server over a mobile communication network. The wireless signals may represent, for example, voice call signals, video telephony call signals or data in various forms according to the transmission/reception of text and/or multimedia messages.

The wireless Internet module 113 supports Internet access for the mobile terminal 100. This wireless Internet module 113 may be internally or externally coupled to the mobile terminal 100. Suitable technologies for wireless Internet include, but are not limited to, WLAN (Wireless LAN), Wi-Fi®, Wibro® (Wireless broadband), Wimax® (World Interoperability for Microwave Access), and HSDPA (High Speed Downlink Packet Access). The wireless Internet module 113 may be replaced with a wired Internet module in non-mobile terminals. The wireless Internet module 113 and the wired Internet module may be commonly referred to as an Internet module.

The short-range communication module 114 facilitates relatively short-range communications. Suitable technologies for short-range communication include, but are not limited to, radio frequency identification (RFID), infrared data association (IrDA), ultra-wideband (UWB), as well as networking technologies such as Bluetooth® and ZigBee®.

The position-location module 115 identifies or otherwise obtains a location of the mobile terminal 100. The position-location module 115 may obtain position information by using a global navigation satellite system (GNSS). The GNSS is a term used to describe radio navigation satellite systems configured to send reference signals capable of determining their positions on the surface of the earth or near the surface of the earth while revolving around the earth. The GNSS includes: a global position system (GPS) operated by the U.S.A.; Galileo, operated by Europe; a global orbiting navigational satellite system (GLONASS) operated by Russia; COMPASS, operated by China; and a quasi-zenith satellite system (QZSS) operated by Japan.

As a typical example of the GNSS, the position-location module 115 is a GPS module. The position-location module 115 may calculate information related to distances between one point or object and at least three satellites and information related to the time when the distance information was measured and apply trigonometry to the obtained distance information to obtain three-dimensional position information on the point or object according to the latitude, longitude, and altitude at a predetermined time. Furthermore, a method of calculating position and time information using three satellites and correcting the calculated position and time information using another satellite may also used. The position-location module 115 continues to calculate a current position in real time and to calculate velocity information based on the position information.

With continued reference to FIG. 3, the audio/video (A/V) input unit 120 may be configured to provide audio or video signal input to the mobile terminal 100. The A/V input unit 120 may include a camera 121 and a microphone 122. The camera 121 processes image frames of still pictures or video obtained by an image sensor in a photographing mode or a video telephony mode. The processed image frames may be displayed on a display unit 151.

The image frames processed by the camera 121 may be stored in the memory 160 or transmitted to an external device through the wireless communication unit 110. Optionally, the mobile terminal 100 can include two or more cameras 121, if appropriate.

The microphone 122 receives an external audio signal while the mobile terminal 100 is in a particular mode, such as a phone call mode, a recording mode and/or a voice recognition mode. The received audio signal is processed and converted into digital data. In the call mode, the processed digital data is transformed into a format transmittable to a mobile communication base station via the mobile communication module 112 and then output. Furthermore, the mobile terminal 100, and in particular the A/V input unit 120, may include a noise removing algorithm to remove noise generated in the course of receiving the external audio signal.

The user input unit 130 generates input data in response to user manipulation of an associated input device or devices. Examples of such devices include a keypad, a dome switch, a touchpad (e.g., static pressure/capacitance), a jog wheel and a jog switch. A specific example of the user input unit 130 is a touch screen in which a touchpad is combined with a display, as will be described below.

The sensing unit 140 provides status measurements of various aspects of the mobile terminal 100. For example, the sensing unit 140 may detect an open/closed status of the mobile terminal 100, relative positioning of components (e.g., a display and a keypad) of the mobile terminal 100, a change of position of the mobile terminal 100 or a component of the mobile terminal 100, a presence or absence of user contact with the mobile terminal 100, an orientation of the mobile terminal 100 and/or acceleration/deceleration of the mobile terminal 100.

As an example, the mobile terminal 100 may be configured as a slide-type mobile terminal in which the sensing unit 140 may sense whether a sliding portion of the mobile terminal 100 is open or closed. The sensing unit 140 may also sense presence or absence of power provided by the power supply unit 190 or the presence or absence of a coupling or other connection between the interface unit 170 and an external device.

The output unit 150 generates output relevant to the senses of sight, hearing and touch. The output unit 150 may include a display unit 151, an audio output module 152, an alarm 153, and a haptic module 154.

The display unit 151 displays information processed by the mobile terminal 100. For example, when the mobile terminal 100 is in a call mode, the display unit 151 may display a user interface (UI) or a graphic user interface (GUI) associated with the call. If the mobile terminal 100 is in a video communication mode or a photograph mode, the display unit 151 may display a photographed and/or received picture, a UI or a GUI.

The display unit 151 may include a liquid crystal display (LCD), a thin film transistor liquid crystal display (TFT LCD), an organic light-emitting diode (OLED), a flexible display, or a 3-dimensional display. The mobile terminal 100 may include one or more of such displays.

The display unit 151 may have a transparent or light-transmittive type configuration, hereinafter referred to as a transparent display. A transparent OLED (TOLED) is an example of a transparent display. A rear configuration of the display unit 151 may also have the light-transmittive type configuration. In this configuration, a user is able to see an object located behind the terminal body via the area occupied by the display unit 151 of the terminal body.

At least two display units 151 may be provided. For example, a plurality of display units 151 may be provided on a single face of the mobile terminal 100 spaced apart from each other or built in one body. Alternatively, each of a plurality of display units 151 may be provided on different faces of the mobile terminal 100.

If the display unit 151 and a sensor for detecting a touch action (hereafter referred to as a 'touch sensor') are constructed in a mutual-layered structure (hereafter referred to as a 'touch screen'), the display unit 151 may be used as an input device and an output device. For example, the touch sensor may include a touch film, a touch sheet or a touchpad.

The touch sensor can be configured to convert a pressure applied to a specific portion of the display unit 151 or a variation of electrostatic capacity generated from a specific portion of the display unit 151 to an electric input signal. The touch sensor may detect a pressure of a touch as well as a touched position or magnitude of the touch.

If a touch input is made to the touch sensor, a signal(s) corresponding to the touch input is transferred to a touch controller (not shown). The touch controller processes the signal(s) and then transfers corresponding data to the controller 180. The controller 180 may determine, therefore, which portion of the display unit 151 is touched.

With continued reference to FIG. 3, a proximity sensor 141 can be provided within the mobile terminal 100 enclosed by the touch screen or around the touch screen. The proximity sensor 141 may detect a presence or non-presence of an object approaching a specific detecting surface or an object existing around the proximity sensor 141 using an electromagnetic field strength or infrared ray without mechanical contact. Accordingly, the proximity sensor 141 may have greater durability and greater utility than a contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor or an infrared proximity sensor. If the touch screen is an electrostatic type touch screen, the proximity sensor 141 may detect proximity of a pointer using a variation of an electric field according to the proximity of the pointer and the touch screen (touch sensor) may be classified as the proximity sensor 141.

An action in which a pointer approaches the touch screen without contacting the touch screen, yet is recognized as being located on the touch screen, is referred to as a 'proximity touch'. An action in which the pointer actually touches the touch screen is referred to as a 'contact touch'. The position on the touch screen proximity-touched by the pointer refers to the position of the pointer that vertically opposes the touch screen when the pointer performs the proximity touch.

The proximity sensor 141 may detect a proximity touch and/or a proximity touch pattern (e.g., proximity touch distance, proximity touch duration, proximity touch position, proximity touch shift state). Information corresponding to the detected proximity touch action and/or the detected proximity touch pattern may be displayed on the touch screen.

The controller 180 (FIG. 3) recognizes the proximity touch as one of various input signals according to proximity depth and position of the pointer. The controller 180 performs various operation controls according to various input signals.

Referring again to FIG. 3, the audio output module 152 may output audio data that is received from the wireless communication unit 110 in, for example, a call-receiving mode, a call-placing mode, a recording mode, a voice recognition mode or a broadcast receiving mode. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include, for example, a receiver, a speaker or a buzzer.

The alarm 153 outputs a signal for announcing an occurrence of a particular event associated with the mobile terminal 100. Typical events include a call signal reception, a message reception, a key signal input and a touch input. The alarm 153 outputs a signal for announcing the event occurrence via vibration as well as a video signal or an audio signal. The video signal is output via the display unit 151 and the audio signal is output via the audio output module 152. Hence, at least the display unit 151 or the audio output module 152 can be regarded as part of the alarm 153.

The haptic module 154 may generate various haptic effects that can be sensed by a user. Vibration is a representative tactile effect generated by the haptic module 154. Strength and pattern of the vibration generated from the haptic module 154 may be controllable. For example, vibrations differing from each other can be output by being synthesized together or can be output in sequence.

The haptic module 154 may generate various haptic effects in addition to vibration. For example, the haptic module 154 may generate an effect caused by a pin array vertically moving against skin being touched, an air injection force via an injection hole, an air suction force via a suction hole, an effect of skimming on a skin surface, an effect of contact with an electrode, an effect of electrostatic power and/or an effect of a hot/cold sense using an endothermic or exothermic device.

The haptic module 154 can be configured to provide the haptic effect via direct contact. The haptic module 154 can also be configured to enable a user to experience the haptic effect via muscular sense of a finger or an arm. Two or more haptic modules 154 can be provided according to a configuration of the mobile terminal 100.

The memory 160 is configured to store programs for operation of the controller 180. The memory 160 may temporarily store input/output data (e.g., phonebook, message, still picture, moving picture, etc.). The memory 160 may store data of vibration and sound in various patterns output when the touch screen receives a touch input.

The memory 160 may include, for example, a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory (EEPROM), a programmable read-only memory(PROM), a magnetic memory, a magnetic disk or an optical disk. The mobile terminal 100 may operate in association with a web storage that performs a storage function of the memory 160 via the Internet.

The interface unit 170 couples the mobile terminal 100 with external devices. The interface unit 170 receives data from an external device. The interface unit 170 is supplied with power and may be configured to deliver the power to elements within the mobile terminal 100. The interface unit 170 may be configured to enable data to be transferred from the mobile terminal 100 to an external device. The interface unit 170 may be configured to include a wired/wireless headset port, an external charger port, a wire/wireless data port, a memory card port, a port for coupling to a device having an identity module, an audio input/output (I/O) port, a video input/output (I/O) port or an earphone port.

According to an embodiment of the present invention, the interface unit 170 can include an HDMI (High Definition Multimedia Interface) standard interface for video/audio input/output when the electronic device 100 and an external electronic device are physically connected to each other. Furthermore, the interface unit 170 can include a USB (Universal Serial Bus) standard interface as an interface for data input/output, instead of the HDMI standard interface.

In addition, according to an embodiment of the present invention, video and audio data of the electronic device 100 can be output through the external electronic device (mobile terminal 10c_1 or 10C-2 of FIG. 8) or the output unit 150 of the electronic device 100 by connecting an HDMI or USB terminal of the interface unit 170 included in the electronic device 100 to the external electronic device (mobile terminal 10c_1 or 10c_2 of FIG. 8).

Furthermore, according to an embodiment of the present invention, an image of the external electronic device (mobile terminal 10c_1 or 10_2 of FIG. 8) can be mirrored to the electronic device 100 through the HDMI or USB terminal of the interface unit 170 included in the electronic device 100. According to an embodiment of the present invention, a screen displayed on the display unit 151 of the electronic device 100 can be captured upon input of a screen capture signal and the captured image can be shared with the external electronic device (10c_1 or 10c_2 of FIG. 8) through the interface configuration.

The identity module is a chip or card that stores various types of information for authenticating a use authority of the mobile terminal 100 and can include a user identity module (UIM), a subscriber identity module (SIM) and/or a universal subscriber identity module (USIM). A device provided with the above identity module (hereafter referred to as an 'identity device') may be manufactured in the form of a smart card. The identity device is connectable to the mobile terminal 100 via a corresponding port.

The interface unit 170 may be configured as a passage for supplying power to the mobile terminal 100 from a cradle that is connected to the mobile terminal 100. The interface unit 170 may facilitate delivery of various command signals, which are input via the cradle by a user, to the mobile terminal 100. Various command signals input via the cradle or the power may work as a signal for recognizing that the mobile terminal 100 is correctly loaded in the cradle.

The controller 180 typically controls the overall operations of the mobile terminal 100. For example, the controller 180 performs control and processing associated with voice calls, data communications and video conferences. The controller 180 may include a multimedia module 181 that provides multimedia playback. The multimedia module 181 may be configured as part of the controller 180 or may be configured as a separate component. The controller 180 may also perform pattern recognizing processing for recognizing a handwriting input performed on the touch screen as a character and/or recognizing a picture drawing input performed on the touch screen as characters or images.

The power supply unit 190 provides power required by the various components for the mobile terminal 100. The power may be internal power, external power, or combinations thereof.

Embodiments of the present invention described in the following description may be implemented within a recording medium that can be read by a computer or a computer-like device using software, hardware or combinations thereof. For hardware implementations, arrangements and embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors or electrical units for performing other functions. Such embodiments may also be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in the memory 160 and executed by the controller 180.

FIGS. 4A and 4B illustrate an operation of a multi-screen device to perform capture of the multi-screen device in a multi-screen environment.

A method of controlling an electronic device according to an embodiment of the invention may be implemented in a plurality of electronic devices 100 and 10c.

Referring to FIG. 4A, an electronic device 100 and a mobile terminal 10c may be connected through N screen and share the screens thereof.

The electronic device 100 and the mobile terminal 10c may share the screens thereof while the electronic device 100 and the mobile terminal 10c execute a first item A (e.g. a web browser) and the mobile terminal 10c executes a second item B (e.g. video).

The electronic device 100 and the mobile terminal 10c may execute the same item in the N screen environment. For example, the electronic device 100 and the mobile terminal 10c can display different parts of the same video on their screens. Otherwise, the electronic device 100 may play a part of the video corresponding to a first play time and the mobile terminal 10c may play the video from next part of the video.

Referring to FIG. 4A, a dual capture operation as described above may be implemented when a capture command is input to the electronic device 100.

For example, when the capture command is input to the electronic device 100, the screen of the electronic device 100 is captured, and the screen of the mobile terminal 10c may also be captured. The capture command may be applied to the electronic device 100 externally or internally.

Referring to FIG. 4B, when the capture operation is performed, a predetermined animation effect may be displayed on the screens of the electronic device 100 and the mobile terminal 10c to inform a user that capture is performed. For example, when the capture operation is performed, the electronic device 100 can blinks a captured image. The mobile terminal 10c can also blink the captured image.

The mobile terminal 10c may display a capture image 12 of the screen of the electronic device 100, e.g. DTV 100, and a capture image 11 of the mobile terminal 10c on the display unit 151.

The controller 180 may display the first capture image 11 on a first area of the display unit 151 and display the second capture image 12 on a second area of the display unit 151. Display of the first area and the second area may be controlled such that the first and second areas share at least part thereof or a sharing area does not exist.

That is, the two capture images can be displayed on the screen of the mobile terminal 10c according to the dual capture operation.

Figure 5:
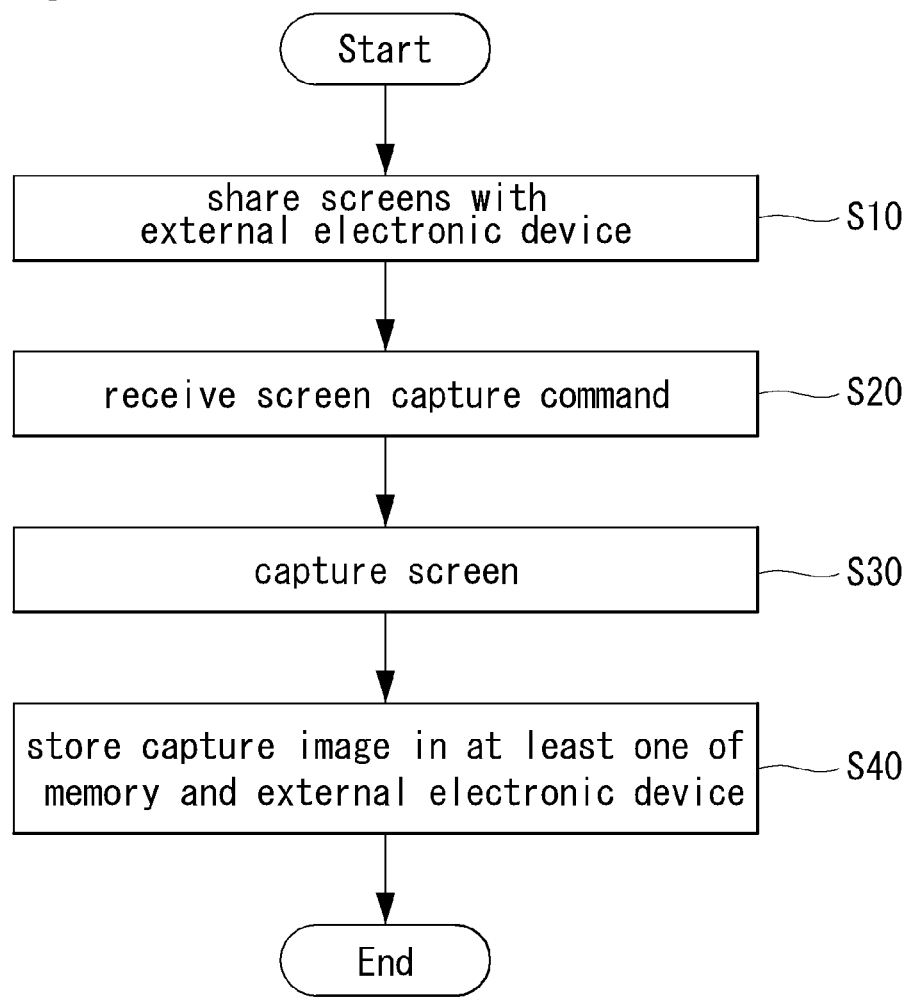
FIG. 5 is a flowchart illustrating a method of controlling an electronic device according to an embodiment of the present invention.

FIG. 5 is a flowchart illustrating the method of controlling an electronic device according to the present embodiment of the invention.

The electronic device 100 according to an embodiment of the invention may share the screen thereof with at least one external electronic device 10 (S10).

Here, sharing a screen may include an operation of displaying content played on a screen of a first device through a screen of a second device connected to the first device over a network.

Furthermore, sharing a screen may include an operation of the first device to control display of the screen of the second device connected to the first device over the network. Here, the first device can control display of the screen of the second device by transmitting a control signal for controlling the screen of the second device to the second device through the network.

The electronic device 100 may receive a screen capture command (S20) and perform a screen capture operation (S30).

Figure 6A:
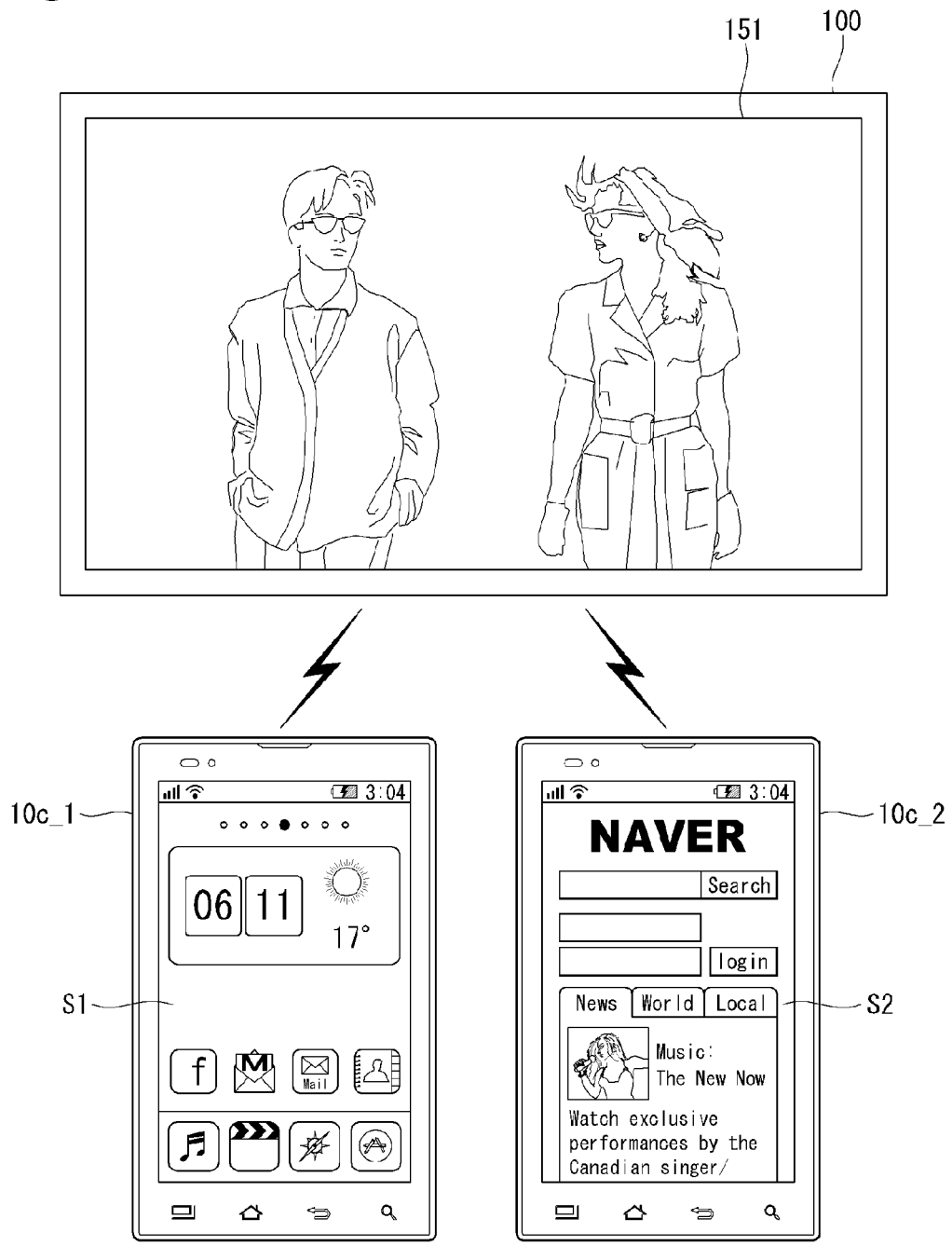
FIGS. 6A and 6B are diagrams for explaining the embodiment shown in FIG. 5.
Figure 6B:
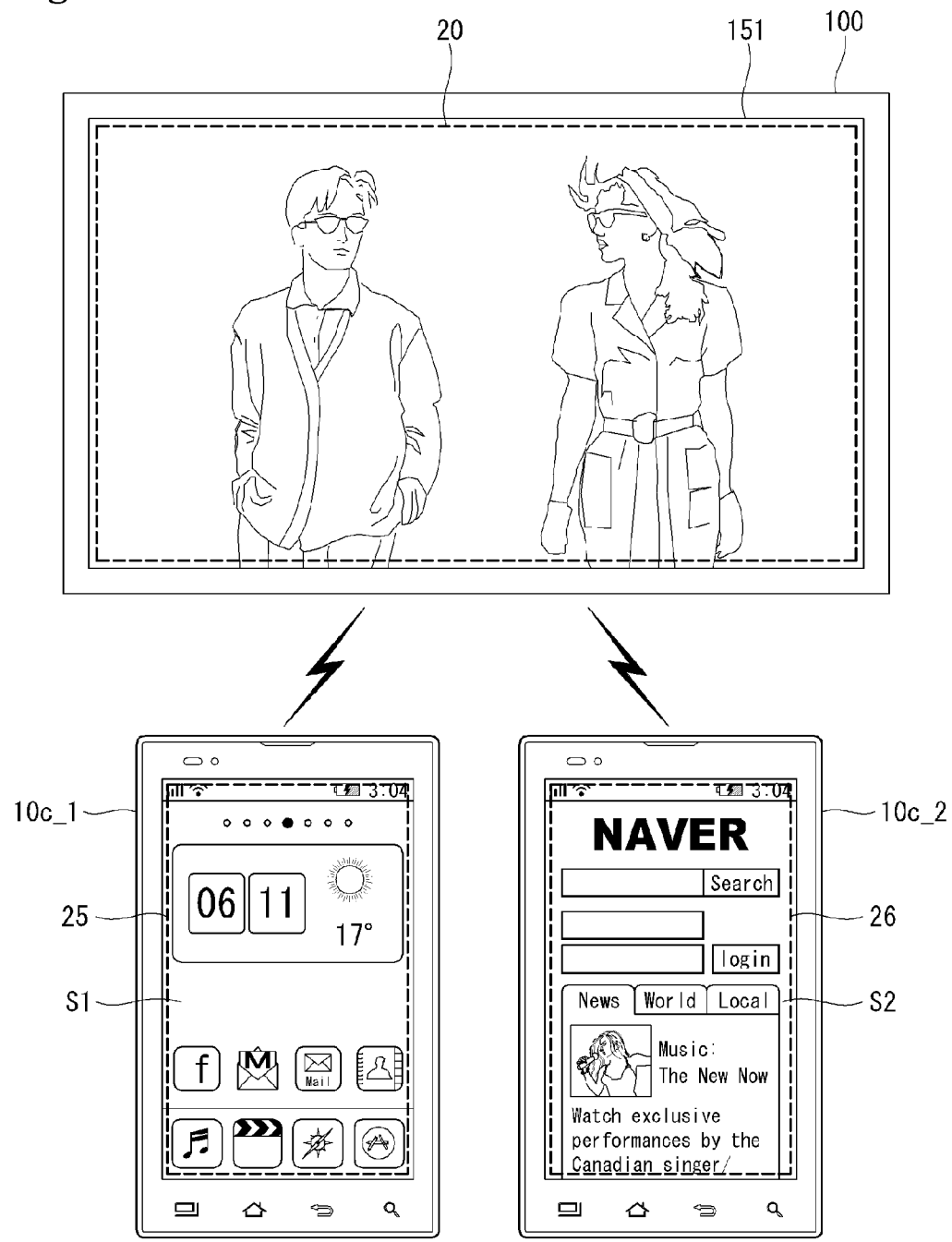

FIGS. 6A and 6B are diagrams for illustrating the embodiment shown in FIG. 5.

Referring to FIG. 6A, the electronic device 100, a first external electronic device 10c_1 and a second external electronic device 10c_2 construct a special network (for example, a plurality device share a respective screen, the network may be called a N screen network). These devices may share the screens thereof by performing data communication through a predetermined network (e.g. DLNA).

Referring to FIG. 6B, the electronic device 100 may capture an image displayed on the display unit 151 when the screen capture command is input thereto. In this case, the screens of the first external electronic device 10c_1 and second external electronic device 10c_2 that share the screens with the electronic device 100 may also be captured.

The screen capture command may include a control signal for controlling the electronic device 100 to directly capture the screen thereof at a predetermined time. In this case, the electronic device 100 may capture the screen thereof and control the first and second external electronic devices 10c_1 and 10c_2 to capture their screens by transmitting the screen capture command to the first and second external electronic devices 10c_1 and 10c_2.

Furthermore, the screen capture command input to the electronic device 100 may be a signal received from the first external electronic device 10c_1. In this case, the electronic device 100 may perform screen capture in response to the received screen capture command and transmit the screen capture command to the second external electronic device 10c_2. Accordingly, the screen of the second external electronic device 10c_2 can also be captured.

The electronic device 100, the first external electronic device 10c_1 and the second external electronic device 10c_2 may store captures images of the screens thereof in the respective devices.

When screen capture is performed in the electronic device 100, the electronic device 100 may control the memory 161 and at least one of the external electronic devices to store the capture image (S40).

Figure 7:
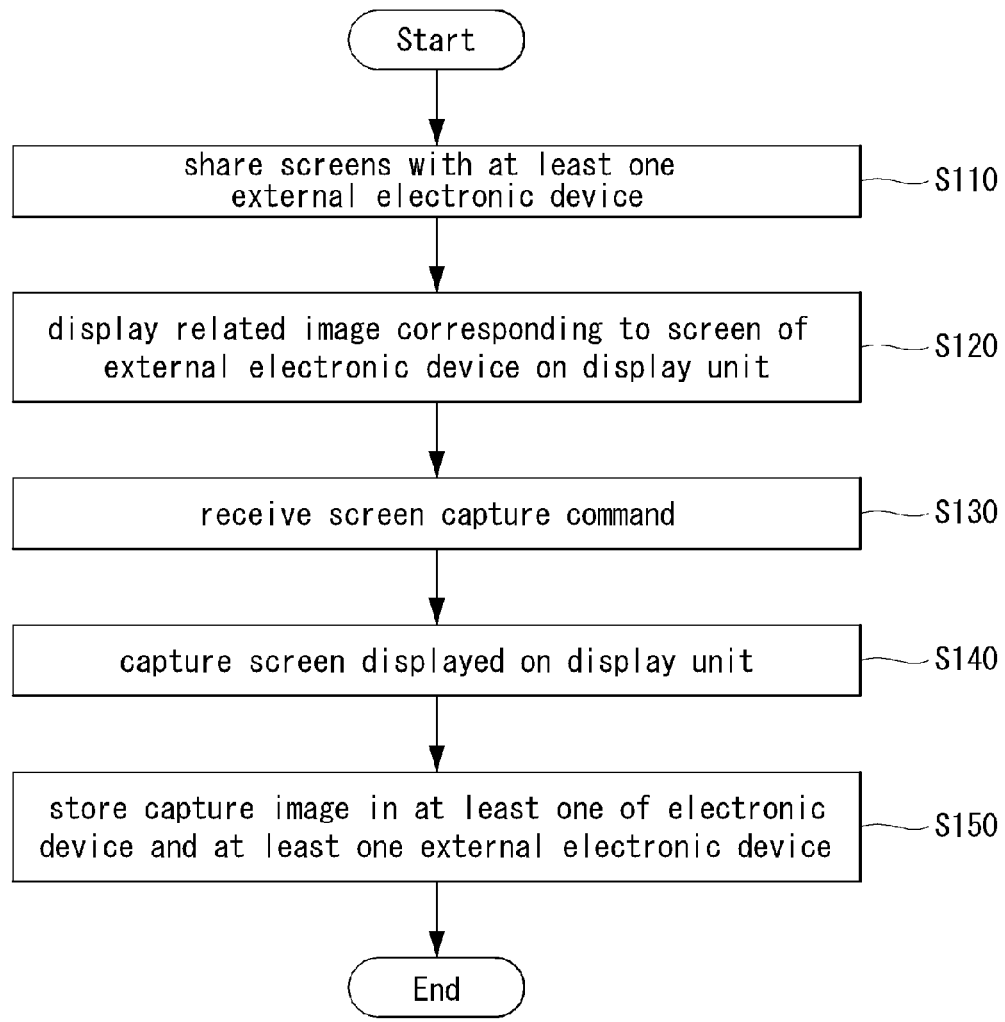
FIG. 7 is a flowchart illustrating a method of controlling an electronic device according to an embodiment of the present invention.

FIG. 7 is a flowchart illustrating a method of controlling an electronic device according to an embodiment of the invention and FIG. 8 is a diagram for illustrating the method shown in FIG. 7.

The method of controlling an electronic device according to the present embodiment of the invention may be implemented in the electronic devices 100 and 10. The method of controlling an electronic device according to the present embodiment of the invention and operations of the electronic device 100 for implementing the method will now be described in detail on the basis of the electronic device 100 for convenience of description.

Referring to FIGS. 7 and 8, the electronic device 100 may share the screen with at least one external electronic device (S110).

The electronic device 100 may be a DTV receiver or a tablet PC and the at least one external electronic device may be a cellular phone.

Here, the wireless communication unit 110 of the electronic device 100 may share screens with external electronic devices 10c_1 and 10c_2 through predetermined data communication.

Accordingly, when the electronic device 100 and the external electronic devices 10c_1 and 10c-2 share the screens thereof through the predetermined data communication, related images M1 and M2 respectively corresponding to the screens of the external electronic devices 10c_1 and 10c_2 may be displayed on the display unit 151 of the electronic device 100 (S120).

Here, the related images M1 and M2 respectively corresponding to the screens of the external electronic devices 10c_1 and 10c_2 may include images obtained by mirroring the screens of the external electronic devices 10c_1 and 10c_2 and displayed on the screen of the electronic device 100.

It is assumed that the electronic device 100 is a DTV and the external electronic device 10c_1 is a mobile terminal. In an environment in which the DTV 100 and the mobile terminal 10c_1 share the screens thereof, while a mirror image of the screen of the mobile terminal 10c_1 may be displayed on the screen of the DTV 100, the image of the screen of the mobile terminal 10c_1, instead of the mirror image thereof, can be displayed on the screen of the DTV 100 according to embodiments of the present invention.

It is assumed that the related images M1 and M2 respectively corresponding to the screens of the external electronic devices 10c_1 and 1-c_2 are images (mirror images M1 and M2) mirrored and displayed on the screens of the external electronic devices 10c_1 and 10c_2 in the following description.

Accordingly, the electronic device 100 may display a current item execution screen S3 and the mirror images M1 and M2 corresponding to the screens of the external electronic devices 10c_1 and 10c_2 sharing the screens with the electronic device 100 on the display unit 151.

The electronic device 100 may receive a screen capture signal instructing the screen displayed on the display unit 151 to be captured (S130).

The screen capture signal may be a signal internally generated in the electronic device 100 or a signal received from one of the external electronic devices through the communication unit.

For example, if the electronic device 100 is a DTV, the screen capture signal may be input from a remote controller (not shown) for controlling the operation of the DTV 100.

Otherwise, the screen capture signal may be a control signal transmitted from the external electronic devices 10c_1 and 10c_2 sharing the screens with the DTV 100. In this case, the electronic device 100 may receive the screen capture signal from one of the external electronic devices 10c_1 and 10c_2 through the wireless communication unit 110.

The screen capture signal may be transmitted from the first external electronic device 10c_1. The first external electronic device 10c_1 may transmit the screen capture signal when a predetermined input is applied to the touch screen thereof. While it is assumed that the screen capture signal is transmitted from the first external electronic device 10c_1 in the following description, the present invention is not limited thereto and the screen capture signal can be internally generated in the electronic device 100.

The predetermined input may include a long-touch input to two arbitrary points on the touch screen of the first external electronic device 10c_1. Furthermore, the predetermined input may include an input according to a combination of a hard key provided to the body of the first external electronic device 10c_1 and a soft key executed through the touch screen.

The controller 180 of the electronic device 100 may capture the screen displayed on the display unit 151 in response to the screen capture signal (S140).

The screen displayed on the display unit 151 may include the current item execution screen S3 of the electronic device 100 and the mirror images M1 and M2 of the external electronic devices 10c_1 and 10c_2, as shown in FIG. 8. The screen displayed on the display unit 151 may include only the current item execution screen S3 of the electronic device 100.

Accordingly, the capture image of the screen of the electronic device 100 can include the current item execution screen S3 and the mirror images M1 and M2 of the external electronic devices 10c_1 and 10c_2.

The controller 180 of the electronic device 100 may store the capture image in the electronic device 100 and at least one of the external electronic devices 10c_1 and 10c_2.

The controller 180 may store the capture image in the memory 160 of the electronic device 100. The controller 180 may transmit the capture image to at least one of the first and second external electronic devices 10c_1 and 10c_2.

Here, the controller 180 of the electronic device 100 may previously set a device in which the screen capture image will be stored, or the user may select the device in which the screen capture image will be stored while the screen capture image is displayed as a preview image.

A description will be given of a procedure of storing the capture image of the electronic device 100 in the electronic device 100 and/or at least one of the external electronic devices 10c_1 and 10c_2 according to embodiments of the present invention.

The electronic device and the method of controlling the same according to the above-described embodiments of the invention have the following advantages.

According to the present invention, in an environment in which the electronic device and an external electronic device share the screens thereof, if the screens of the electronic device and external electronic device are simultaneously captured, a capture request device, a capture image, and a device storing the capture image can be easily identified so as to improve user convenience in a multi-screen environment.

Furthermore, according to the present invention, a capture image of the screen of the external electronic device can be easily linked with an item executed on a mobile terminal according to a simple operation of the mobile terminal in an environment in which the mobile terminal and the external electronic device share the screens thereof.

Figure 9:
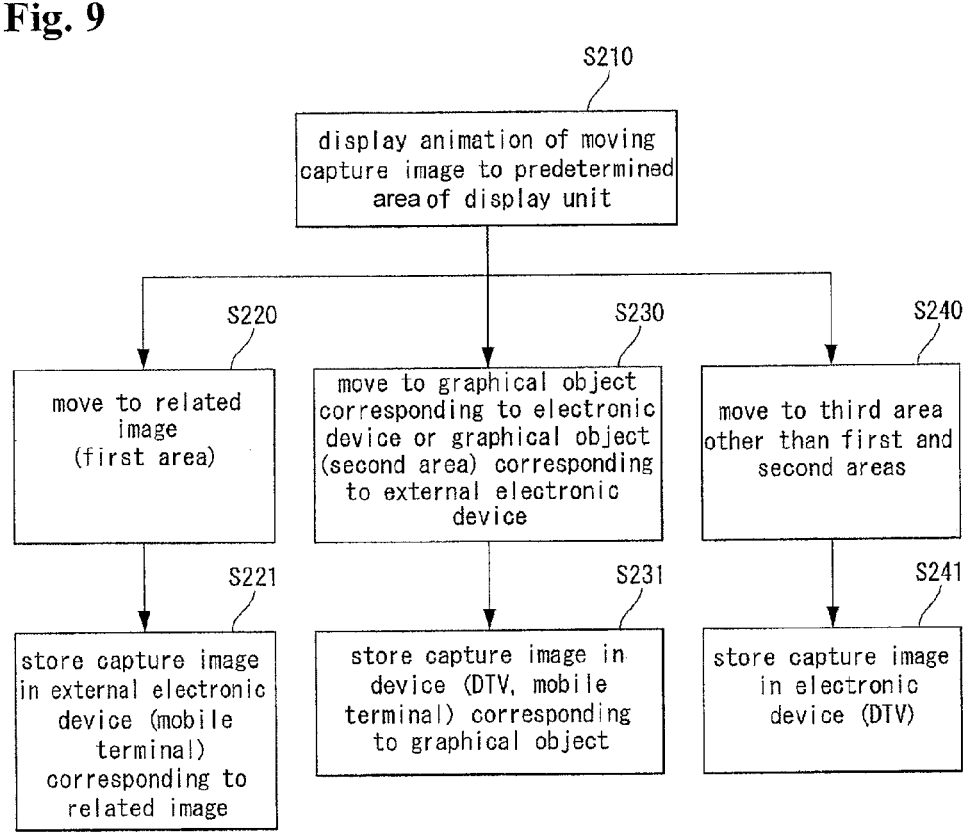
FIG. 9 is a flowchart illustrating a method of controlling an electronic device according to a first embodiment of the present invention.

FIG. 9 is a flowchart illustrating a method of controlling an electronic device according to a first embodiment of the present invention and FIGS. 10a to 18 are diagrams for explaining the first embodiment of the present invention.

The method of controlling an electronic device according to the first embodiment of the present invention may be implemented in the electronic devices 100 and 10. The method of controlling an electronic device according to the first embodiment of the present invention and operations of the electronic device 100 for implementing the method will now be described in detail on the basis of the electronic device 100 for convenience of description. The first embodiment of the invention may be based on the embodiments described above with reference to FIGS. 5 to 7.

Referring to FIG. 9, the controller 180 of the electronic device 100 may display animation that the above-mentioned capture image moves to a predetermined area of the display unit 151 (S210).

Referring to FIG. 10A, the electronic device 100 and the external electronic devices 10c_1 and 10c_2 share the screens thereof.

In this state, the electronic device 100 may receive a screen capture command from a remote controller (not shown) for controlling the operation of the electronic device 100.

Otherwise, the electronic device 100 may be set such that it automatically performs a screen capture operation at a predetermined time. At the predetermined time, the electronic device 100 can automatically capture the screen without intervention of the external electronic devices 10c_1 and 10c_2 to generate a screen capture image 20.

Figure 10B:
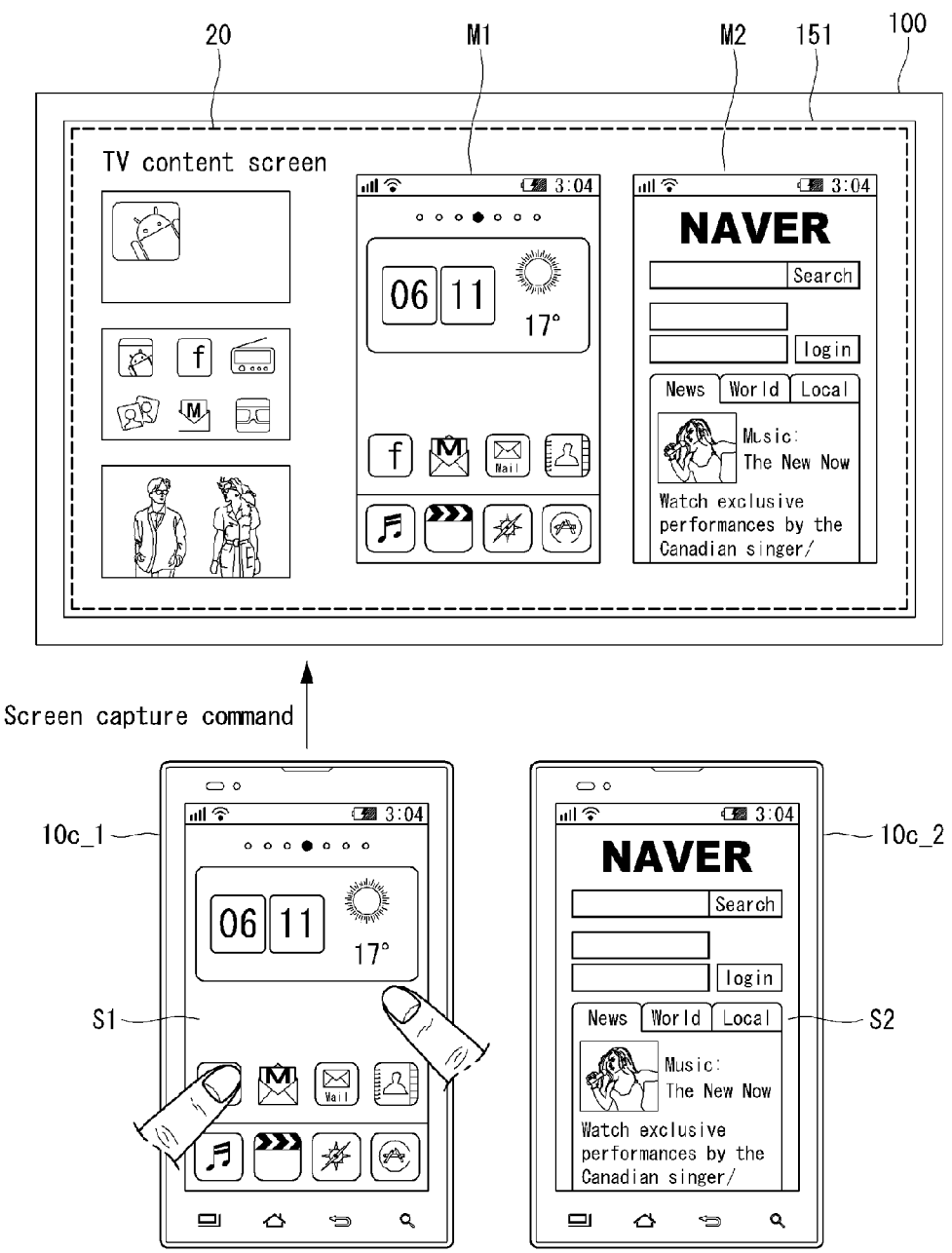

Referring to FIG. 10B, when the screen capture command is received from the first external electronic device 10c_1 while the mirror images M1 and M2 of the screens of the external electronic devices 10c_1 and 10c_2 are displayed on the display unit 151, the controller 180 generates the screen capture image 20.

The controller 180 may control the screen capture image 20 to be stored in a device corresponding to the predetermined area to which the screen capture image 20 is moved.

Referring to FIG. 11, the screen capture image 20 may be scaled down to a predetermined size upon execution of the screen capture operation and displayed at the center of the display unit 151. That is, the screen capture image 20 may be located at the center of the display unit 151 such that it can move to one of an area of the display unit 151 and the mirror image M1 of the first external electronic device 10c_1 or the mirror image M2 of the second external electronic device 10c_2.

Here, the animation that shows moving of the capture image 20 to the predetermined area of the display unit 151 may include an animation effect that the capture image 20 gradually enters the predetermined area to finally disappear from the display unit 151.

The animation represents moving of the capture image 20 to a specific direction, and the display unit 151 of the electronic device 100 and the display unit of the first external electronic device 10c_1 and/or the display unit of the second external electronic device 10c_2 may share the capture image 20 according to the animation effect.

Figure 12A:
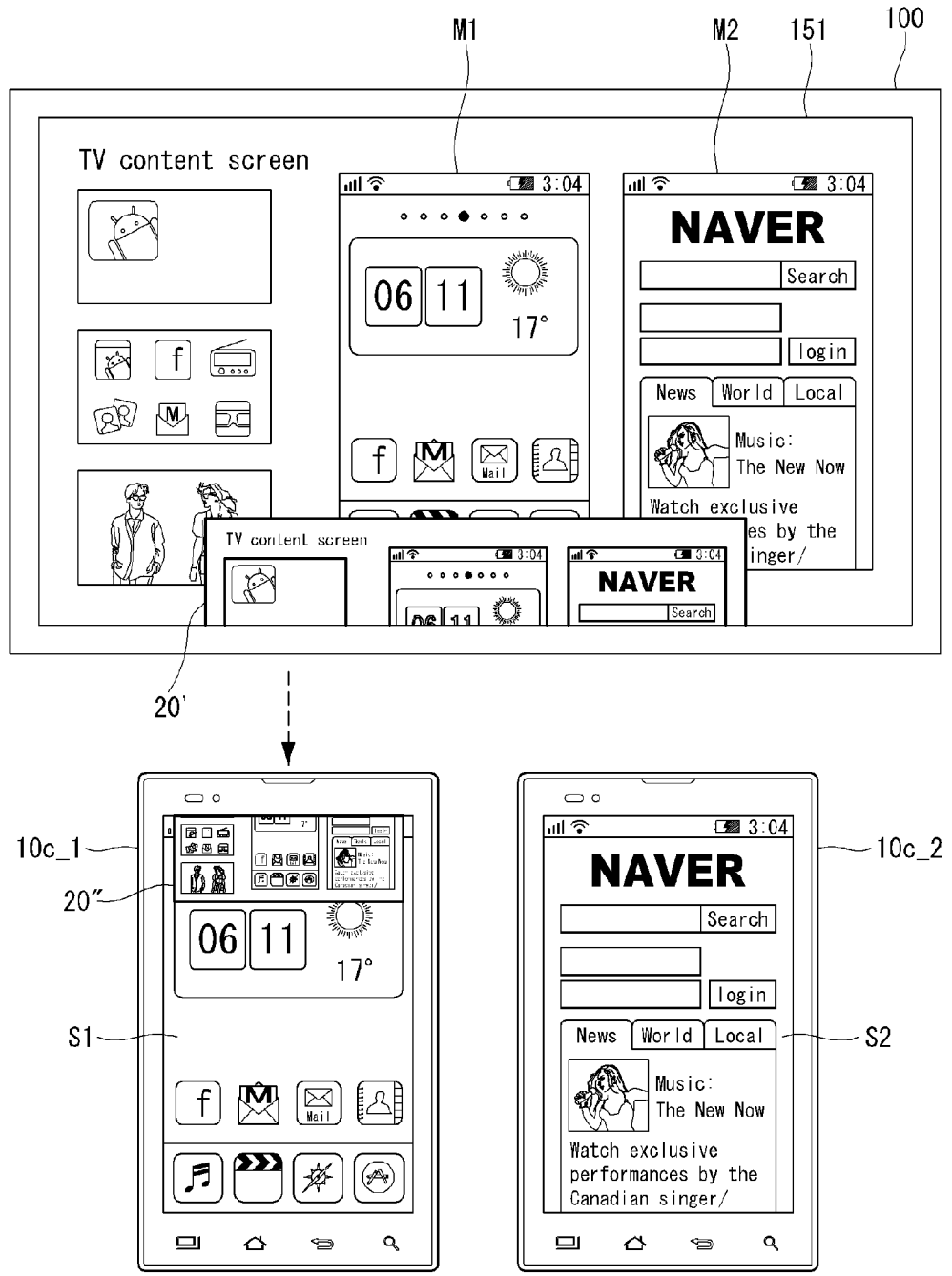

For example, referring to FIGS. 12A and 12B, the animation effect can be implemented in such a manner that the capture image (20 shown in FIG. 11) moves down such that a region 20' of the capture image 20 shown in FIG. 11 is displayed on the display unit 151 of the electronic device 100 and the remaining region 20" of the capture image (20 shown in FIG. 11) is displayed on the display unit of the first external electronic device 10c_1. Accordingly, the capture image (20 shown in FIG. 11) can be displayed over the screens of the multiple devices 10c_1 and 100.

The animation effect may correspond to a means for showing a procedure of transmitting the capture image (20 shown in FIG. 11) to the first external electronic device 10c_1 by gradually reducing the region 20' of the capture image 20 and gradually enlarging the region 20" of the capture image 20 and storing the capture image 20 in the first external electronic device 10c_1.

Figure 12C:
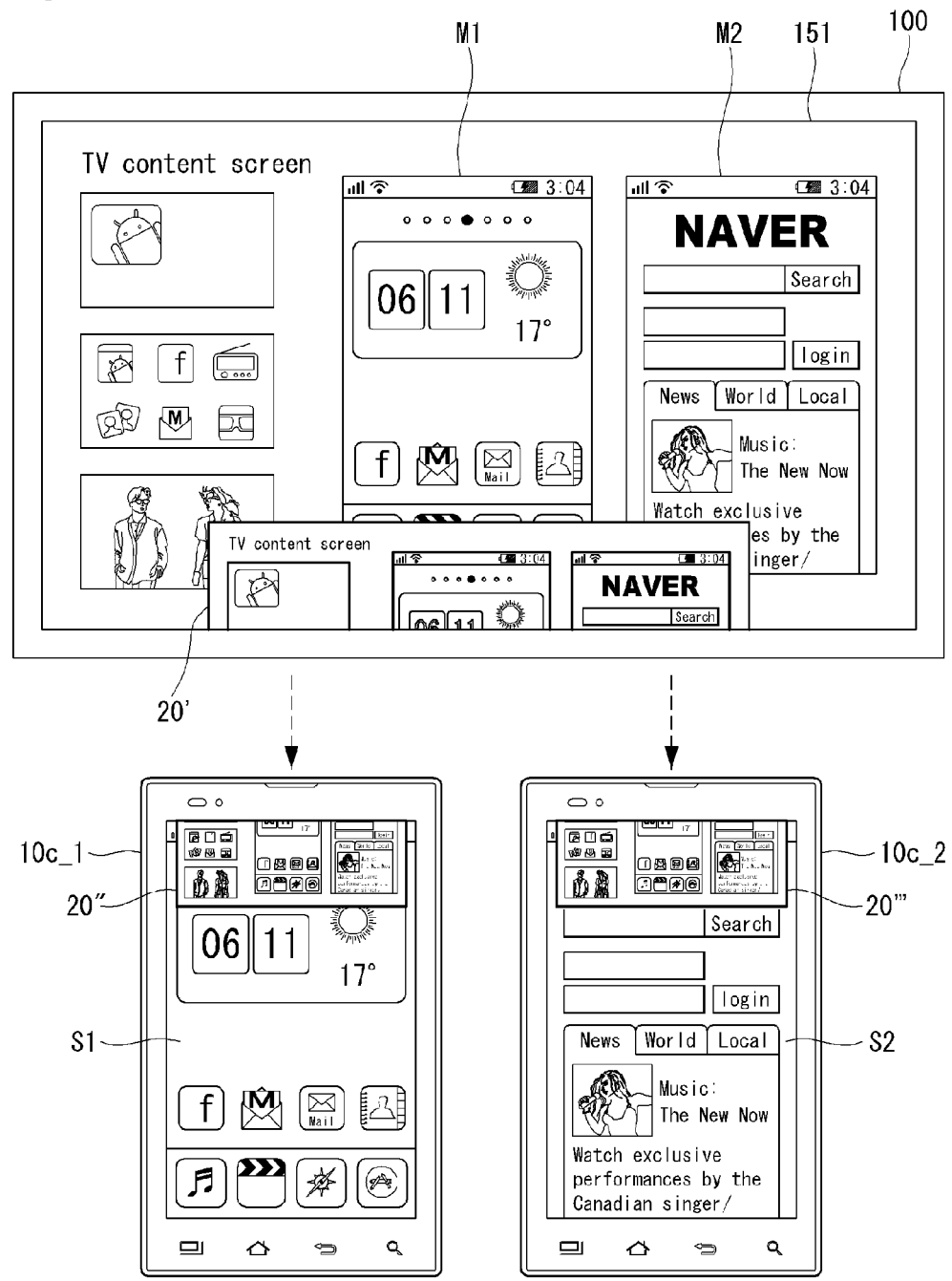

The animation effect may be implemented in a different manner. Referring to FIGS. 12C and 12D, for example, the region 20' of the capture image (20 shown in FIG. 11) can be displayed on the display unit 151 of the electronic device 100 and the remaining region 20" of the capture image (20 shown in FIG. 11) can be displayed on the display units of the first and second external electronic devices 10c_1 and 10c_2. Accordingly, the display unit 151 of the electronic device 100 and the displays of the first and second external electronic devices 10c_1 and 10c_2 can share the capture image 20 shown in FIG. 11.

As described above, as the animation effect is exerted on the capture image (20 shown in FIG. 11), the region 20' of the capture image 20 gradually decreases whereas the region 20" of the capture image 20 gradually increases. Accordingly, the screen capture image (20 shown in FIG. 11) of the electronic device 100 can be transmitted to the first and second external electronic devices 10c_1 and 10c_2 and stored therein.

FIG. 12D shows that the capture image 20 shown in FIG. 11 is transmitted to the first and second external electronic devices 10c_1 and 10c_2 and displayed as capture images 21 and 22 on the display units of the first and second external electronic devices 10c_1 and 10c_2.

As described above with reference to FIGS. 11 to 12D, the screen displayed on the display unit 151 of the electronic device 100 is captured and the screen capture image is stored in a least one of the electronic device 100 and the external electronic devices 10c_1 and 10c_2. However, the screen capture image according to an embodiment of the present invention is not limited thereto. According to the embodiment of the present invention, the capture image 20 can include content (e.g. the TV content screen of FIG. 8) displayed through the display unit 151 of the electronic device 100. Furthermore, the capture image 20 can include a capture regarding the first mirror image M1 and a capture image regarding the second mirror image M2.

Referring to FIG. 13A, the electronic device 100 can generate a capture image M1' with respect to the first mirror image M1 displayed on the display unit 151 upon reception of a screen capture signal.

Figure 13B:
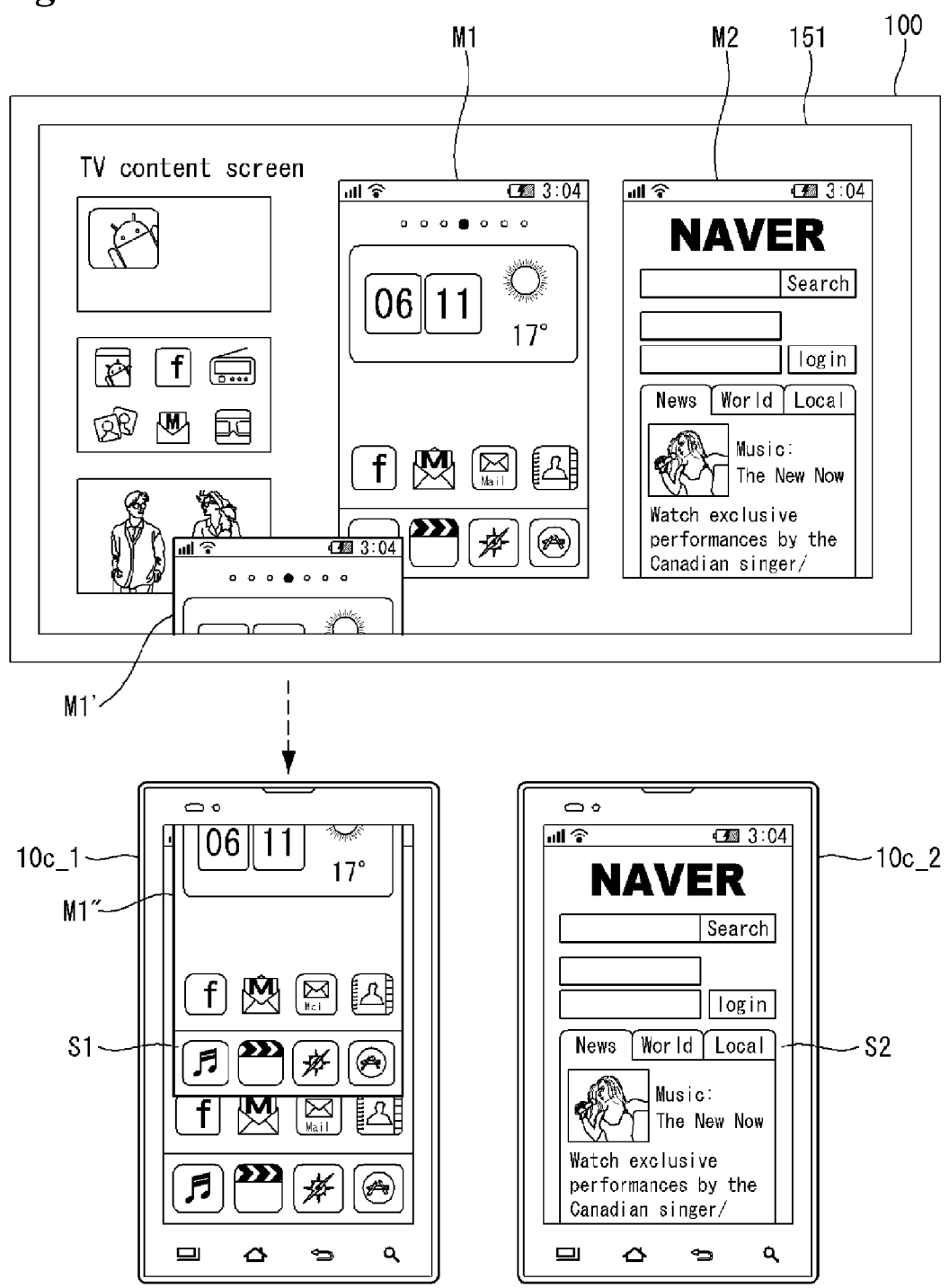

Referring to FIG. 13B, the electronic device 100 can apply an animation command for sharing the capture image M1' with the external electronic device 10c_1 to the capture image M1'. The animation corresponding to the animation command can include any animation that can be intuitively recognized as being shared by the electronic device 100 and the external electronic device 10c_1. The electronic device 100 may share the capture image M1' with the external electronic device 10c_2.

Referring to FIG. 14A, the electronic device 100 can generate a capture image M2' with respect to the second mirror image M2 displayed on the display unit 151 upon reception of a screen capture signal.

Figure 14B:
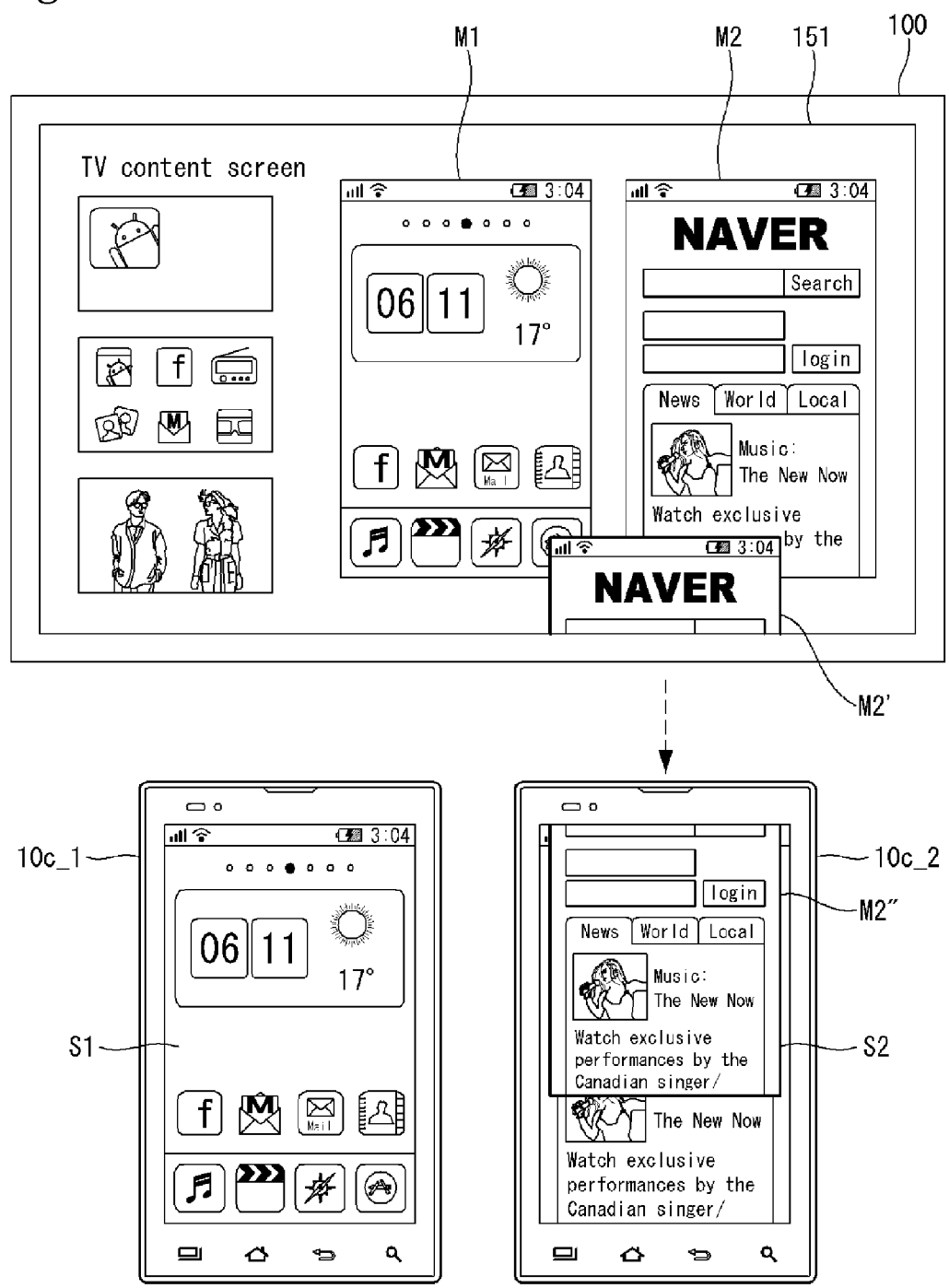

Referring to FIG. 14B, the electronic device 100 can apply an animation command for sharing the capture image M2' with the external electronic device 10c_2 to the capture image M2'. The electronic device 100 may share the capture image M2' with the external electronic device 10c_1.

Referring back to FIG. 9, the predetermined area may include the first area of the display unit 151 of the electronic device 100, in which the mirror images M1 and M2 are displayed (S220).

The controller 180 may control the capture image to be stored in the external electronic devices corresponding to the mirror images (S221).

Referring to FIG. 15, for example, the capture image 20 can be scaled down to finally disappear from the display unit 151 as if it is absorbed into the first mirror image M1.

That is, the controller 180 can produce an animation effect that the capture image 20 is absorbed into the first mirror image M1. Accordingly, the display position of the capture image 20 can be controlled such that the display area of the capture image 20 in the display unit 151 of the electronic device 100 is gradually reduced and the capture image 20 is finally located in the first mirror image M1, as shown in FIG. 15.

Furthermore, the controller 180 may highlight the capture image 20 and, at the same time, generate an alarm sound for signaling movement of the capture image 20 to the first mirror image M1 through the audio output module (152 of FIG. 3) as the animation effect.

The controller 180 of the electronic device 100 may transmit a control signal for controlling the first external electronic device 10c_1 corresponding to the first mirror image M1 to generate a predetermined alarm sound to the first external electronic device 10c_1 as the capture image 20 is moved to the first mirror image M1.

The controller 180 of the electronic device 100 may transmit the capture image 20 to the first external electronic device 10c_1 corresponding to the first mirror image M1. The capture image 20 may be stored in the first external electronic device 10c_1.

Referring to FIG. 16, for example, if animation showing movement of the capture image 20 to the second external electronic device 10c_2 corresponding to the second mirror image M2 is displayed, the controller 180 can transmit the capture image 20 to the second external electronic device 10c_2 corresponding to the second mirror image M2. Accordingly, the capture image 20 can be stored in the second external electronic device 10c_2. The capture image 20 can be a screen capture image displayed on the display unit 151 of the electronic device 100. That is, the capture image 20 comprises at least one of contents except the first mirror image M1 and the second mirror image M2.

Referring back to FIG. 9, the predetermined area may include a graphical object corresponding to the electronic device 100 or a graphical object corresponding to the external electronic devices 10c_1 and 10c_2.

Accordingly, the controller 180 may store the capture image in a device corresponding to the graphical object (S231).

Here, the graphical object identifies each device through the display unit 151. When the electronic device 100 is a DTV, the graphical object may include a DTV icon. If the electronic device 100 is a cellular phone, the graphical object may include an icon having a cellular phone image.

Accordingly, when the capture image 20 is moved to a specific graphical object, the controller 180 can transmit the capture image 20 to a device corresponding to the specific graphical object.

Referring to FIG. 17, for example, the capture image 20 can be scaled down so as to finally disappear from the display unit 151 as if it is absorbed into a first graphical object G1 corresponding to the first external electronic device 10c_1. Then, the controller 180 of the electronic device 100 can transmit the capture image 20 to the first external electronic device 10c_1 corresponding to the first graphical object G1. The capture image 20 can be stored in the first external electronic device 10c_1.

Referring to FIG. 18, for example, if animation showing movement of the capture image 20 to a third graphical object G3 corresponding to the electronic device 100 is displayed, the controller 180 may store the capture image 20 in the memory 160 of the electronic device 100 corresponding to the third graphical object G3.

Referring back to FIG. 9, the predetermined area may be an area other than the first area (mirror image region) and the second area (graphical object region) of the display unit 151 (S240).

In this case, the controller 180 may store the capture image 20 in the memory 160 of the electronic device (DTV) 100 (S241).

Figure 19:
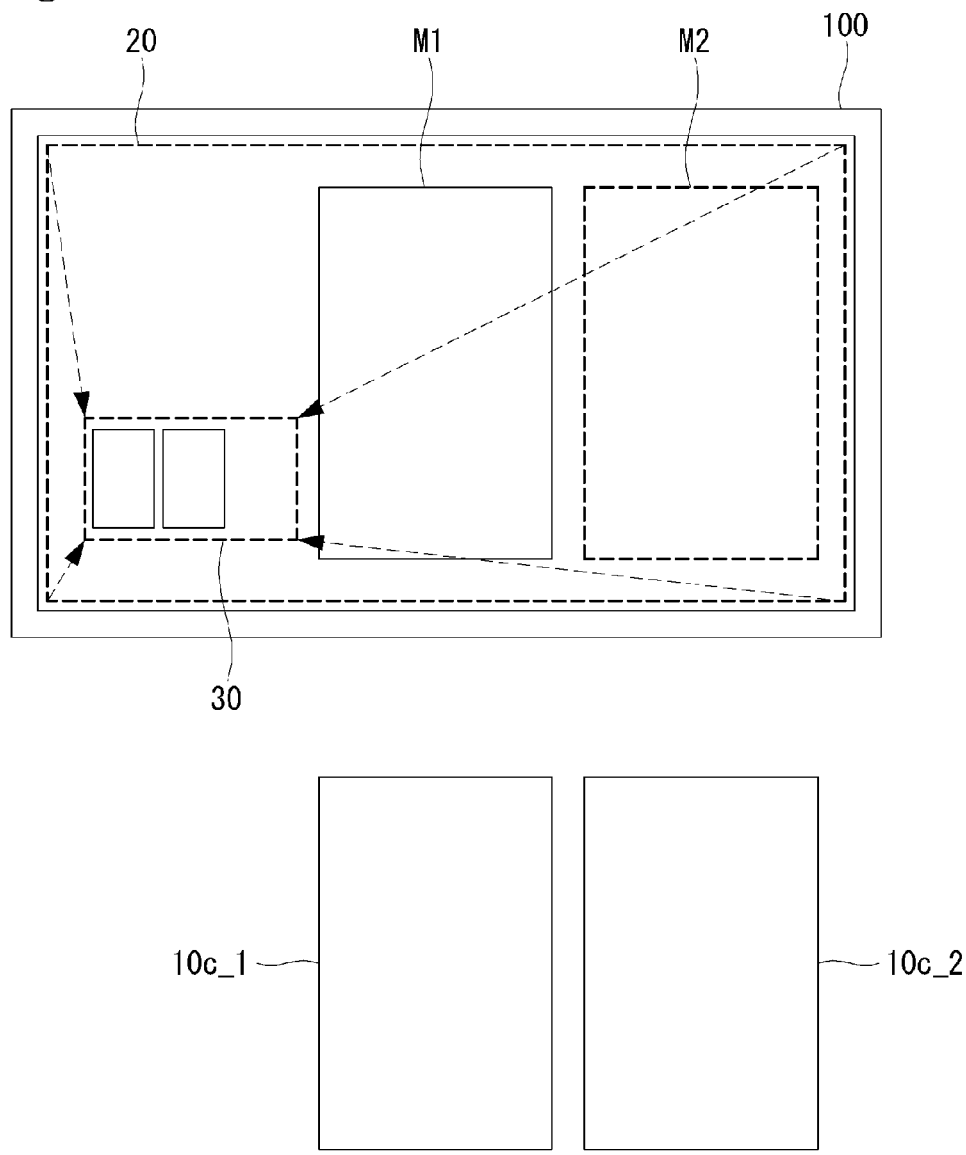

Referring to FIG. 19, for example, if animation showing the capture image 20 is scaled down and moved to an area other than the first mirror image M1, second mirror image M2 and graphical object region is displayed, the controller 180 may store the capture image 20 in the electronic device 100.

Figure 20:
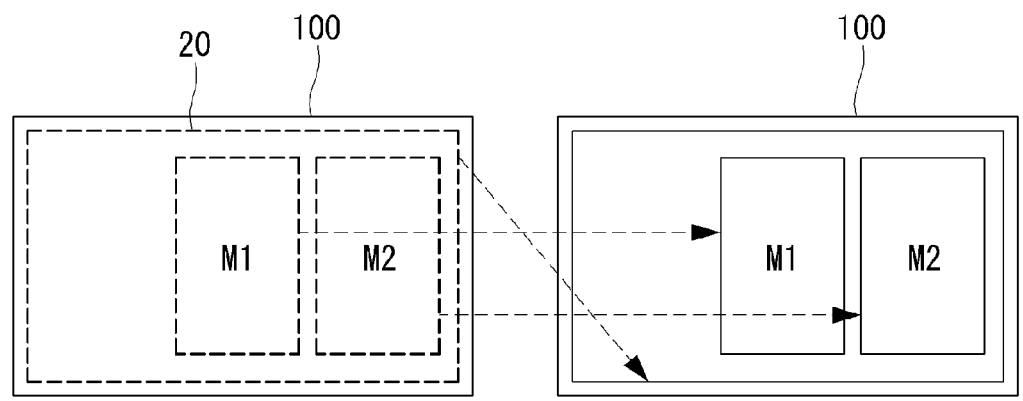
Figure 21:
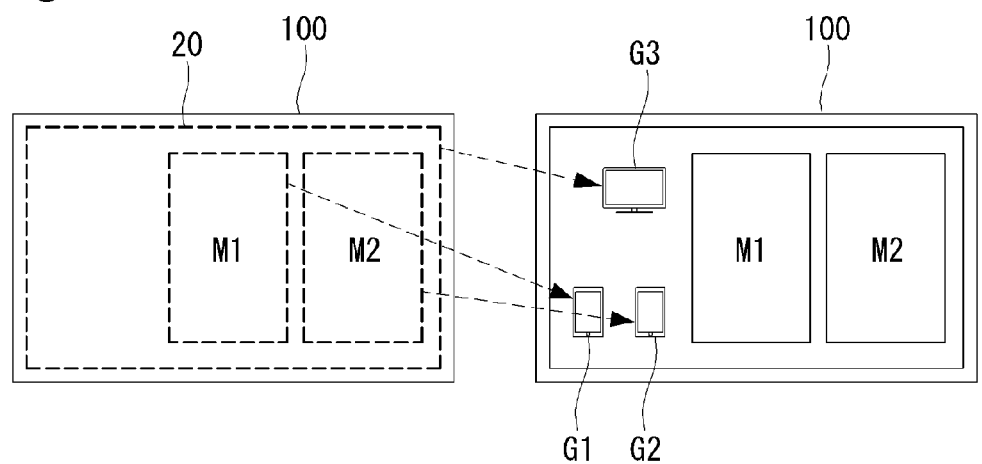

Referring to FIGS. 20 and 21, the predetermined area may include the first area (mirror image region) and a third area (blank area of the display unit).

Referring to FIG. 20, animation showing that the capture image 20 is moved to the third area may be displayed. And, animation showing that the first mirror image M1 and the second mirror image M2 are separated from the capture image 20 and respectively absorbed into first and second mirror image regions M1 and M2 to disappear from the display unit may be displayed.

Referring to FIG. 21, when the screen of the electronic device 100 is captured, the controller 180 may display the graphical object G3 identifying the electronic device 100, the graphical object G1 identifying the first external electronic device 10c_1 and the graphical object G2 identifying the second external electronic device 10c_2 on the display unit 151.

Then, animation of moving the capture image 20 to the graphical object G3, animation of moving the first mirror image M1 to the first graphical object G1 and animation of moving the second mirror image M2 to the second graphical object G2 may be displayed.

Accordingly, the capture image 20 may be stored in the electronic device 100 corresponding to the graphical object G3. The first mirror image M1 may be stored in the first external electronic device 10c_1 and the second mirror image M2 may be stored in the second external electronic device 10c_2.

Figure 22:
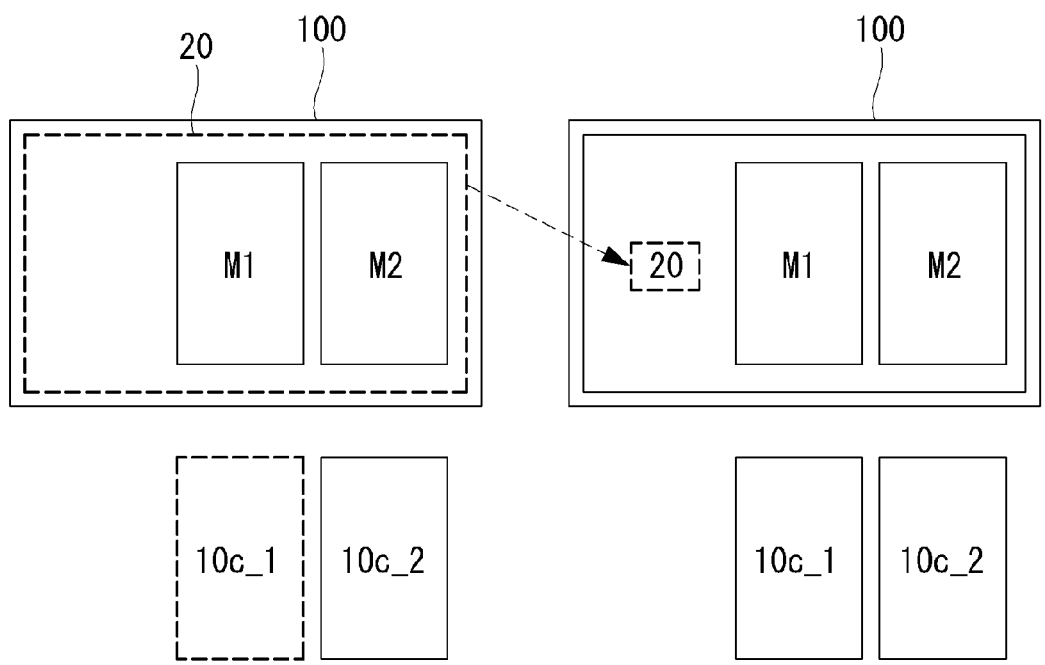

FIGS. 22 to 24 illustrate an operation of the electronic device 100 when animation representing that the capture image 20 is scaled down to a predetermined size and changed to an icon and then the icon is moved to a predetermined area of the display unit 151 is displayed.

Referring to FIG. 22, when the screen capture image 20 of the electronic device 100 is generated, the controller 180 may scale down the capture image 20 to a predetermined size to generate an icon I and display the icon I on a predetermined area of the display unit 151.

The size of the icon may correspond to the size of an application icon displayed on the screen of the mobile terminal.

The predetermined area of the display unit 151 may be an area other than the first mirror image region M1 and the second mirror image region M2.

Referring to FIG. 23, the controller 180 may move the icon I corresponding to the capture image 20 to one of the first mirror image region M1 and the second mirror image region M2.

When the icon I is moved to the first mirror image region M1, the controller 180 may transmit the capture image 20 corresponding to the icon I to the first external electronic device 10c_1 corresponding to the first mirror image region M1.

Referring to FIG. 24, when the icon I corresponding to the capture image 20 is moved to the first graphical object G1 displayed on the display unit 151, the controller 180 may transmit the capture image 20 corresponding to the icon I to the first external electronic device 10c_1 corresponding to the first graphical object G1.

As shown in FIGS. 22 and 23, the first external electronic device 10c_1 can receive the capture image 20 from the electronic device 100, display the capture image 20 on the screen thereof and store the capture image 20.

Figure 25:
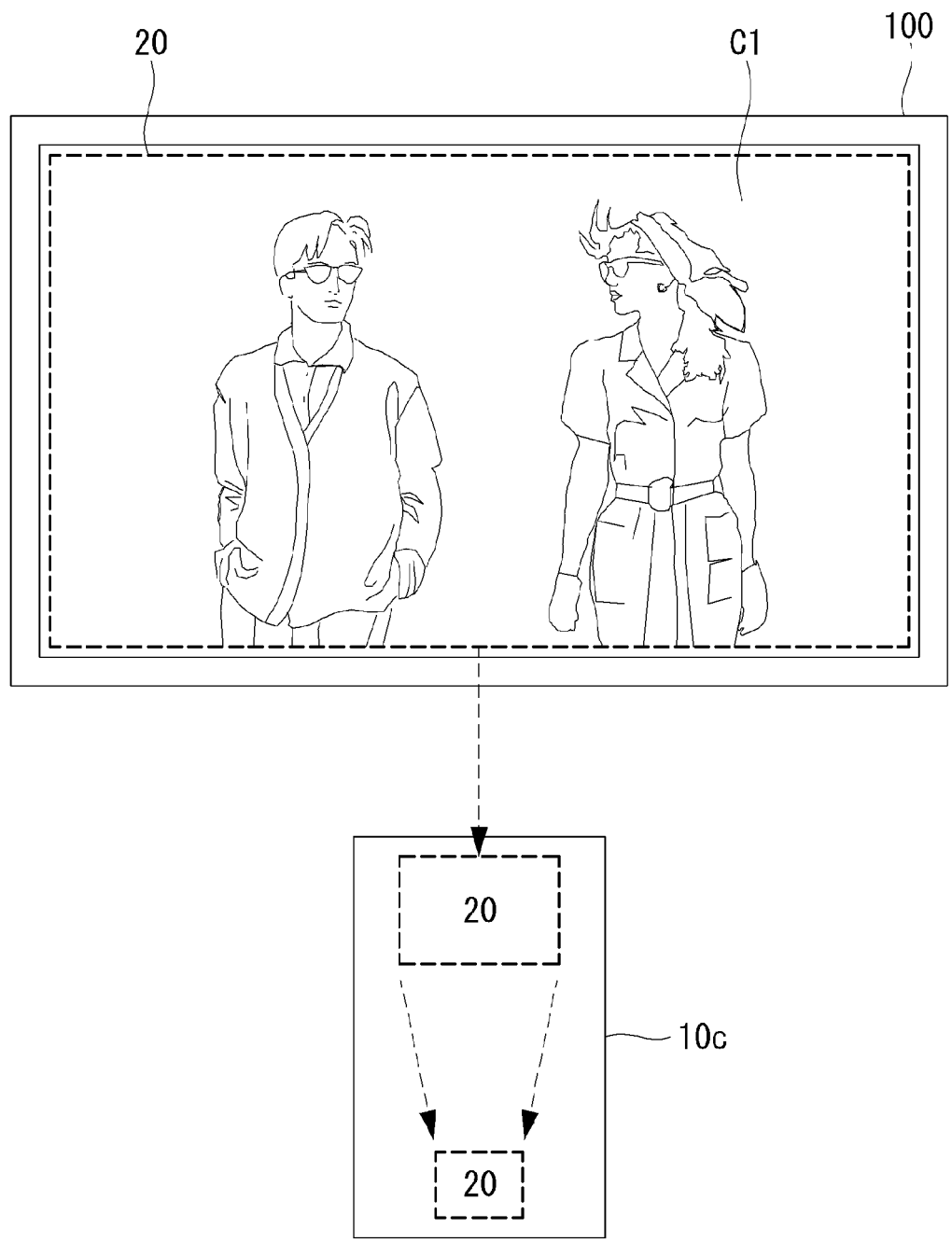
FIG. 25 shows an exemplary screen for explaining a method of controlling an electronic device according to a second embodiment of the present invention.

FIG. 25 shows an exemplary screen for explaining a method of controlling an electronic device according to a second embodiment of the present invention.

The method of controlling an electronic device according to the second embodiment of the present invention may be implemented in the electronic devices 100 and 10. The method of controlling an electronic device according to the second embodiment of the present invention and operations of the electronic device 100 for implementing the method will now be described in detail on the basis of the electronic device 100 for convenience of description. The second embodiment of the invention may be based on the embodiments described above with reference to FIGS. 5 to 7.

Referring to FIG. 25, when the electronic device 100 and the first external electronic device 10c share the screens thereof, the electronic device 100 may play predetermined content (e.g. video) C1 on the display unit 151.

When the screen capture command is received from the first external electronic device 10c while the video C1 is played, the electronic device 100 may transmit the capture image 20 to the first external electronic device 10c while continuously playing the video C1 on the display unit 151.

Accordingly, the first external electronic device 10c may exert a predetermined animation effect to the capture image 20 to represent that the capture image 20 is transmitted from the electronic device 100 and displayed. The animation effect may include animation showing the capture image 20 is scaled down while being moved from the direction of the electronic device 100 to the first external electronic device 10c on the screen of the first external electronic device 10c.

Figure 26:
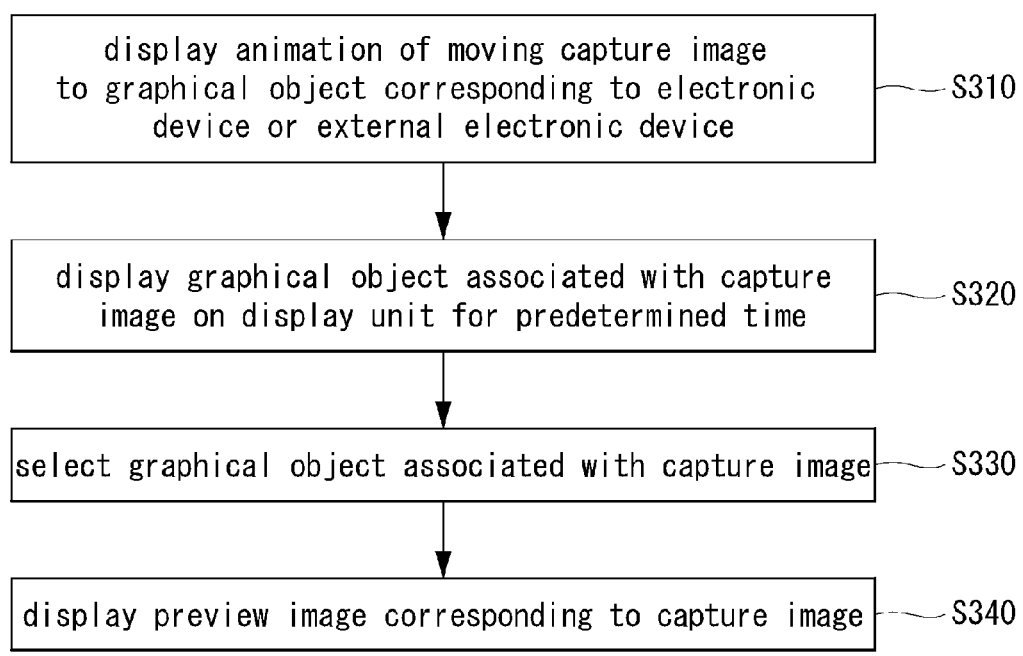
FIG. 26 is a flowchart illustrating a method of controlling an electronic device according to a third embodiment of the present invention.
Figure 27:
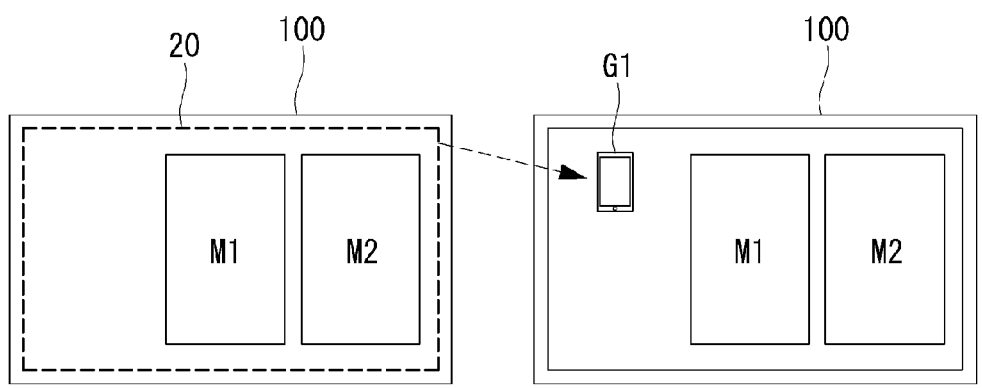
FIGS. 27 to 29 are diagrams for explaining the method of controlling an electronic device according to the third embodiment of the present invention.
Figure 28:
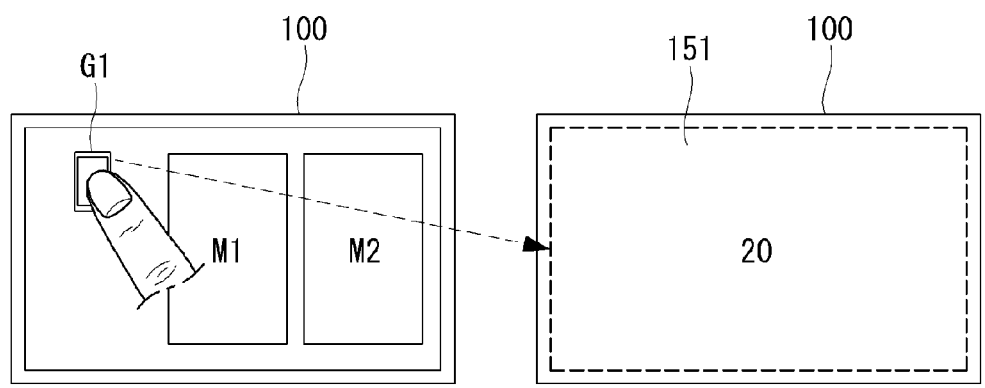
Figure 29:
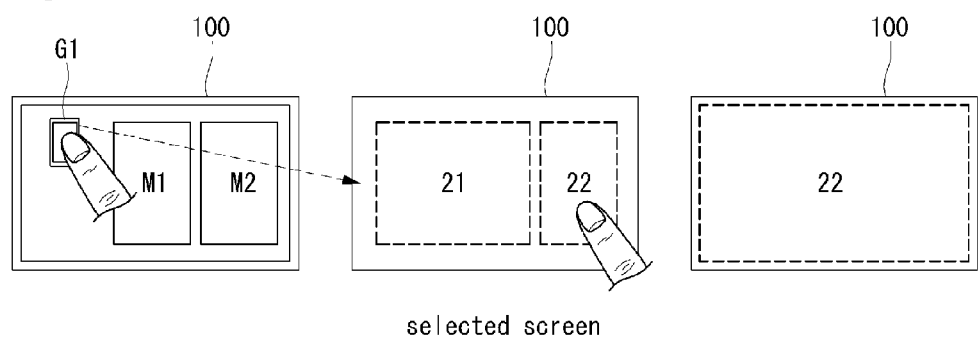

FIG. 26 is a flowchart illustrating a method of controlling an electronic device according to a third embodiment of the present invention. FIGS. 27 to 29 are diagrams for explaining the method of controlling an electronic device according to the third embodiment of the present invention.

The method of controlling an electronic device according to the third embodiment of the present invention may be implemented in the electronic devices 100 and 10. The method of controlling an electronic device according to the third embodiment of the present invention and operations of the electronic device 100 for implementing the method will now be described in detail on the basis of the electronic device 100 for convenience of description. The third embodiment of the invention may be based on the embodiment described above with reference to FIG. 8 and the method of controlling an electronic device according to the first embodiment.

Referring to FIGS. 26 and 27, the controller 180 of the electronic device 100 may display animation expressing movement of the capture image 20 to the graphical object G1 corresponding to the electronic device 100 or an external electronic device (S310).

When the capture image 20 overlaps with at least part of the graphical object G1, the capture image 20 may be associated with the graphical object G1.

Here, association of the capture image 20 with the graphical object G1 may mean that the capture image 20 can be controlled to be transmitted to the external electronic device corresponding to the graphical object G1 and stored in the external electronic device.

Referring to FIG. 27, the controller 180 may display the graphical object G1 associated with the capture image 20 on the display unit for a predetermined time (S320).

The controller 180 may select the graphical object G1 associated with the capture image 20 (S330).

Then, the controller 180 may display a preview image of the capture image on the display unit (S340).

Referring to FIG. 28, an input of selecting the graphical object G1 associated with the capture image 20 is received within the predetermined time, the capture image 20 may be displayed as a preview image on the display unit 151.

Referring to FIG. 29, when a plurality of capture images 21 and 22 are associated with the graphical object G1, the controller 180 may display the capture images 21 and 22 on the display unit 151 upon reception of an input of selecting the graphical object G1. When an input of selecting one of the capture images 21 and 22 is received, the controller 180 may display the selected capture image 22 on the display unit 151.

Figure 30:
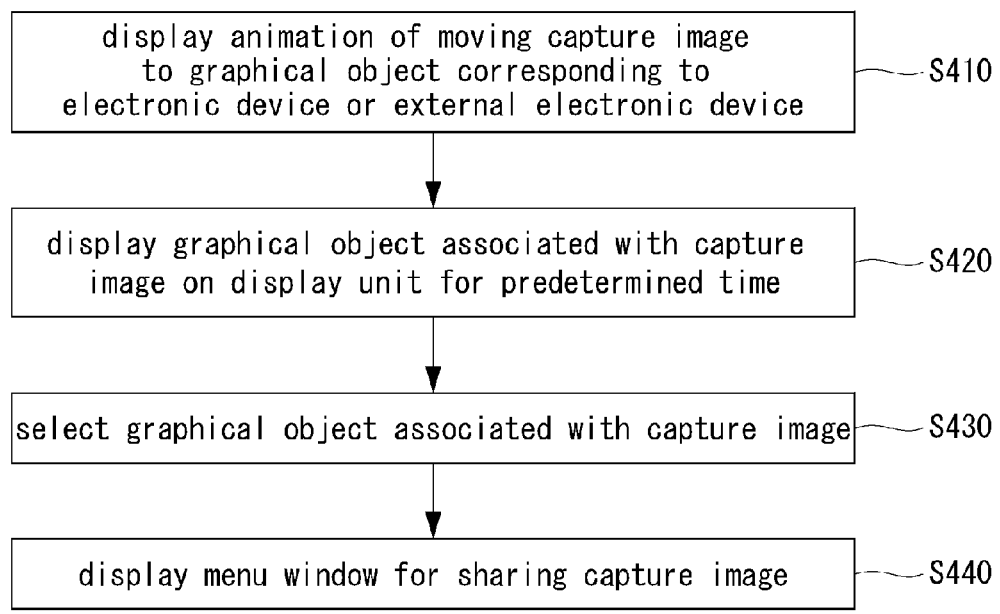
FIG. 30 is a flowchart illustrating a method of controlling an electronic device according to a fourth embodiment of the present invention.
Figure 32:
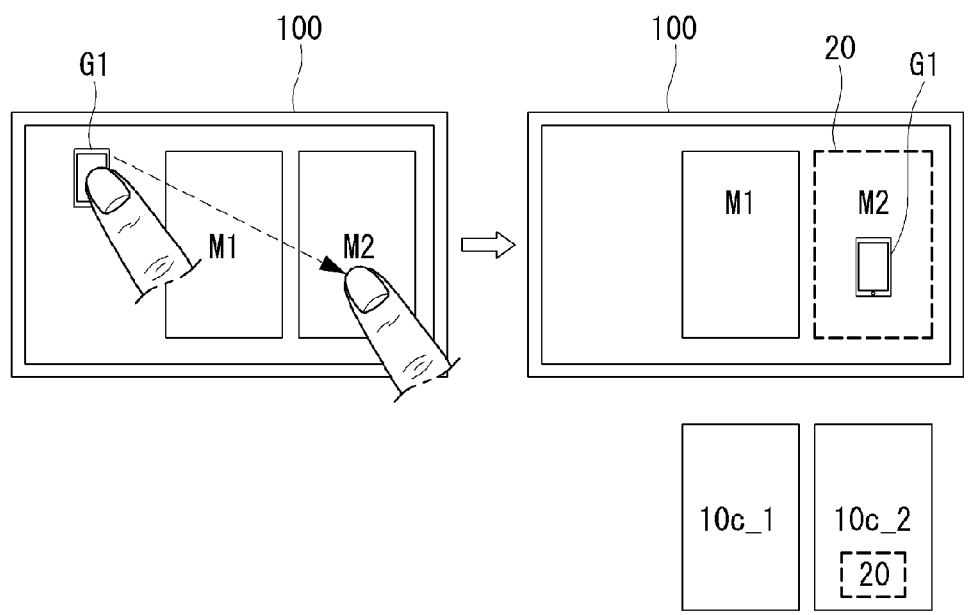

FIG. 30 is a flowchart illustrating a method of controlling an electronic device according to a fourth embodiment of the present invention and FIGS. 31 and 32 are diagrams for explaining the fourth embodiment of the present invention.

The method of controlling an electronic device according to the fourth embodiment of the present invention may be implemented in the electronic devices 100 and 10. The method of controlling an electronic device according to the fourth embodiment of the present invention and operations of the electronic device 100 for implementing the method will now be described in detail on the basis of the electronic device 100 for convenience of description. The fourth embodiment of the invention may be based on the method of controlling an electronic device according to the embodiment described above with reference to FIGS. 5 and 6.

Referring to FIG. 30, the fourth embodiment of the invention relates to an operation of an electronic device to share a capture image.

The controller 180 of the electronic device 100 may display animation of moving the capture image 20 a graphical object corresponding to the electronic device 100 or an external electronic device (S410). The controller 180 may display the graphical object associated with the capture image 20 on the display unit for a predetermined time (S420). The controller 180 may select the graphical object associated with the capture image (S430).

Then, the controller 180 may display a menu window for sharing the capture image on the display unit (S440).

Referring to FIG. 31, when an input of selecting the graphical object G1 associated with the capture image 20 is received, the controller 180 may display a menu window 60 showing means for sharing the capture image 20 with other devices on the display unit 151.

The sharing means may include menu items such as e-mail, a messenger, an SNS application, etc. When one of the menu items is selected, the capture image 20 may be transmitted to a corresponding counterpart device through sharing means corresponding to the selected menu item.

Referring to FIG. 30, the display unit 151 of the electronic device according to the fourth embodiment of the present invention may be a touch screen. Accordingly, the controller 180 of the electronic device 100 may display the graphical object G1 on the touch screen 151. When a drag input of moving the graphical object G1 to the first mirror image region M1 or the second mirror image region M2 is received, the controller 180 may transmit the capture image 20 to an external electronic device corresponding to a dragged mirror image.

Accordingly, the second external electronic device 10c_2 can display the capture image 20 shared with the electronic device 100 on the screen thereof.

According to the above-described embodiments of the present invention, a capture operation can be performed between devices sharing the screens thereof, a capture image can be stored in the devices and shared with other device.

In the embodiments of the invention, when the electronic device executes a capture command, screens of the electronic device and an external electronic device may blink to signal capture of the screens of the electronic device and the external electronic device. In addition to this visual effect, an effect sound may be generated when screen capture is performed to signal screen capture such that a user can easily recognize a captured screen from among the shared screens and a captured image.

In the embodiments of the present invention, animation displayed for the capture image is not limited to the above-described embodiments and can be modified and implemented in various manners.

Figure 33:
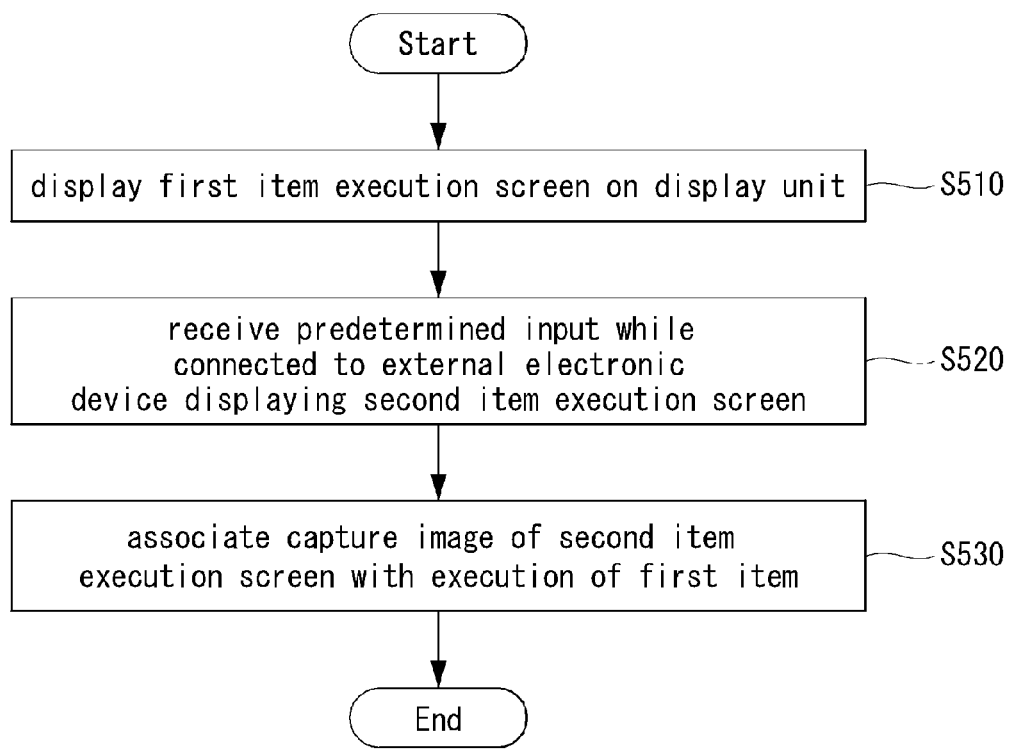
FIG. 33 is a flowchart illustrating a method of controlling a mobile terminal according to an embodiment of the present invention.

FIG. 33 is a flowchart illustrating a method of controlling a mobile terminal according to an embodiment of the present invention.

The method of controlling a mobile terminal according to the present embodiment of the invention may be implemented in the electronic devices 100 and 10 shown in FIG. 1. The method of controlling a mobile terminal according to the present embodiment of the invention and operations of the mobile terminal 100 for implementing the method will now be described in detail on the basis of the mobile terminal 100 for convenience of description.

Referring to FIG. 33, the controller 180 of the mobile terminal 100 may display a first item execution screen on the display unit 151 (S510).

Here, the first item may include a messenger application.

The messenger application may include at least one of a short message service (SMS), multimedia messaging service (MMS), instant message (IM), and e-mail.

The messenger application execution screen may include a virtual keyboard region for inputting a message and a message display region for displaying an input message.

It is assumed that the mobile terminal 100 is connected to a DTV 10c through a predetermined network (for example, the predetermined network comprises N screen) such that the mobile terminal 100 and the DTV 10c share screens thereof.

The controller 180 of the mobile terminal 100 may receive an input predetermined for the mobile terminal 100 while being connected to an external electronic device that display a second item execution screen (S520).

The predetermined input may include an input for capturing the screen while the messenger application is executed.

For example, the input for capturing the screen may include an input of simultaneously receiving multi-touch inputs to two points on the touch screen 151.

The input for capturing the screen may include an input according to a combination of a hard key and a soft key of the mobile terminal 100.

The second item may include at least one of a web browser, application and multimedia content.

The mobile terminal 100 may associate a capture image of the second item execution screen with execution of the first item (S530).

The operation of associating the capture image with execution of the first item may be modified and implemented in various manners. For example, an operation of associating a screen capture image of the DTV 10c with execution of the first item may depend on the type of the first item executed in the mobile terminal 100.

A description will be given of an operation of associating a capture image with execution of a messenger application after dual capture when the first item executed in the mobile terminal 100 is the messenger application.

Figure 34:
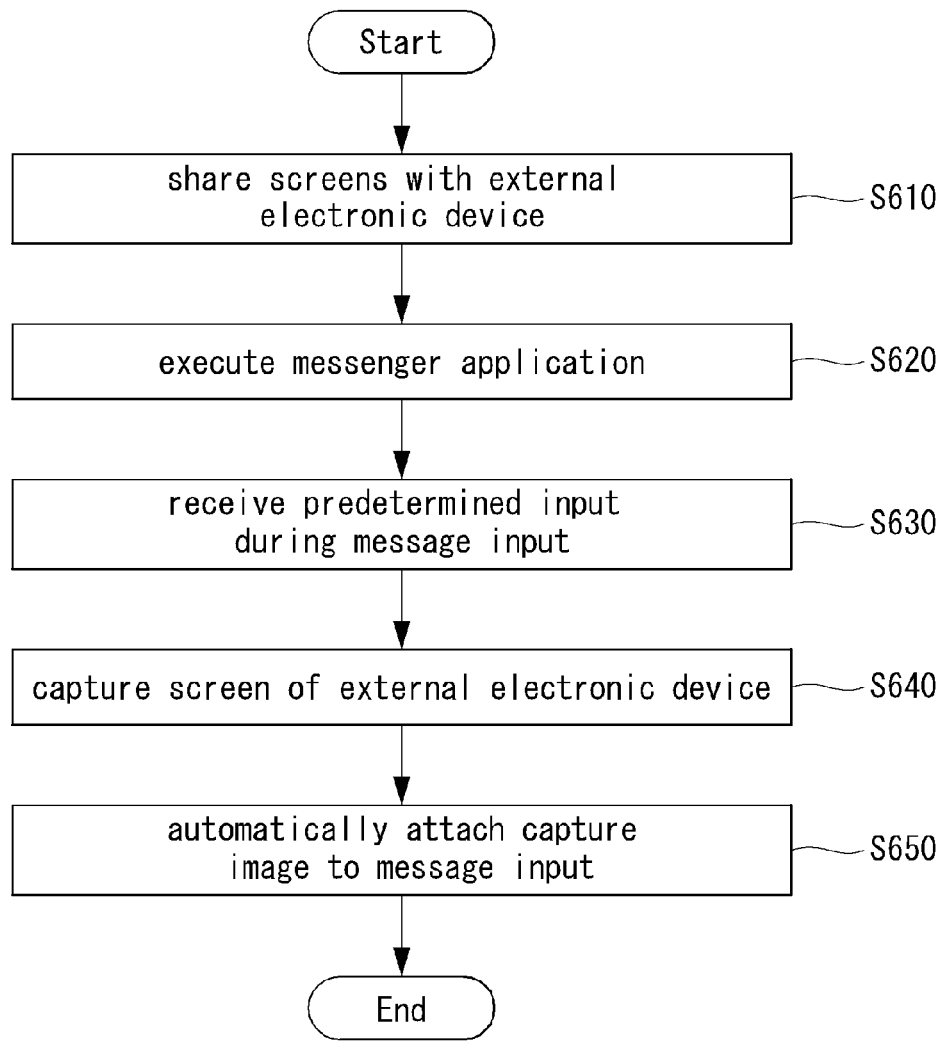
FIG. 34 is a flowchart of a method of controlling a mobile terminal to illustrate the embodiment shown in FIG. 31 in more detail.

FIG. 34 is a flowchart of a method of controlling a mobile terminal to illustrate the embodiment shown in FIG. 31 in more detail.

Referring to FIG. 34, the controller 180 of the mobile terminal 100 may be connected with the external electronic device 10c such that the mobile terminal 100 and the external electronic device 10c share the screens thereof (S610).

The mobile terminal 100 may execute the messenger application and display a messenger application execution screen on the touch screen 151 (S620).

When the mobile terminal 100 receives a predetermined input while a message is input to the mobile terminal 100 (S630), the controller 180 may capture the screen of the external electronic device 10c and automatically attach the capture image to a message input window (S650).

When an input of transmitting the message is received on the messenger application, the screen capture image of the external electronic device 10c may be attached to the message and transmitted.

FIGS. 35 to 37 are diagrams for explaining the embodiment shown in FIG. 34.

Referring to FIG. 35, the mobile terminal 100 may display a messenger application execution screen MA on the touch screen 151.

The DTV 10c that shares the screens with the mobile terminal 100 may execute a web browser application and display a predetermined web site on the screen thereof.

When the mobile terminal 100 simultaneously receives multi-touch inputs to two arbitrary points on the touch screen 151 while transmitting/receiving a message, the controller 180 may transmit a control signal for controlling the DTV 10c to perform a screen capture operation to the DTV 10c through the communication unit 110.

Referring to FIG. 36, upon reception of the control signal, the DTV 10c may perform the screen capture operation and transmit a capture image 12 to the mobile terminal 100.

The mobile terminal 100 may automatically attach the capture image CI to the message to be transmitted and display the capture image on a message execution screen.

Accordingly, the mobile terminal 100 can receive a screen capture image from an external electronic device sharing the screens with the mobile terminal 100 and apply the screen capture image to execution of the messenger application. Specifically, to transmit an image of the screen of the DTV 10c to a receiving part while executing the messenger application, the mobile terminal 100 should end the messenger application or execute a camera application in a multi-tasking manner and then additionally capture the screen of the DTV 10c. Then, the mobile terminal 100 should attach the capture image to the input window of the messenger application.

However, according to the mobile terminal according to the present embodiment of the invention, the mobile terminal 100 can easily capture the screen of the other electronic device that shares the screens with the mobile terminal 100 while executing a predetermined application and associate the capture image with execution of the predetermined application so as to use the image of the screen of the device sharing the screens with the mobile terminal 100 more conveniently.

FIG. 37 shows a case in which the first item executed in the mobile terminal 100 is an e-mail application.

Referring to FIG. 37, the mobile terminal 100 displays an email execution screen on the touch screen 151. When an input predetermined for the touch screen 151 is received, the controller 180 of the mobile terminal 100 may transmit the control signal for controlling the DTV 10c to perform the screen capture operation to the DTV 10c. The following operation has been described above with reference to FIGS. 36 and 36. The mobile terminal 100 may automatically attach the screen capture image of the DTV 10c to a mail creation region.

FIGS. 38 and 39 are diagrams for explaining an operation of the mobile terminal according to an embodiment of the present invention when an external electronic device that shares screens with the mobile terminal executes content to which DRM is applied.

Referring to FIG. 38, the mobile terminal 100 may be connected to the DTV 10c through the communication unit 110 such that the mobile terminal 100 and the DTV 10c share the screens thereof.

The mobile terminal 100 may display the messenger application execution screen MA on the touch screen 151 and the DTV 10c may play content C2 to which DRAM is applied on the screen thereof.

Upon reception of a predetermined input, the mobile terminal 100 may transmit the control signal for controlling the DTV 10c to perform screen capture to the DTV 10c and receive a screen capture image from the DTV 10c.

Referring to FIG. 39, upon reception of the control signal, the DTV 10c may check whether DRM is applied to the currently played content C2. When DRM is applied to the currently played content C2, the DTV 10c may transmit source information about the content 2 instead of a capture image of the content C2 to the mobile terminal 100.

The source information may include URL 43 for acquiring the content C2. The source information may further include the title 41 of the content C2 and capture time 42 when screen capture is performed.

The controller 180 of the mobile terminal 100 may attach the source information about the content C2 to a message input window and transmit the source information with a message to a receiving part.

According to the method of controlling the mobile terminal according to the present embodiment of the invention, the source information about the content C2 can be received and then transmitted to a second mobile terminal. The operation of the second mobile terminal will now be described with reference to FIGS. 40 and 41.

Figure 40:
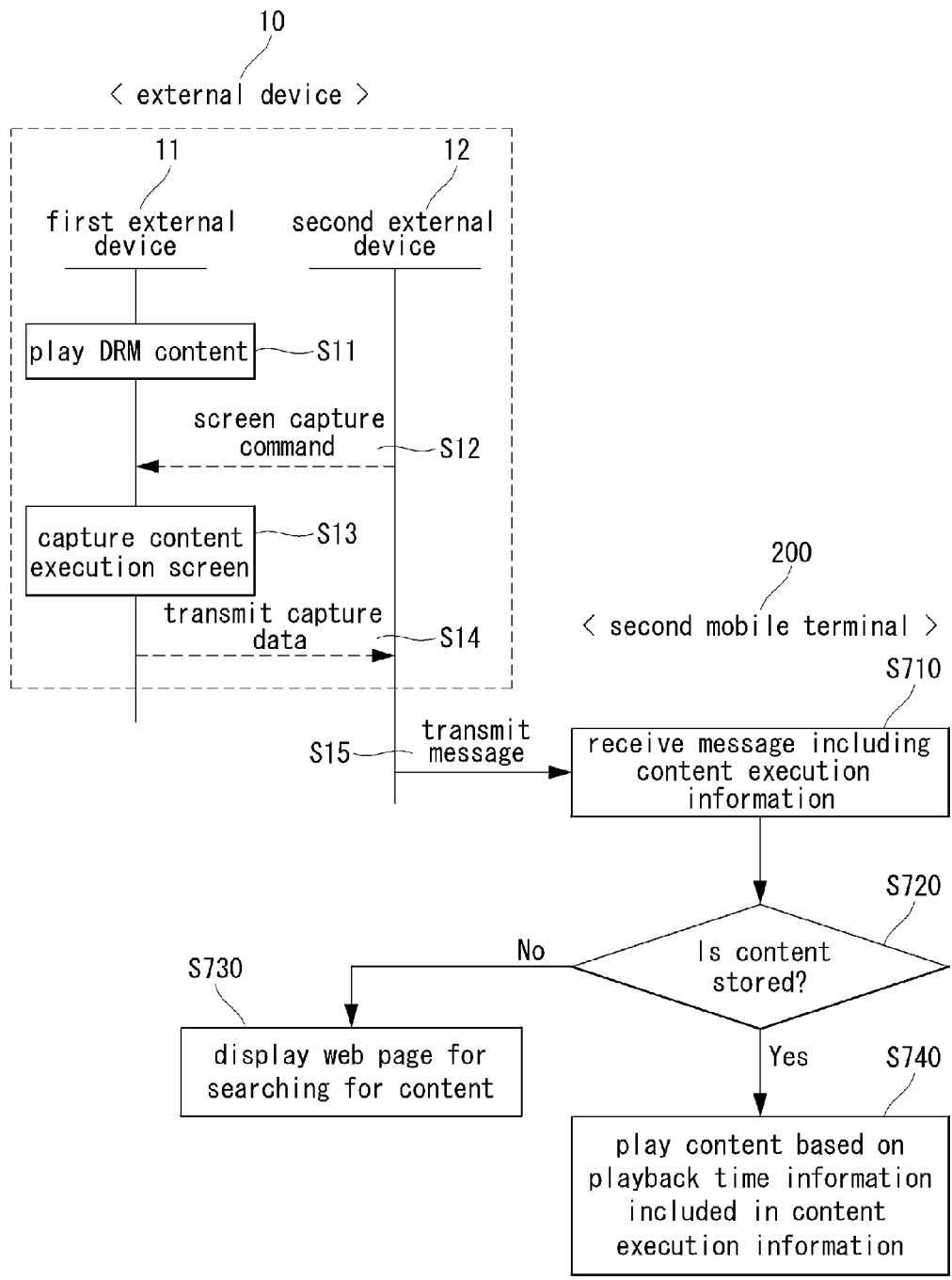
FIG. 40 is a flowchart illustrating a method of controlling a mobile terminal according to an embodiment of the present invention.
Figure 41:
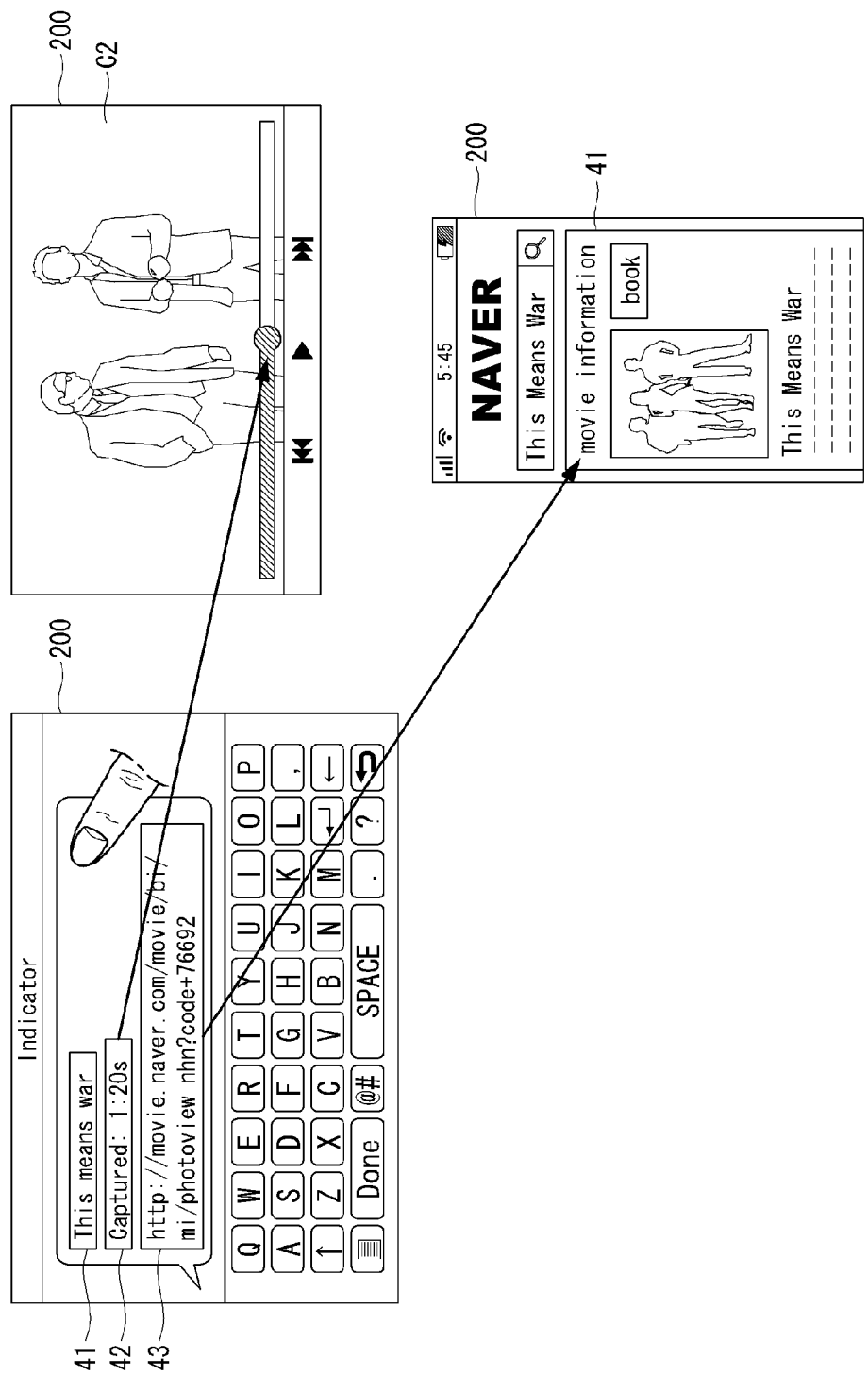
FIG. 41 is a diagram for explaining the embodiment shown in FIG. 40.

FIG. 40 is a flowchart illustrating a method of controlling a mobile terminal according to an embodiment of the present invention and FIG. 41 is a diagram for explaining the embodiment shown in FIG. 40.

FIG. 40 illustrates an operation of the second mobile terminal 200 that receives a message including the source information about the content C2 shown in FIG. 37.

In the following description, the source information about the content C2 is referred to as execution information of the content C2.

Referring to FIG. 38, the second mobile terminal 200 may receive a predetermined message from an external device.

Here, the external device may include a first external device 100 and a second external device 12. The first external device 11 and the second external device 12 may perform the procedures described in the above embodiments.

For example, the first external device 11 may execute DRM content (S11).

A predetermined network is established such that the first external device 11 and the second external device 12 can share the screens thereof. For example, the first external device 11 and the second external device 12 can share the screens thereof through a DLNA network.

Upon reception of a screen capture command from the second external device (S12), the first external device 11 may capture a content execution screen (S13).

The first external device 11 may capture the screen thereof irrespective of the screen capture command from the second external device 12.

The second external device 12 may receive capture data from the first external device 11 (S14).

Here, the capture data may include at least one of a capture image of the content execution screen, capture time information, the URL of the content, the address of a web page in which the content can be searched, and the title of the content.

The second external device 12 may transmit the received capture data in the form of a message to the second mobile terminal 200 (S15).

The second mobile terminal 200 may receive a message including content execution information from the second external device 12 (S710).

Here, the message including the content execution information may include at least one of a capture image of the content execution screen, capture time information, the URL of the content, the address of a web page in which the content can be searched, and the title of the content.

When the content is DRM content, the content execution information may include at least one of the information other than the capture image of the content execution screen.

The second mobile terminal 200 may determine whether the content is stored in the memory thereof in association with the content execution information included in the received message (S720).

When the second mobile terminal 200 stores the content (S720: YES), the second mobile terminal 200 may execute the content on the basis of playback time information included in the content execution information (S740).

For example, if the content is a video, the second mobile terminal 200 can play the video from the content playback time on the basis of the content playback time information.

If the second mobile terminal 200 does not store the content (S720: NO), the second mobile terminal 200 may display the web page for searching for the content on the display unit (S730). Here, the message including the content execution information may include the address of the web page for searching for the content.

Referring to FIG. 41, when the second mobile terminal 200 receives the message including the content execution information and an input of selecting the message, the second mobile terminal 200 may determine whether a file related to the content C2 exists in the second mobile terminal 200.

For example, if the content C2 to which DRM is applied is stored in the second mobile terminal 200, the second mobile terminal 200 can play the content 2 from the capture time corresponding to the capture time information 42 included in the message.

If the content C2 is not stored in the second mobile terminal 200, the second mobile terminal 200 can access the content C2 using the URL 43 from among the content execution information included in the message.

The method for controlling of the mobile terminal according to embodiments of the present invention may be recorded in a computer-readable recording medium as a program to be executed in the computer and provided. Further, the method for controlling a mobile terminal according to embodiments of the present invention may be executed by software. When executed by software, the elements of the embodiments of the present invention are code segments executing a required operation. The program or the code segments may be stored in a processor-readable medium or may be transmitted by a data signal coupled with a carrier in a transmission medium or a communication network.

The computer-readable recording medium includes any kind of recording device storing data that can be read by a computer system. The computer-readable recording device includes a ROM, a RAM, a CD-ROM, a DVD?ROM, a DVD-RAM, a magnetic tape, a floppy disk, a hard disk, an optical data storage device, and the like. Also, codes which are distributed in computer devices connected by a network and can be read by a computer in a distributed manner are stored and executed in the computer-readable recording medium.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An electronic device displaying a related image corresponding to a screen of an external electronic device on a display unit, the electronic device comprising:
   a wireless communication unit configured to include an HDMI (High Definition Multimedia Interface) standard interface connected to the external electronic device; and
   a controller configured to:
   capture an image of a screen displayed on the display unit when a screen capture signal is received from the external electronic device while the electronic device and the external electronic device share screens thereof through the wireless communication unit, and
   transmit the capture image to the external electronic device corresponding to the related image through the HDMI standard interface when animation of moving the capture image to the related image is displayed.

2. The electronic device of claim 1, wherein the controller is further configured to scale down the captured image to a graphical object.

3. The electronic device of claim 2, wherein, when an input predetermined for the graphical object is received, the controller is configured to display a preview image with respect to the capture image on the display unit.

4. The electronic device of claim 2, wherein, when an input predetermined for the graphical object is received, the controller is configured to display a menu window for sharing the capture image on the display unit.

5. The electronic device of claim 2, wherein the display unit includes a touch screen, and wherein, when a drag input for moving the graphical object to the related image is applied to the touch screen, the controller is configured to control the capture image to be shared with the external electronic device corresponding to the related image.

6. The electronic device of claim 1, wherein the related image includes a plurality of related images respectively including images mirroring screens of the plurality of the external electronic devices.

7. The electronic device of claim 1, wherein the controller is configured to control the capture image to be stored in the external electronic device corresponding to the related image in response to the capture image being moved to the related image.

8. The electronic device of claim 7, wherein the controller is configured to control the capture image to be stored in the electronic device in response to the capture image being moved to an area on the display unit not including the related image.

9. The electronic device of claim 7, wherein the capture image being moved to the related image includes an animation of a motion of scaling down the capture image to an icon.

10. The electronic device of claim 1, wherein, when the screen capture signal is received while a video is played on the display unit, the controller is configured to scale down the capture image to an icon and display the icon on a screen of an external device that transmits the screen capture signal.

11. The electronic device of claim 1, wherein the capture image corresponds to a screen displayed on the display unit and related images respectively corresponding to screens of one or more external electronic devices.

12. A method of controlling an electronic device displaying a related image corresponding to a screen of an external electronic device on a display unit, the method comprising:

capturing an image of a screen displayed on the display unit when a screen capture signal is received from the external electronic device while the electronic device and the external electronic device share screens thereof through a wireless communication unit; and transmitting the capture image to the external electronic device corresponding to the related image through an HDMI (High Definition Multimedia Interface) standard interface of the wireless communication unit when animation of moving the capture image to the related image is displayed.

* * * * *